(12) United States Patent
Owens et al.

(10) Patent No.: US 8,386,516 B2
(45) Date of Patent: *Feb. 26, 2013

(54) REGISTRATION AND MAINTENANCE OF ADDRESS DATA FOR EACH SERVICE POINT IN A TERRITORY

(75) Inventors: Timothy C. Owens, New Freedom, PA (US); Duane Anderson, Cockeysville, MD (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,565

(22) Filed: Mar. 14, 2011

(65) Prior Publication Data

US 2011/0208725 A1    Aug. 25, 2011

Related U.S. Application Data

(63) Continuation of application No. 12/270,665, filed on Nov. 13, 2008, now Pat. No. 7,912,854, which is a continuation of application No. 11/342,041, filed on Jan. 27, 2006, now Pat. No. 7,542,972.

(60) Provisional application No. 60/648,577, filed on Jan. 28, 2005.

(51) Int. Cl.
  *G06F 17/30* (2006.01)
(52) U.S. Cl. ........................................................ 707/776
(58) Field of Classification Search .................. 707/776, 707/756, 603
See application file for complete search history.

(56) References Cited

U.S. PATENT DOCUMENTS

| | | | |
|---|---|---|---|
| 4,832,204 A | 5/1989 | Handy et al. | |
| 4,839,813 A | 6/1989 | Hills et al. | |
| 5,262,939 A | 11/1993 | Vanpoucke | |
| 5,387,783 A | 2/1995 | Mihm et al. | |
| 5,422,821 A | 6/1995 | Allen et al. | |
| 5,452,203 A | 9/1995 | Moore | |
| 5,710,917 A | 1/1998 | Musa et al. | |
| 5,754,671 A | 5/1998 | Higgins et al. | |
| 5,758,574 A | 6/1998 | Bernardo et al. | |
| 5,905,666 A | 5/1999 | Hoffman et al. | |
| 5,953,427 A | 9/1999 | Cordery et al. | |
| 5,963,642 A | 10/1999 | Goldstein | |
| 5,978,792 A | 11/1999 | Bhargava et al. | |
| 6,131,101 A | 10/2000 | Maitino et al. | |

(Continued)

FOREIGN PATENT DOCUMENTS

| | | |
|---|---|---|
| EP | 1197885 | 12/2001 |
| JP | 408323299 | 12/1996 |

(Continued)

OTHER PUBLICATIONS

PRC Notification of the First Office Action for Chinese Application No. 200680006166.8 mailed Apr. 2, 2010.

(Continued)

*Primary Examiner* — Sherief Badawi
(74) *Attorney, Agent, or Firm* — Alston & Bird LLP

(57) ABSTRACT

A computer system and method is disclosed for mining current and archived address data in order to identify a preferred address for each service point in a territory. The data mining system may start in response to the presentation of a candidate address for matching. The set of mined data may be prioritized by clustering like characteristics, building similarity matrices, and by constructing dendrograms with nodes joined according to common characteristics. A computer system and method for maintaining a central database of preferred addresses is also disclosed. Selected address data gathered in a queue may be scored by characteristic, grouped by consignee location, and staged for processing. The scored queue of data may be prioritized by clustering like characteristics, building similarity matrices, and by constructing dendrograms.

28 Claims, 62 Drawing Sheets

U.S. PATENT DOCUMENTS

| | | |
|---|---|---|
| 6,205,447 B1 | 3/2001 | Malloy |
| 6,253,219 B1 | 6/2001 | Gardner et al. |
| 6,285,916 B1 | 9/2001 | Kadaba et al. |
| 6,321,992 B1 | 11/2001 | Knowles et al. |
| 6,438,579 B1 | 8/2002 | Hosken |
| 6,439,783 B1 | 8/2002 | Anotshenkov |
| 6,456,998 B1 | 9/2002 | Bui et al. |
| 6,457,012 B1 | 9/2002 | Jatkowski |
| 6,463,420 B1 | 10/2002 | Guidice et al. |
| 6,487,549 B1 | 11/2002 | Amundsen |
| 6,502,089 B1 | 12/2002 | Amundsen et al. |
| 6,507,835 B1 | 1/2003 | Amundsen et al. |
| 6,557,000 B1 | 4/2003 | Seestrom et al. |
| 6,564,204 B1 | 5/2003 | Amundsen et al. |
| 6,575,376 B2 | 6/2003 | Yu |
| 6,647,385 B2 | 11/2003 | Seestrom et al. |
| 6,681,391 B1 | 1/2004 | Marino |
| 6,772,130 B1 | 8/2004 | Karbowski et al. |
| 6,826,548 B2 | 11/2004 | Hungerpiller et al. |
| 6,873,963 B1 | 3/2005 | Westbury et al. |
| 6,931,418 B1 | 8/2005 | Barnes |
| 7,069,253 B2 | 6/2006 | Leon |
| 7,213,748 B2 * | 5/2007 | Tsuei et al. ............ 235/380 |
| 7,664,653 B2 * | 2/2010 | Dearing ................ 705/330 |
| 2001/0043599 A1 | 11/2001 | Redmond |
| 2001/0054031 A1 | 12/2001 | Lee et al. |
| 2002/0016726 A1 | 2/2002 | Ross |
| 2002/0032612 A1 * | 3/2002 | Williams et al. .......... 705/26 |
| 2002/0065815 A1 | 5/2002 | Layden |
| 2002/0078024 A1 | 6/2002 | Bellamy et al. |
| 2002/0124015 A1 | 9/2002 | Cardno et al. |
| 2002/0153409 A1 | 10/2002 | Yu |
| 2002/0174148 A1 | 11/2002 | Seidman |
| 2002/0184497 A1 | 12/2002 | Gage et al. |
| 2003/0009396 A1 | 1/2003 | DeVries et al. |
| 2003/0014408 A1 | 1/2003 | Robertson |
| 2003/0074213 A1 | 4/2003 | Murakami et al. |
| 2003/0236688 A1 | 12/2003 | Kadaba et al. |
| 2004/0083233 A1 | 4/2004 | Willoughby |
| 2004/0177305 A1 | 9/2004 | Payne et al. |
| 2004/0215588 A1 * | 10/2004 | Cornelius ................ 707/1 |
| 2004/0225543 A1 | 11/2004 | Kapochunas et al. |
| 2005/0038758 A1 | 2/2005 | Hilbush et al. |
| 2005/0246359 A1 | 11/2005 | Robbins |
| 2006/0010110 A1 | 1/2006 | Kim et al. |
| 2006/0212326 A1 | 9/2006 | Miller et al. |

FOREIGN PATENT DOCUMENTS

| | | |
|---|---|---|
| WO | WO-96/34354 | 10/1996 |
| WO | WO-01/06414 | 1/2001 |
| WO | WO-2005/050481 | 2/2005 |
| WO | WO-2006/083694 | 10/2006 |

OTHER PUBLICATIONS

PRC Notification of the Second Office Action for Chinese Application No. 200680006166.8 mailed Oct. 26, 2011.

Haderle, D.J., et al.; "IBM Database 2 Overview;" *IBM Systems Journal*, IBM Corporation; Armonk, New York; vol. 23, No. 2, (1984), pp. 112-125.

Pooch, U.W., et al.; "A Survey of Indexing Techniques for Sparse Matricies;" *Computing Surveys*; vol. 5, No. 2 (Jun. 1973); pp. 109-122.

Fernandez, et al. "Analysis Patterns for the Order and Shipment of Product," Department of Computer Science and Engineering, Florida Atlantic University, 2000.

Hu, et al., "A Data Warehouse/Online Analytic Processing Framework for Web Usage Mining and Business Intelligence Reporting," *International Journal of Intelligent Systems*, 2004, pp. 585-606, vol. 19.

Extended European Search Report for European Patent Application No. 06719627.9 mailed Jul. 27, 2009.

International Search Report and Written Opinion for International Application No. PCT/US06/02843 mailed Sep. 25, 2007.

Office Action dated Dec. 1, 2011, for Canadian Application No. 2,593,851.

* cited by examiner

FIG. 2

Begin of Initial Data Gathering Output Message
Consignee Token
Termination Reason (pass max, ship-to count slowed, max'd del patt growth)

Record 1
    Count
    Outcome Value="Missed/MissedLate/MissedNoOPLD"
    Delivery Pattern
    Driver ID
    Driver Name
    Stop ID
    Signat Clarify
    Delivery Date
    Delivery Status
    Delivery Stop Status
    Over-ride Flag
    Remarks
    Loop
    SLIC
    Reg/Dist
    Ship To Address, or Null if not Avail.
End Record 1

Record 2
    :
End Record 2

:

Record m
    :
End Record m

End of Initial Data Gathering Output Message

Fig. 4

| | ITERATION #1 ||
|---|---|---|
| | Step 62: Retrieve List of Tracking Numbers with the Same Delivery Pattern Code as the Mining Key 40 || Step 68: Find Tracking Numbers for Each Parcel having the Same Ship-To Address as the Records Found in Step 62 |||
| Mining Key 40 | Packages Found: | 20 | Packages Found: | 41 |
| | Unique Ship-to Addresses: | 8 | Unique Ship-to Addresses: | 8 |
| Tracking Number / Delivery Pattern Code | Tracking Number | Delivery Pattern Code | Ship-To Address | Tracking Number | Ship-To Address | Delivery Pattern Code |
| 1Z..Y..902  JZJ | | | | | | |
| | | | | | | |
| | 1Z..K..286 | JZJ | F | 1Z..K..286 | F | JZJ |
| | 1Z..O..664 | JZJ | R | 1Z..O..664 | R | JZJ |
| | 1Z..A..990 | JZJ | H | 1Z..A..990 | H | JZJ |
| | 1Z..D..243 | JZJ | N | 1Z..D..243 | N | JZJ |
| | | | | 1Z..M..671 | B | TKI |
| | | | | 1Z..W..431 | B | TKI |
| | | | | 1Z..O..633 | H | OZK |
| | | | | 1Z..L..220 | N | OZK |
| | | | | 1Z..H..117 | Q | OZK |
| | | | | 1Z..K..555 | S | OZK |
| | 1Z..O..100 | JZJ | B | 1Z..O..100 | B | JZJ |
| | 1Z..J..253 | JZJ | D | 1Z..J..253 | D | JZJ |
| | | | | 1Z..E..141 | N | TKI |
| | 1Z..G..955 | JZJ | H | 1Z..G..955 | H | JZJ |
| | 1Z..A..337 | JZJ | N | 1Z..A..337 | N | JZJ |
| | | | | 1Z..L..569 | B | OZK |
| | | | | 1Z..B..505 | D | OZK |
| | | | | 1Z..W..633 | D | OZK |

Fig. 7-1

|  |  |  | 1Z..D..139 | D | OZK |
|---|---|---|---|---|---|
| 1Z..Z..283 | JZJ | B | 1Z..Z..283 | B | JZJ |
| 1Z..U..720 | JZJ | F | 1Z..U..720 | F | JZJ |
| 1Z..M..722 | JZJ | F | 1Z..M..722 | F | JZJ |
| 1Z..G..892 | JZJ | S | 1Z..G..892 | S | JZJ |
|  |  |  |  |  |  |
|  |  |  |  |  |  |
|  |  |  | 1Z..T..463 | Q | OZK |
|  |  |  |  |  |  |
|  |  |  | 1Z..Y..122 | B | OZK |
|  |  |  | 1Z..S..503 | D | OZK |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  | 1Z..D..566 | R | PMY |
| 1Z..U..270 | JZJ | Q | 1Z..U..270 | Q | JZJ |
| 1Z..D..991 | JZJ | S | 1Z..D..991 | S | JZJ |
| 1Z..K..137 | JZJ | F | 1Z..K..137 | F | JZJ |
| 1Z..K..541 | JZJ | S | 1Z..K..541 | S | JZJ |
|  |  |  | 1Z..Y..504 | Q | OZK |
|  |  |  | 1Z..P..490 | S | OZK |
| 1Z..J..802 | JZJ | B | 1Z..J..802 | B | JZJ |
| 1Z..A..526 | JZJ | N | 1Z..A..526 | N | JZJ |
|  |  |  | 1Z..O..698 | H | OZK |
|  |  |  | 1Z..L..504 | N | OZK |
| 1Z..Y..902 | JZJ | B | 1Z..Y..902 | B | JZJ |
| 1Z..I..465 | JZJ | D | 1Z..I..465 | D | JZJ |
|  |  |  |  |  |  |
|  |  |  |  |  |  |
|  |  |  |  |  |  |
|  |  |  |  |  |  |
|  |  |  | 1Z..K..204 | D | TKI |
|  |  |  | 1Z..M..237 | H | TKI |
|  |  |  |  |  |  |
|  |  |  |  |  |  |

Fig. 7-2

| ITERATION #2 |||||| 
|---|---|---|---|---|---|
| Step 62: Retrieve List of Tracking Numbers with the Same Delivery Pattern Code as the Mining Key 40 |||Step 68: Find Tracking Numbers for Each Parcel having the Same Ship-To Address as the Records Found in Step 62 |||
| Packages Found: | 61 || Packages Found: | 64 ||
| Unique Ship-to Addresses: | 12 || Unique Ship-to Addresses: | 12 ||
| Tracking Number | Delivery Pattern Code | Ship-To Address | Tracking Number | Ship-To Address | Delivery Pattern Code |
| | | | | | |
| | | | | | |
| 1Z..C..460 | TKI | A | 1Z..C..460 | A | TKI |
| 1Z..N..217 | TKI | C | 1Z..N..217 | C | TKI |
| | | | | | |
| | | | | | |
| 1Z..K..286 | JZJ | F | 1Z..K..286 | F | JZJ |
| 1Z..O..664 | JZJ | R | 1Z..O..664 | R | JZJ |
| 1Z..A..990 | JZJ | H | 1Z..A..990 | H | JZJ |
| 1Z..D..243 | JZJ | N | 1Z..D..243 | N | JZJ |
| 1Z..E..826 | TKI | A | 1Z..E..826 | A | TKI |
| 1Z..M..671 | TKI | B | 1Z..M..671 | B | TKI |
| 1Z..B..119 | TKI | A | 1Z..B..119 | A | TKI |
| 1Z..W..431 | TKI | B | 1Z..W..431 | B | TKI |
| | | | 1Z..S..473 | A | VUS |
| | | | 1Z..C..429 | C | VUS |
| 1Z..W..325 | TKI | L | 1Z..W..325 | L | TKI |
| 1Z..U..568 | TKI | M | 1Z..U..568 | M | TKI |
| 1Z..O..633 | OZK | H | 1Z..O..633 | H | OZK |
| 1Z..L..220 | OZK | N | 1Z..L..220 | N | OZK |
| 1Z..H..117 | OZK | Q | 1Z..H..117 | Q | OZK |
| 1Z..K..555 | OZK | S | 1Z..K..555 | S | OZK |
| 1Z..O..100 | JZJ | B | 1Z..O..100 | B | JZJ |
| 1Z..J..253 | JZJ | D | 1Z..J..253 | D | JZJ |
| 1Z..E..200 | TKI | L | 1Z..E..200 | L | TKI |
| 1Z..E..141 | TKI | N | 1Z..E..141 | N | TKI |
| 1Z..G..955 | JZJ | H | 1Z..G..955 | H | JZJ |
| 1Z..A..337 | JZJ | N | 1Z..A..337 | N | JZJ |
| 1Z..L..569 | OZK | B | 1Z..L..569 | B | OZK |
| 1Z..B..505 | OZK | D | 1Z..B..505 | D | OZK |
| 1Z..W..585 | OZK | C | 1Z..W..585 | C | OZK |
| 1Z..W..633 | OZK | D | 1Z..W..633 | D | OZK |
| | | | | | |
| | | | | | |
| 1Z..W..356 | OZK | C | 1Z..W..356 | C | OZK |

Fig. 7-3

| | | | | | |
|---|---|---|---|---|---|
| 1Z..D..139 | OZK | D | 1Z..D..139 | D | OZK |
| 1Z..Z..283 | JZJ | B | 1Z..Z..283 | B | JZJ |
| 1Z..U..720 | JZJ | F | 1Z..U..720 | F | JZJ |
| 1Z..M..722 | JZJ | F | 1Z..M..722 | F | JZJ |
| 1Z..G..892 | JZJ | S | 1Z..G..892 | S | JZJ |
| 1Z..H..309 | TKI | L | 1Z..H..309 | L | TKI |
| 1Z..R..975 | TKI | M | 1Z..R..975 | M | TKI |
| 1Z..T..177 | OZK | A | 1Z..T..177 | A | OZK |
| 1Z..T..463 | OZK | Q | 1Z..T..463 | Q | OZK |
| | | | | | |
| 1Z..Y..122 | OZK | B | 1Z..Y..122 | B | OZK |
| 1Z..S..503 | OZK | D | 1Z..S..503 | D | OZK |
| | | | 1Z..O..530 | M | CUL |
| 1Z..T..838 | TKI | A | 1Z..T..838 | A | TKI |
| 1Z..K..851 | TKI | A | 1Z..K..851 | A | TKI |
| 1Z..D..352 | TKI | A | 1Z..D..352 | A | TKI |
| 1Z..A..825 | TKI | A | 1Z..A..825 | A | TKI |
| 1Z..Y..506 | PMY | L | 1Z..Y..506 | L | PMY |
| 1Z..D..566 | PMY | R | 1Z..D..566 | R | PMY |
| 1Z..U..270 | JZJ | Q | 1Z..U..270 | Q | JZJ |
| 1Z..D..991 | JZJ | S | 1Z..D..991 | S | JZJ |
| 1Z..K..137 | JZJ | F | 1Z..K..137 | F | JZJ |
| 1Z..K..541 | JZJ | S | 1Z..K..541 | S | JZJ |
| 1Z..Y..504 | OZK | Q | 1Z..Y..504 | Q | OZK |
| 1Z..P..490 | OZK | S | 1Z..P..490 | S | OZK |
| 1Z..J..802 | JZJ | B | 1Z..J..802 | B | JZJ |
| 1Z..A..526 | JZJ | N | 1Z..A..526 | N | JZJ |
| 1Z..O..698 | OZK | H | 1Z..O..698 | H | OZK |
| 1Z..L..504 | OZK | N | 1Z..L..504 | N | OZK |
| 1Z..Y..902 | JZJ | B | 1Z..Y..902 | B | JZJ |
| 1Z..I..465 | JZJ | D | 1Z..I..465 | D | JZJ |
| | | | | | |
| 1Z..W..960 | PMY | A | 1Z..W..960 | A | PMY |
| 1Z..P..390 | PMY | C | 1Z..P..390 | C | PMY |
| 1Z..O..252 | TKI | C | 1Z..O..252 | C | TKI |
| 1Z..K..204 | TKI | D | 1Z..K..204 | D | TKI |
| 1Z..M..237 | TKI | H | 1Z..M..237 | H | TKI |
| | | | | | |
| | | | | | |
| | | | | | |

Fig. 7-4

| ITERATION # 3 |||||| 
|---|---|---|---|---|---|
| Step 62: Retrieve List of Tracking Numbers with the Same Delivery Pattern Code as the Mining Key 40 ||| Step 68: Find Tracking Numbers for Each Parcel having the Same Ship-To Address as the Records Found in Step 62 |||
| Packages Found: | 73 || Packages Found: | 77 ||
| Unique Ship-to Addresses: | 15 || Unique Ship-to Addresses: | 15 ||
| Tracking Number | Delivery Pattern Code | Ship-To Address | Tracking Number | Ship-To Address | Delivery Pattern Code |
| 1Z..R..350 | VUS | E | 1Z..R..350 | E | VUS |
| 1Z..I..758 | VUS | G | 1Z..I..758 | G | VUS |
| 1Z..C..460 | TKI | A | 1Z..C..460 | A | TKI |
| 1Z..N..217 | TKI | C | 1Z..N..217 | C | TKI |
| 1Z..N..479 | VUS | E | 1Z..N..479 | E | VUS |
| 1Z..R..480 | VUS | G | 1Z..R..480 | G | VUS |
| 1Z..K..286 | JZJ | F | 1Z..K..286 | F | JZJ |
| 1Z..O..664 | JZJ | R | 1Z..O..664 | R | JZJ |
| 1Z..A..990 | JZJ | H | 1Z..A..990 | H | JZJ |
| 1Z..D..243 | JZJ | N | 1Z..D..243 | N | JZJ |
| 1Z..E..826 | TKI | A | 1Z..E..826 | A | TKI |
| 1Z..M..671 | TKI | B | 1Z..M..671 | B | TKI |
| 1Z..B..119 | TKI | A | 1Z..B..119 | A | TKI |
| 1Z..W..431 | TKI | B | 1Z..W..431 | B | TKI |
| 1Z..S..473 | VUS | A | 1Z..S..473 | A | VUS |
| 1Z..C..429 | VUS | C | 1Z..C..429 | C | VUS |
| 1Z..W..325 | TKI | L | 1Z..W..325 | L | TKI |
| 1Z..U..568 | TKI | M | 1Z..U..568 | M | TKI |
| 1Z..O..633 | OZK | H | 1Z..O..633 | H | OZK |
| 1Z..L..220 | OZK | N | 1Z..L..220 | N | OZK |
| 1Z..H..117 | OZK | Q | 1Z..H..117 | Q | OZK |
| 1Z..K..555 | OZK | S | 1Z..K..555 | S | OZK |
| 1Z..O..100 | JZJ | B | 1Z..O..100 | B | JZJ |
| 1Z..J..253 | JZJ | D | 1Z..J..253 | D | JZJ |
| 1Z..E..200 | TKI | L | 1Z..E..200 | L | TKI |
| 1Z..E..141 | TKI | N | 1Z..E..141 | N | TKI |
| 1Z..G..955 | JZJ | H | 1Z..G..955 | H | JZJ |
| 1Z..A..337 | JZJ | N | 1Z..A..337 | N | JZJ |
| 1Z..L..569 | OZK | B | 1Z..L..569 | B | OZK |
| 1Z..B..505 | OZK | D | 1Z..B..505 | D | OZK |
| 1Z..W..585 | OZK | C | 1Z..W..585 | C | OZK |
| 1Z..W..633 | OZK | D | 1Z..W..633 | D | OZK |
|  |  |  | 1Z..N..863 | E | YTM |
|  |  |  | 1Z..Q..579 | G | YTM |
| 1Z..W..356 | OZK | C | 1Z..W..356 | C | OZK |

Fig. 7-5

| | | | | | |
|---|---|---|---|---|---|
| 1Z..D..139 | OZK | D | 1Z..D..139 | D | OZK |
| 1Z..Z..283 | JZJ | B | 1Z..Z..283 | B | JZJ |
| 1Z..U..720 | JZJ | F | 1Z..U..720 | F | JZJ |
| 1Z..M..722 | JZJ | F | 1Z..M..722 | F | JZJ |
| 1Z..G..892 | JZJ | S | 1Z..G..892 | S | JZJ |
| 1Z..H..309 | TKI | L | 1Z..H..309 | L | TKI |
| 1Z..R..975 | TKI | M | 1Z..R..975 | M | TKI |
| 1Z..T..177 | OZK | A | 1Z..T..177 | A | OZK |
| 1Z..T..463 | OZK | Q | 1Z..T..463 | Q | OZK |
| | | | 1Z..G..953 | E | CEP |
| | | | 1Z..E..616 | G | CEP |
| 1Z..Y..122 | OZK | B | 1Z..Y..122 | B | OZK |
| 1Z..S..503 | OZK | D | 1Z..S..503 | D | OZK |
| 1Z..O..530 | CUL | M | 1Z..O..530 | M | CUL |
| 1Z..T..481 | CUL | U | 1Z..T..481 | U | CUL |
| 1Z..T..838 | TKI | A | 1Z..T..838 | A | TKI |
| 1Z..K..851 | TKI | A | 1Z..K..851 | A | TKI |
| 1Z..D..352 | TKI | A | 1Z..D..352 | A | TKI |
| 1Z..A..825 | TKI | A | 1Z..A..825 | A | TKI |
| 1Z..Y..506 | PMY | L | 1Z..Y..506 | L | PMY |
| 1Z..D..566 | PMY | R | 1Z..D..566 | R | PMY |
| 1Z..U..270 | JZJ | Q | 1Z..U..270 | Q | JZJ |
| 1Z..D..991 | JZJ | S | 1Z..D..991 | S | JZJ |
| 1Z..K..137 | JZJ | F | 1Z..K..137 | F | JZJ |
| 1Z..K..541 | JZJ | S | 1Z..K..541 | S | JZJ |
| 1Z..Y..504 | OZK | Q | 1Z..Y..504 | Q | OZK |
| 1Z..P..490 | OZK | S | 1Z..P..490 | S | OZK |
| 1Z..J..802 | JZJ | B | 1Z..J..802 | B | JZJ |
| 1Z..A..526 | JZJ | N | 1Z..A..526 | N | JZJ |
| 1Z..O..698 | OZK | H | 1Z..O..698 | H | OZK |
| 1Z..L..504 | OZK | N | 1Z..L..504 | N | OZK |
| 1Z..Y..902 | JZJ | B | 1Z..Y..902 | B | JZJ |
| 1Z..I..465 | JZJ | D | 1Z..I..465 | D | JZJ |
| 1Z..L..889 | VUS | E | 1Z..L..889 | E | VUS |
| 1Z..Q..621 | VUS | G | 1Z..Q..621 | G | VUS |
| 1Z..W..960 | PMY | A | 1Z..W..960 | A | PMY |
| 1Z..P..390 | PMY | C | 1Z..P..390 | C | PMY |
| 1Z..O..252 | TKI | C | 1Z..O..252 | C | TKI |
| 1Z..K..204 | TKI | D | 1Z..K..204 | D | TKI |
| 1Z..M..237 | TKI | H | 1Z..M..237 | H | TKI |
| 1Z..T..132 | VUS | E | 1Z..T..132 | E | VUS |
| 1Z..D..475 | VUS | G | 1Z..D..475 | G | VUS |
| | | | | | |

Fig. 7-6

| ITERATION # 4 ||||||
|---|---|---|---|---|---|
| Step 62: Retrieve List of Tracking Numbers with the Same Delivery Pattern Code as the Mining Key 40 ||| Step 68: Find Tracking Numbers for Each Parcel having the Same Ship-To Address as the Records Found in Step 62 |||
| Packages Found: || 77 | Packages Found: || 77 |
| Unique Ship-to Addresses: || 15 | Unique Ship-to Addresses: || 15 |
| Tracking Number | Delivery Pattern Code | Ship-To Address | Tracking Number | Ship-To Address | Delivery Pattern Code |
| 1Z..R..350 | VUS | E | 1Z..R..350 | E | VUS |
| 1Z..I..758 | VUS | G | 1Z..I..758 | G | VUS |
| 1Z..C..460 | TKI | A | 1Z..C..460 | A | TKI |
| 1Z..N..217 | TKI | C | 1Z..N..217 | C | TKI |
| 1Z..N..479 | VUS | E | 1Z..N..479 | E | VUS |
| 1Z..R..480 | VUS | G | 1Z..R..480 | G | VUS |
| 1Z..K..286 | JZJ | F | 1Z..K..286 | F | JZJ |
| 1Z..O..664 | JZJ | R | 1Z..O..664 | R | JZJ |
| 1Z..A..990 | JZJ | H | 1Z..A..990 | H | JZJ |
| 1Z..D..243 | JZJ | N | 1Z..D..243 | N | JZJ |
| 1Z..E..826 | TKI | A | 1Z..E..826 | A | TKI |
| 1Z..M..671 | TKI | B | 1Z..M..671 | B | TKI |
| 1Z..B..119 | TKI | A | 1Z..B..119 | A | TKI |
| 1Z..W..431 | TKI | B | 1Z..W..431 | B | TKI |
| 1Z..S..473 | VUS | A | 1Z..S..473 | A | VUS |
| 1Z..C..429 | VUS | C | 1Z..C..429 | C | VUS |
| 1Z..W..325 | TKI | L | 1Z..W..325 | L | TKI |
| 1Z..U..568 | TKI | M | 1Z..U..568 | M | TKI |
| 1Z..O..633 | OZK | H | 1Z..O..633 | H | OZK |
| 1Z..L..220 | OZK | N | 1Z..L..220 | N | OZK |
| 1Z..H..117 | OZK | Q | 1Z..H..117 | Q | OZK |
| 1Z..K..555 | OZK | S | 1Z..K..555 | S | OZK |
| 1Z..O..100 | JZJ | B | 1Z..O..100 | B | JZJ |
| 1Z..J..253 | JZJ | D | 1Z..J..253 | D | JZJ |
| 1Z..E..200 | TKI | L | 1Z..E..200 | L | TKI |
| 1Z..E..141 | TKI | N | 1Z..E..141 | N | TKI |
| 1Z..G..955 | JZJ | H | 1Z..G..955 | H | JZJ |
| 1Z..A..337 | JZJ | N | 1Z..A..337 | N | JZJ |
| 1Z..L..569 | OZK | B | 1Z..L..569 | B | OZK |
| 1Z..B..505 | OZK | D | 1Z..B..505 | D | OZK |
| 1Z..W..585 | OZK | C | 1Z..W..585 | C | OZK |
| 1Z..W..633 | OZK | D | 1Z..W..633 | D | OZK |
| 1Z..N..863 | YTM | E | 1Z..N..863 | E | YTM |
| 1Z..Q..579 | YTM | G | 1Z..Q..579 | G | YTM |

Fig. 7-7

| 1Z..W..356 | OZK | C | 1Z..W..356 | C | OZK |
| 1Z..D..139 | OZK | D | 1Z..D..139 | D | OZK |
| 1Z..Z..283 | JZJ | B | 1Z..Z..283 | B | JZJ |
| 1Z..U..720 | JZJ | F | 1Z..U..720 | F | JZJ |
| 1Z..M..722 | JZJ | F | 1Z..M..722 | F | JZJ |
| 1Z..G..892 | JZJ | S | 1Z..G..892 | S | JZJ |
| 1Z..H..309 | TKI | L | 1Z..H..309 | L | TKI |
| 1Z..R..975 | TKI | M | 1Z..R..975 | M | TKI |
| 1Z..T..177 | OZK | A | 1Z..T..177 | A | OZK |
| 1Z..T..463 | OZK | Q | 1Z..T..463 | Q | OZK |
| 1Z..G..953 | CEP | E | 1Z..G..953 | E | CEP |
| 1Z..E..616 | CEP | G | 1Z..E..616 | G | CEP |
| 1Z..Y..122 | OZK | B | 1Z..Y..122 | B | OZK |
| 1Z..S..503 | OZK | D | 1Z..S..503 | D | OZK |
| 1Z..O..530 | CUL | M | 1Z..O..530 | M | CUL |
| 1Z..T..481 | CUL | U | 1Z..T..481 | U | CUL |
| 1Z..T..838 | TKI | A | 1Z..T..838 | A | TKI |
| 1Z..K..851 | TKI | A | 1Z..K..851 | A | TKI |
| 1Z..D..352 | TKI | A | 1Z..D..352 | A | TKI |
| 1Z..A..825 | TKI | A | 1Z..A..825 | A | TKI |
| 1Z..Y..506 | PMY | L | 1Z..Y..506 | L | PMY |
| 1Z..D..566 | PMY | R | 1Z..D..566 | R | PMY |
| 1Z..U..270 | JZJ | Q | 1Z..U..270 | Q | JZJ |
| 1Z..D..991 | JZJ | S | 1Z..D..991 | S | JZJ |
| 1Z..K..137 | JZJ | F | 1Z..K..137 | F | JZJ |
| 1Z..K..541 | JZJ | S | 1Z..K..541 | S | JZJ |
| 1Z..Y..504 | OZK | Q | 1Z..Y..504 | Q | OZK |
| 1Z..P..490 | OZK | S | 1Z..P..490 | S | OZK |
| 1Z..J..802 | JZJ | B | 1Z..J..802 | B | JZJ |
| 1Z..A..526 | JZJ | N | 1Z..A..526 | N | JZJ |
| 1Z..O..698 | OZK | H | 1Z..O..698 | H | OZK |
| 1Z..L..504 | OZK | N | 1Z..L..504 | N | OZK |
| 1Z..Y..902 | JZJ | B | 1Z..Y..902 | B | JZJ |
| 1Z..I..465 | JZJ | D | 1Z..I..465 | D | JZJ |
| 1Z..L..889 | VUS | E | 1Z..L..889 | E | VUS |
| 1Z..Q..621 | VUS | G | 1Z..Q..621 | G | VUS |
| 1Z..W..960 | PMY | A | 1Z..W..960 | A | PMY |
| 1Z..P..390 | PMY | C | 1Z..P..390 | C | PMY |
| 1Z..O..252 | TKI | C | 1Z..O..252 | C | TKI |
| 1Z..K..204 | TKI | D | 1Z..K..204 | D | TKI |
| 1Z..M..237 | TKI | H | 1Z..M..237 | H | TKI |
| 1Z..T..132 | VUS | E | 1Z..T..132 | E | VUS |
| 1Z..D..475 | VUS | G | 1Z..D..475 | G | VUS |

Fig. 7-8

Table 1.
Mined Data from Iteration #4
(Sorted by Stop Identifier)

| Ship-to Address | Stop Identifier | Tracking Number | Delivery Driver | Delivery Pattern Code | Signature Clarification |
|---|---|---|---|---|---|
| E | B1Q | 1Z..R..350 | RUIZ | VUS | Gramm |
| G | B1Q | 1Z..I..758 | RUIZ | VUS | Gramm |
| A | D0P | 1Z..C..460 | JANOVSKI | TKI | Bergeron |
| C | D0P | 1Z..N..217 | JANOVSKI | TKI | Bergeron |
| E | D5V | 1Z..N..479 | SIMONS | VUS | Lloyd |
| G | D5V | 1Z..R..480 | SIMONS | VUS | Lloyd |
| F | D7Q | 1Z..K..286 | JANOVSKI | JZJ | Choi |
| R | D7Q | 1Z..O..664 | JANOVSKI | JZJ | Choi |
| H | F0T | 1Z..A..990 | JANOVSKI | JZJ | Amy |
| N | F0T | 1Z..D..243 | JANOVSKI | JZJ | Amy |
| A | G2G | 1Z..E..826 | SMITH | TKI | Amy |
| B | G2G | 1Z..M..671 | SMITH | TKI | Amy |
| A | G2I | 1Z..B..119 | JANOVSKI | TKI | Bergeron |
| B | G2I | 1Z..W..431 | JANOVSKI | TKI | Bergeron |
| *A* | *H4S* | *1Z..S..473* | *JANOVSKI* | *VUS* | *Bergeron* |
| *C* | *H4S* | *1Z..C..429* | *JANOVSKI* | *VUS* | *Bergeron* |
| L | I1R | 1Z..W..325 | JANOVSKI | TKI | Bergeron |
| M | I1R | 1Z..U..568 | JANOVSKI | TKI | Bergeron |
| H | J0G | 1Z..O..633 | JANOVSKI | OZK | Amy |
| N | J0G | 1Z..L..220 | JANOVSKI | OZK | Amy |
| Q | K9I | 1Z..H..117 | JANOVSKI | OZK | Bergeron |
| S | K9I | 1Z..K..555 | JANOVSKI | OZK | Bergeron |
| B | L2I | 1Z..O..100 | JANOVSKI | JZJ | Amy |
| D | L2I | 1Z..J..253 | JANOVSKI | JZJ | Amy |
| L | L8P | 1Z..E..200 | JANOVSKI | TKI | White |
| N | L8P | 1Z..E..141 | JANOVSKI | TKI | White |
| H | M3K | 1Z..G..955 | JANOVSKI | JZJ | Smit |
| N | M3K | 1Z..A..337 | JANOVSKI | JZJ | Smit |
| B | M9P | 1Z..L..569 | JANOVSKI | OZK | Bergeron |
| D | M9P | 1Z..B..505 | JANOVSKI | OZK | Bergeron |
| C | N2Q | 1Z..W..585 | BEATTY | OZK | Bergeron |
| D | N2Q | 1Z..W..633 | BEATTY | OZK | Bergeron |
| E | N4H | 1Z..N..863 | SIMONS | YTM | Chris |
| G | N4H | 1Z..Q..579 | SIMONS | YTM | Chris |
| C | N4S | 1Z..W..356 | BEATTY | OZK | Bergeron |
| D | N4S | 1Z..D..139 | BEATTY | OZK | Bergeron |
| B | N8P | 1Z..Z..283 | JANOVSKI | JZJ | White |

Fig. 8-1

| Ship-to Address | Stop Identifier | Tracking Number | Delivery Driver | Delivery Pattern Code | Signature Clarification |
|---|---|---|---|---|---|
| F | N8P | 1Z..U..720 | JANOVSKI | JZJ | White |
| F | O8E | 1Z..M..722 | JANOVSKI | JZJ | Amy |
| S | O8E | 1Z..G..892 | JANOVSKI | JZJ | Amy |
| L | P4H | 1Z..H..309 | JANOVSKI | TKI | White |
| M | P4H | 1Z..R..975 | JANOVSKI | TKI | White |
| A | Q8W | 1Z..T..177 | JANOVSKI | OZK | Amy |
| Q | Q8W | 1Z..T..463 | JANOVSKI | OZK | Amy |
| E | R1E | 1Z..G..953 | RUIZ | CEP | Yoe |
| G | R1E | 1Z..E..616 | RUIZ | CEP | Yoe |
| B | R1P | 1Z..Y..122 | JANOVSKI | OZK | Amy |
| D | R1P | 1Z..S..503 | JANOVSKI | OZK | Amy |
| *M* | *S3I* | *1Z..O..530* | *SMITH* | *CUL* | *Davis* |
| *U* | *S3I* | *1Z..T..481* | *SMITH* | *CUL* | *Davis* |
| A | S4T | 1Z..T..838 | JANOVSKI | TKI | Bergeron |
| A | S4T | 1Z..K..851 | JANOVSKI | TKI | Bergeron |
| A | S4T | 1Z..D..352 | JANOVSKI | TKI | Bergeron |
| A | S4T | 1Z..A..825 | JANOVSKI | TKI | Bergeron |
| L | S9L | 1Z..Y..506 | JANOVSKI | PMY | Bergeron |
| R | S9L | 1Z..D..566 | JANOVSKI | PMY | Bergeron |
| Q | S9P | 1Z..U..270 | JANOVSKI | JZJ | Bergeron |
| S | S9P | 1Z..D..991 | JANOVSKI | JZJ | Bergeron |
| F | W1J | 1Z..K..137 | JANOVSKI | JZJ | Bergeron |
| S | W1J | 1Z..K..541 | JANOVSKI | JZJ | Bergeron |
| Q | W4E | 1Z..Y..504 | JANOVSKI | OZK | White |
| S | W4E | 1Z..P..490 | JANOVSKI | OZK | White |
| B | W4M | 1Z..J..802 | JANOVSKI | JZJ | Smit |
| N | W4M | 1Z..A..526 | JANOVSKI | JZJ | Smit |
| H | W5J | 1Z..O..698 | JANOVSKI | OZK | Bergeron |
| N | W5J | 1Z..L..504 | JANOVSKI | OZK | Bergeron |
| B | X5E | 1Z..Y..902 | JANOVSKI | JZJ | Smit |
| D | X5E | 1Z..I..465 | JANOVSKI | JZJ | Smit |
| E | X9P | 1Z..L..889 | SIMONS | VUS | Lloyd |
| G | X9P | 1Z..Q..621 | SIMONS | VUS | Lloyd |
| A | Y2F | 1Z..W..960 | JANOVSKI | PMY | Brgeron |
| C | Y2F | 1Z..P..390 | JANOVSKI | PMY | Brgeron |
| C | Y3B | 1Z..O..252 | JANOVSKI | TKI | Bergeron |
| D | Y3B | 1Z..K..204 | JANOVSKI | TKI | Bergeron |
| H | Y3B | 1Z..M..237 | JANOVSKI | TKI | Bergeron |
| E | Y4S | 1Z..T..132 | SIMONS | VUS | Chris |
| G | Y4S | 1Z..D..475 | SIMONS | VUS | Chris |

Fig. 8-2

Table 2.
Mined Data from Iteration #4
(Sorted by Delivery Pattern Code)

| Ship-to Address | Stop Identifier | Tracking Number | Delivery Driver | Delivery Pattern Code | Signature Clarification |
|---|---|---|---|---|---|
| E | R1E | 1Z..G..953 | RUIZ | CEP | Yoe |
| G | R1E | 1Z..E..616 | RUIZ | CEP | Yoe |
| *M* | *S3I* | *1Z..O..530* | *SMITH* | *CUL* | *Davis* |
| *U* | *S3I* | *1Z..T..481* | *SMITH* | *CUL* | *Davis* |
| B | L2I | 1Z..O..100 | JANOVSKI | JZJ | Amy |
| B | N8P | 1Z..Z..283 | JANOVSKI | JZJ | White |
| B | W4M | 1Z..J..802 | JANOVSKI | JZJ | Smit |
| B | X5E | 1Z..Y..902 | JANOVSKI | JZJ | Smit |
| D | L2I | 1Z..J..253 | JANOVSKI | JZJ | Amy |
| D | X5E | 1Z..I..465 | JANOVSKI | JZJ | Smit |
| F | D7Q | 1Z..K..286 | JANOVSKI | JZJ | Choi |
| F | N8P | 1Z..U..720 | JANOVSKI | JZJ | White |
| F | O8E | 1Z..M..722 | JANOVSKI | JZJ | Amy |
| F | W1J | 1Z..K..137 | JANOVSKI | JZJ | Bergeron |
| H | F0T | 1Z..A..990 | JANOVSKI | JZJ | Amy |
| H | M3K | 1Z..G..955 | JANOVSKI | JZJ | Smit |
| N | F0T | 1Z..D..243 | JANOVSKI | JZJ | Amy |
| N | M3K | 1Z..A..337 | JANOVSKI | JZJ | Smit |
| N | W4M | 1Z..A..526 | JANOVSKI | JZJ | Smit |
| Q | S9P | 1Z..U..270 | JANOVSKI | JZJ | Bergeron |
| R | D7Q | 1Z..O..664 | JANOVSKI | JZJ | Choi |
| S | O8E | 1Z..G..892 | JANOVSKI | JZJ | Amy |
| S | S9P | 1Z..D..991 | JANOVSKI | JZJ | Bergeron |
| S | W1J | 1Z..K..541 | JANOVSKI | JZJ | Bergeron |
| A | Q8W | 1Z..T..177 | JANOVSKI | OZK | Amy |
| B | M9P | 1Z..L..569 | JANOVSKI | OZK | Bergeron |
| B | R1P | 1Z..Y..122 | JANOVSKI | OZK | Amy |
| C | N2Q | 1Z..W..585 | BEATTY | OZK | Bergeron |
| C | N4S | 1Z..W..356 | BEATTY | OZK | Bergeron |
| D | M9P | 1Z..B..505 | JANOVSKI | OZK | Bergeron |
| D | N2Q | 1Z..W..633 | BEATTY | OZK | Bergeron |
| D | N4S | 1Z..D..139 | BEATTY | OZK | Bergeron |
| D | R1P | 1Z..S..503 | JANOVSKI | OZK | Amy |
| H | J0G | 1Z..O..633 | JANOVSKI | OZK | Amy |
| H | W5J | 1Z..O..698 | JANOVSKI | OZK | Bergeron |
| N | J0G | 1Z..L..220 | JANOVSKI | OZK | Amy |
| N | W5J | 1Z..L..504 | JANOVSKI | OZK | Bergeron |

Fig. 8-3

| Ship-to Address | Stop Identifier | Tracking Number | Delivery Driver | Delivery Pattern Code | Signature Clarification |
|---|---|---|---|---|---|
| Q | K9I | 1Z..H..117 | JANOVSKI | OZK | Bergeron |
| Q | Q8W | 1Z..T..463 | JANOVSKI | OZK | Amy |
| Q | W4E | 1Z..Y..504 | JANOVSKI | OZK | White |
| S | K9I | 1Z..K..555 | JANOVSKI | OZK | Bergeron |
| S | W4E | 1Z..P..490 | JANOVSKI | OZK | White |
| A | Y2F | 1Z..W..960 | JANOVSKI | PMY | Brgeron |
| C | Y2F | 1Z..P..390 | JANOVSKI | PMY | Brgeron |
| L | S9L | 1Z..Y..506 | JANOVSKI | PMY | Bergeron |
| R | S9L | 1Z..D..566 | JANOVSKI | PMY | Bergeron |
| A | D0P | 1Z..C..460 | JANOVSKI | TKI | Bergeron |
| A | G2G | 1Z..E..826 | SMITH | TKI | Amy |
| A | G2I | 1Z..B..119 | JANOVSKI | TKI | Bergeron |
| A | S4T | 1Z..T..838 | JANOVSKI | TKI | Bergeron |
| A | S4T | 1Z..K..851 | JANOVSKI | TKI | Bergeron |
| A | S4T | 1Z..D..352 | JANOVSKI | TKI | Bergeron |
| A | S4T | 1Z..A..825 | JANOVSKI | TKI | Bergeron |
| B | G2G | 1Z..M..671 | SMITH | TKI | Amy |
| B | G2I | 1Z..W..431 | JANOVSKI | TKI | Bergeron |
| C | D0P | 1Z..N..217 | JANOVSKI | TKI | Bergeron |
| C | Y3B | 1Z..O..252 | JANOVSKI | TKI | Bergeron |
| D | Y3B | 1Z..K..204 | JANOVSKI | TKI | Bergeron |
| H | Y3B | 1Z..M..237 | JANOVSKI | TKI | Bergeron |
| L | I1R | 1Z..W..325 | JANOVSKI | TKI | Bergeron |
| L | L8P | 1Z..E..200 | JANOVSKI | TKI | White |
| L | P4H | 1Z..H..309 | JANOVSKI | TKI | White |
| M | I1R | 1Z..U..568 | JANOVSKI | TKI | Bergeron |
| M | P4H | 1Z..R..975 | JANOVSKI | TKI | White |
| N | L8P | 1Z..E..141 | JANOVSKI | TKI | White |
| *A* | *H4S* | *1Z..S..473* | *JANOVSKI* | *VUS* | *Bergeron* |
| *C* | *H4S* | *1Z..C..429* | *JANOVSKI* | *VUS* | *Bergeron* |
| E | B1Q | 1Z..R..350 | RUIZ | VUS | Gramm |
| E | D5V | 1Z..N..479 | SIMONS | VUS | Lloyd |
| E | X9P | 1Z..L..889 | SIMONS | VUS | Lloyd |
| E | Y4S | 1Z..T..132 | SIMONS | VUS | Chris |
| G | B1Q | 1Z..I..758 | RUIZ | VUS | Gramm |
| G | D5V | 1Z..R..480 | SIMONS | VUS | Lloyd |
| G | X9P | 1Z..Q..621 | SIMONS | VUS | Lloyd |
| G | Y4S | 1Z..D..475 | SIMONS | VUS | Chris |
| E | N4H | 1Z..N..863 | SIMONS | YTM | Chris |
| G | N4H | 1Z..Q..579 | SIMONS | YTM | Chris |

Fig. 8-4

Delivery Pattern Code vs. Ship-To Address Counts:

| Delivery Pattern Codes | Ship-To Addresses | | | | | | | | | | | | | | |
|---|---|---|---|---|---|---|---|---|---|---|---|---|---|---|---|
| | A | B | C | D | E | F | G | H | L | M | N | Q | S | R | U |
| YTM | | | | | 1 | | 1 | | | | | | | | |
| VUS | 1 | | 1 | | 4 | | 4 | | | | | | | | |
| TKI | 7 | 2 | 2 | 1 | | | | 1 | 3 | 2 | 1 | | | | |
| PMY | 1 | | 1 | | | | | | 1 | | | | | 1 | |
| OZK | 1 | 2 | 2 | 4 | | | | 2 | | | 2 | 3 | 2 | | |
| JZJ | | 4 | | 2 | | 4 | | 2 | | | 3 | 1 | 3 | 1 | |
| CUL | | | | | | | | | | 1 | | | | | 1 |
| CEP | | | | | 1 | | 1 | | | | | | | | |
| Sum: | 10 | 8 | 6 | 7 | 6 | 4 | 6 | 5 | 4 | 3 | 6 | 4 | 5 | 2 | 1 |

Delivery Pattern Similarity Matrix:

| | B | C | D | E | F | G | H | L | M | N | Q | S | R | U |
|---|---|---|---|---|---|---|---|---|---|---|---|---|---|---|
| A | 3 | 5 | 2 | 1 | | 1 | 2 | 4 | 2 | 2 | 1 | 1 | 1 | |
| B | | 4 | 5 | | 4 | | 5 | 2 | 2 | 6 | 3 | 5 | 1 | |
| C | | | 3 | 1 | | 1 | 3 | 3 | 2 | 3 | 2 | 2 | 1 | |
| D | | | | | 2 | | 5 | 1 | 1 | 5 | 4 | 4 | 1 | |
| E | | | | | | 6 | | | | | | | | |
| F | | | | | | | 2 | | | 3 | 1 | 3 | 1 | |
| G | | | | | | | | | | | | | | |
| H | | | | | | | | | | 1 | 1 | 5 | | 1 |
| L | | | | | | | | | | 2 | 1 | | 1 | |
| M | | | | | | | | | | | 1 | | | 1 |
| N | | | | | | | | | | | 3 | 5 | 1 | |
| Q | | | | | | | | | | | | 3 | 1 | |
| S | | | | | | | | | | | | | 1 | |
| R | | | | | | | | | | | | | | |

Fig. 10

Stop Identifier vs. Ship-To Address Counts:

| Stop Identifiers | A | B | C | D | E | F | G | H | L | M | N | Q | S | R | U |
|---|---|---|---|---|---|---|---|---|---|---|---|---|---|---|---|
| Y4S |   |   |   |   | 1 |   | 1 |   |   |   |   |   |   |   |   |
| Y3B |   |   | 1 | 1 |   |   |   | 1 |   |   |   |   |   |   |   |
| Y2F | 1 |   | 1 |   |   |   |   |   |   |   |   |   |   |   |   |
| X9P |   |   |   |   | 1 |   | 1 |   |   |   |   |   |   |   |   |
| X5E |   | 1 |   | 1 |   |   |   |   |   |   |   |   |   |   |   |
| W5J |   |   |   |   |   |   |   | 1 |   |   | 1 |   |   |   |   |
| W4M |   | 1 |   |   |   |   |   |   |   |   | 1 |   |   |   |   |
| W4E |   |   |   |   |   |   |   |   |   |   |   | 1 | 1 |   |   |
| W1J |   |   |   |   |   | 1 |   |   |   |   |   |   |   | 1 |   |
| S9P |   |   |   |   |   |   |   |   |   |   |   | 1 | 1 |   |   |
| S9L |   |   |   |   |   |   |   |   | 1 |   |   |   |   | 1 |   |
| S4T | 4 |   |   |   |   |   |   |   |   |   |   |   |   |   |   |
| S3I |   |   |   |   |   |   |   |   |   | 1 |   |   |   |   | 1 |
| R1P |   | 1 |   | 1 |   |   |   |   |   |   |   |   |   |   |   |
| R1E |   |   |   |   | 1 |   | 1 |   |   |   |   |   |   |   |   |
| Q8W | 1 |   |   |   |   |   |   |   |   |   |   |   | 1 |   |   |
| P4H |   |   |   |   |   |   |   |   | 1 | 1 |   |   |   |   |   |
| O8E |   |   |   |   | 1 |   |   |   |   |   |   |   | 1 |   |   |
| N8P |   | 1 |   |   |   | 1 |   |   |   |   |   |   |   |   |   |
| N4S |   |   | 1 | 1 |   |   |   |   |   |   |   |   |   |   |   |
| N4H |   |   |   |   | 1 |   | 1 |   |   |   |   |   |   |   |   |
| N2Q |   |   | 1 | 1 |   |   |   |   |   |   |   |   |   |   |   |
| M9P |   | 1 |   | 1 |   |   |   |   |   |   |   |   |   |   |   |
| M3K |   |   |   |   |   |   |   |   | 1 |   | 1 |   |   |   |   |
| L8P |   |   |   |   |   |   |   |   |   | 1 | 1 |   |   |   |   |
| L2I |   | 1 |   | 1 |   |   |   |   |   |   |   |   |   |   |   |
| K9I |   |   |   |   |   |   |   |   |   |   |   | 1 | 1 |   |   |
| J0G |   |   |   |   |   |   |   |   | 1 |   | 1 |   |   |   |   |
| I1R |   |   |   |   |   |   |   |   | 1 | 1 |   |   |   |   |   |
| H4S | 1 |   | 1 |   |   |   |   |   |   |   |   |   |   |   |   |
| G2I | 1 | 1 |   |   |   |   |   |   |   |   |   |   |   |   |   |
| G2G | 1 | 1 |   |   |   |   |   |   |   |   |   |   |   |   |   |
| F0T |   |   |   |   |   |   |   |   | 1 |   | 1 |   |   |   |   |
| D7Q |   |   |   |   |   | 1 |   |   |   |   |   |   |   | 1 |   |
| D5V |   |   |   |   | 1 |   | 1 |   |   |   |   |   |   |   |   |
| D0P | 1 |   | 1 |   |   |   |   |   |   |   |   |   |   |   |   |
| B1Q |   |   |   |   | 1 |   | 1 |   |   |   |   |   |   |   |   |

Fig. 11-1

Stop Similarity Matrix:

|   | B | C | D | E | F | G | H | L | M | N | Q | S | R | U |
|---|---|---|---|---|---|---|---|---|---|---|---|---|---|---|
| A | 2 | 3 |   |   |   |   |   |   |   |   | 1 |   |   |   |
| B |   |   | 4 |   | 1 |   |   |   |   | 1 |   |   |   |   |
| C |   |   | 3 |   |   | 1 |   |   |   |   |   |   |   |   |
| D |   |   |   |   |   | 1 |   |   |   |   |   |   |   |   |
| E |   |   |   |   |   | 6 |   |   |   |   |   |   |   |   |
| F |   |   |   |   |   |   |   |   |   |   |   | 2 | 1 |   |
| G |   |   |   |   |   |   |   |   |   |   |   |   |   |   |
| H |   |   |   |   |   |   |   |   |   | 4 |   |   |   |   |
| L |   |   |   |   |   |   |   |   | 2 | 1 |   | 1 |   |   |
| M |   |   |   |   |   |   |   |   |   |   |   |   |   | 1 |
| N |   |   |   |   |   |   |   |   |   |   |   |   |   |   |
| Q |   |   |   |   |   |   |   |   |   |   |   | 3 |   |   |
| S |   |   |   |   |   |   |   |   |   |   |   |   |   |   |
| R |   |   |   |   |   |   |   |   |   |   |   |   |   |   |

Fig. 11-2

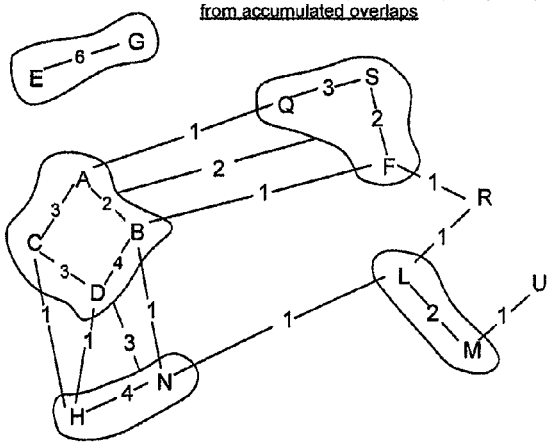
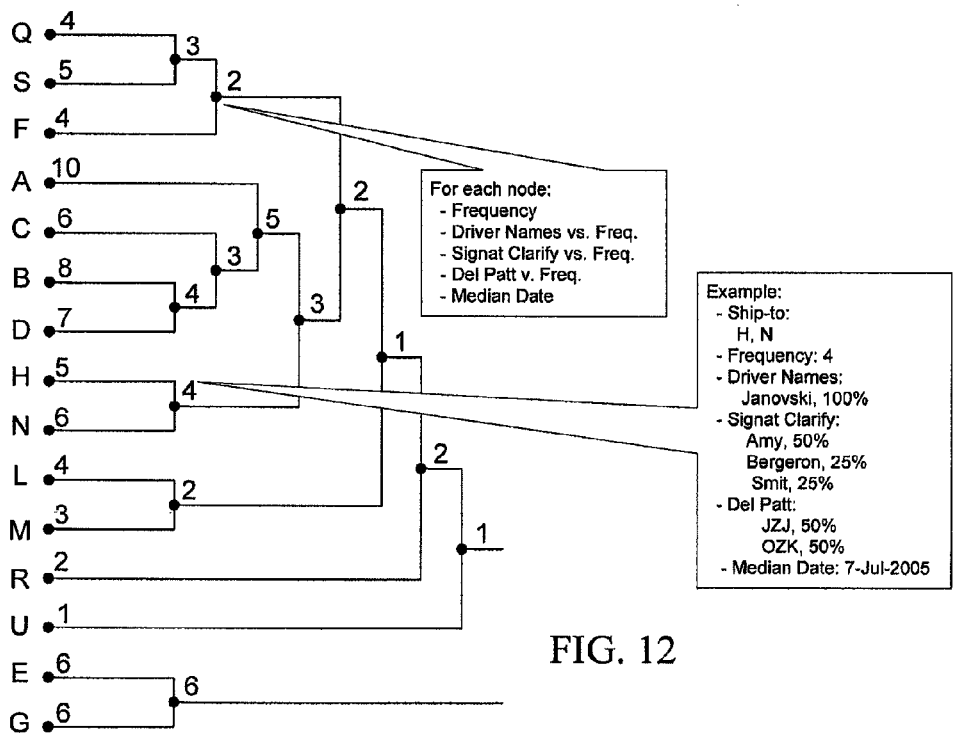
FIG. 12

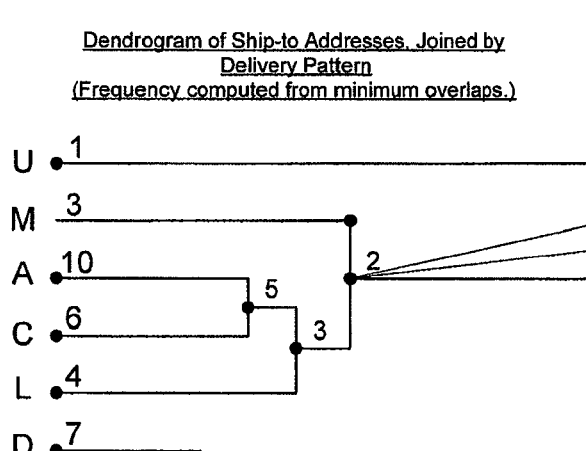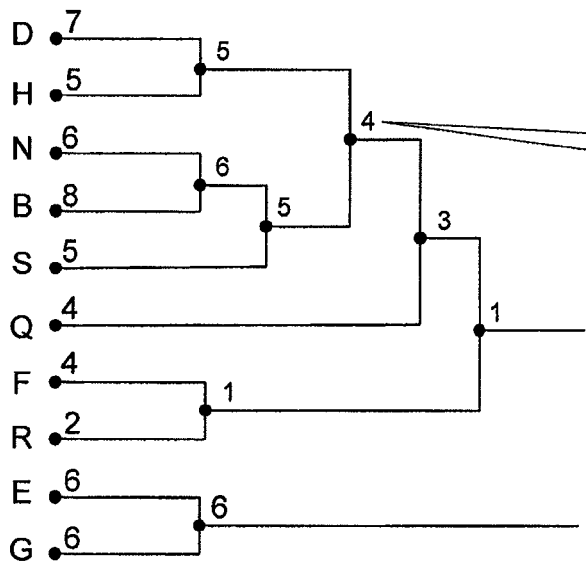
FIG. 14

```
Begin of Dendrogram Output
Consignee Token
Association Type (Initiation, Maintenance)
Data Staging Termination Reason (Init: MaxPass, SlowGrowth, ExcessDelPattGrowth. Maint:
NegCnt, NegRate, NegRateChange).
Number of OPLD Ship-To Patterns (n)
     Dendrogram 1
          Dendrogram Name
          Node 1
               Ship-to Address Pattern (only provided for nodes 1 to n)
               Node Position: { left, right, parent, level }
               Frequency
               Median Date Count, Outcome Value, Delivery Pattern, Driver ID, Driver
               Name, Signat Clarify, Delivery Status, Delivery Stop
               Status,Over-ride Flag, Remarks, Loop/SLIC/Dist/Reg.
                                        :

Count, Outcome Value, Delivery Pattern, Driver ID, Driver
               Name, Signat Clarify, Delivery Status, Delivery Stop
               Status,Over-ride Flag, Remarks, Loop/SLIC/Dist/Reg.
          End Node 1
          Node 2
                                        :
          End Node 2
                :
          Node (2n-1)
                                        :
          End Node (2n-1)
     End Dendrogram 1
     Dendrogram 2
                                        :
     End Dendrogram 2
End of Association Output
```

Fig. 16

Begin of ClusterCruncher Output
Consignee Token
ClusterCruncher Type (Initiation, Maintenance)
Data Staging Termination Reason (Init: MaxPass, SlowGrowth, ExcessDelPattGrowth. Maint: NegCnt, NegRate, NegRateChange).

SuperGroup 1
    Join Reason
    Join Blob
    Confidence (0 to 99)

Group 1
        Join Reason
        Join Blob
        Confidence (0 to 99)

Ship-to Address, Count, Outcome, Median Date.
            :
        Ship-to Address, Count, Outcome, Median Date.

End Group 1

Group 2
        :
    End Group 2
    :
    Group (last)
        :
    End Group (last)

End SuperGroup 1

SuperGroup 2
    :
End SuperGroup 2
    :
SuperGroup (last)
    :
End SuperGroup (last)
End of ClusterCruncher Output

Fig. 20

| P | Address Line 1 | Address Line 2 | Address Line 3 |
|---|---|---|---|
| 1 | . | . | |
| 2 | . | . | |
| 3 | SEE | ADDRESS ON LABEL | |
| 4 | / | / | |
| 5 | SEE ATTACTHED LABEL | ==================== | |
| 6 | 1 | 1 | |
| 7 | | | |
| 8 | SEE | LABEL | |
| 9 | 1 | 1 | 1 |
| 10 | X | X | |
| 11 | SEE SHIPPING | LABEL | |
| 12 | PLEASE SEE SHIP TO | ADDRESS ON THE PRE PRINTED LABEL | |
| 13 | XX | X | |
| 14 | SEE ABOVE ADDRESS | . | . |
| 15 | x | x | |
| 16 | ...... | ...... | |
| 17 | PLEASE SEE SHIP TO | ADRESS ON THE PRE-PRINTED LABEL | |
| 18 | SEE. | LABEL | |
| 19 | * | * | |
| 20 | SEE INVOICE ATTACHED | SEE INVOICE ATTACHED | . |
| 21 | X | X | X |
| 22 | 3 | 3 | 3 |
| 23 | SEE ATTACH | SEE ATTACH | |
| 24 | 1 | 2 | |
| 25 | seeattachlabel | seeatachlabel | |
| 26 | seeattachlabel | seeattachlabel | |
| 27 | SEE ATACHED LABEL | SEE ATACHED LABEL | |
| 28 | SEE | ADDRESS | LABEL |
| 29 | .. | .. | |
| 30 | XX SEE ATTACH LABEL XXXXXXXXX | XXXXXXXXXXXXXXXXXX XXXXXXXXXXXX | |
| 31 | XXXXXXXXXXXXXXXXX | XXXXXXXXXXXXXXXXXX | |
| 32 | x | x | x |
| 33 | L | L | L |
| 34 | SEE | ATTACHED | |
| 35 | 123 | READ ADDRESS | |
| 36 | SEE SHIPPING LABEL | ' | |
| 37 | - | - | - |
| 38 | / | / | / |
| 39 | | | |
| 40 | MUST SEE | LABEL ON PACKAGE | |

Fig. 21-1

| P | Address Line 1 | Address Line 2 | Address Line 3 |
|---|---|---|---|
| 41 | 123 | - | |
| 42 | | | |
| 43 | USE LABEL | USE LABEL | |
| 44 | .......... | ..................... | |
| 45 | 9 | 9 | |
| 46 | BLANK | BLANK | BLANK |
| 47 | ATTACHED SEE | LABEL | |
| 48 | ' | ' | ' |
| 49 | SEE PACKAGE LABEL | SEE PACKAGE LABEL | |
| 50 | (SHIP TO NAME ON CUSTOM LABEL) | (SHIP TO ADDRESS ON CUSTOM LABEL) | |
| 51 | * | * | * |
| 52 | ` | ` | ` |
| 53 | please look at label | PLEASE LOOK AT LABEL | please look at label |
| 54 | XX | XX | |
| 55 | 0 | 2 | |
| 56 | SEE MAILING LABEL | - | |
| 57 | - | - | |
| 58 | 0 | 0 | 0 |
| 59 | PLEASE SEE PACKING SLIP | FOR SHIPPING ADDRESS | |
| 60 | SEE | ADDRESS | |
| 61 | 0 | 0 | |
| 62 | NA | X | |
| 63 | .. | . | . |
| 64 | THE ADDRESS | IS ON THE PACKAGE | |
| 65 | .COMMERCIAL ADDRESS | See Attqached Label | |
| 66 | . | . | |
| 67 | . | . | . |
| 68 | . | .. | |
| 69 | see attatched label | see attatched label | |
| 70 | RESIDENT | STREET ADDRESS | |
| 71 | ... | ... | |
| 72 | see | label | |
| 73 | SEE ATTACH LABEL | SEE ATTACH LABEL | |
| 74 | . | ' | ' |
| 75 | XXXXXXXXXXXXXXXXXXXX XXXXXXXXXXXXXX | X | |
| 76 | TEST | 123 | |
| 77 | test | 123 | |
| 78 | SEE | ADDRESS | ON |
| 79 | + | + | |
| 80 | A | A | |
| 81 | --- | --- | |

Fig. 21-2

| P | Address Line 1 | Address Line 2 | Address Line 3 |
|---|---|---|---|
| 82 | CONSIGNEE COMPANY NAME | CONSIGNEE ADDRESS LINE #1 | |
| 83 | attached see | label | |
| 84 | .. | . | |
| 85 | 3 | 3 | |
| 86 | SEEATTACHLABEL | SEEATACHLABEL | |
| 87 | see othe label | see othe label | |
| 88 | same as label | X | |
| 89 | C | C | |
| 90 | XXXX | XXXX | |
| 91 | ON PACKAGE | XXXXXXXXXXXX | XXXXXXXX |
| 92 | FOR SHIP TO ADDRESS | . | |
| 93 | ..... | . | |
| 94 | | | |
| 95 | TEST | TEST | TEST |
| 96 | A | A | A |
| 97 | 123 | 123 | |
| 98 | `X | X | X |
| 99 | SEEATTACHLABEL | SEEATTACHLABEL | |
| 100 | SEE ATTACHMENT LABEL | SEE ATTACHMENT LABEL | SEE ATTACHMENT LABEL |
| 101 | Q | Q | Q |
| 102 | / | // | |
| 103 | TEST LABEL | Please discard | this test label |
| 104 | .... | . | |
| 105 | see | attached | |
| 106 | .. | .. | .. |
| 107 | | | |
| 108 | XXXXXXXXXXXXXXXXXXXX XXXXXXXXXX | XXXXXXXXXXXXXXXXXXXX XXXXXXXXXX | XXXXXXXXXXXXXXXXXXXX XXXXXXXXXX |
| 109 | XXSEE LISTXX | XXSEE LISTXX | |
| 110 | xx | xx | |
| 111 | T | T | |
| 112 | SEE ATTACT LABEL | SEE ATTACT LABEL | |
| 113 | SEE ADRESS LABEL | SEELABEL | |
| 114 | ... see attach label | .... | |
| 115 | SEE ADRESS LABEL | LABEL | |
| 116 | PLEASE SEE | ATTACHED ADDRESS | LABEL |
| 117 | C | C | C |
| 118 | XXX | XXX | |
| 119 | SEE ATTATCHED LABEL | FOR RETURN ADDRESS | |
| 120 | SAME | SAME | SAME |
| 121 | # | # | |
| 122 | XXX | . | |

Fig. 21-3

| P | Address Line 1 | Address Line 2 | Address Line 3 |
|---|---|---|---|
| 123 | test | test | test |
| 124 | SEE ATTTACHED ADDRESS LABOL | . | |
| 125 | SEE ATTACED ADDRESS | SEE ATTACED ADDRESS | |
| 126 | same as label | XXX | |
| 127 | s | s | s |
| 128 | REFER TO LABEL | REFER TO LABEL | |
| 129 | OTHER | LABEL | |
| 130 | 1 | SEE ATTACH | |
| 131 | / | . | |
| 132 | . | .. | .. |
| 133 | *USE LABELS ATTACHED* | 1 | 1 |
| 134 | XXX | XXX | XXX |
| 135 | x | xx | x |
| 136 | SEE STANDARD REGISTER LABEL | SEE STANDARD REGISTER LABEL | |
| 137 | attached see | res | |
| 138 | XXXX | XXXX | XXXX |
| 139 | XXX | XXXX | XXX |
| 140 | x | x | xx |
| 141 | SEELABEL | SEELABEL | |
| 142 | SEE PRINTED LABEL | SEE PRINTED LABEL | |
| 143 | SEE | ATTACHED | LABEL |
| 144 | SEE | LABEL | . |
| 145 | 9 | 9 | 9 |
| 146 | >>> see attched label | >>> | |
| 147 | >>> | >>> | |
| 148 | = | = | |
| 149 | /` | / | |
| 150 | / | // | / |
| 151 | .` | . | |
| 152 | ...... | . | |
| 153 | .... | . | . |
| 154 | ... | .... | |
| 155 | . | . | ` |
| 156 | . | / | |
| 157 | * | / | |
| 158 | ! | ! | |
| 159 | . | . | |
| 160 | | | |
| 161 | ------------------------- | - | |
| 162 | ------------------------- | --------------- | |
| 163 | -- | -- | -- |

Fig. 21-4

| P | Address Line 1 | Address Line 2 | Address Line 3 |
|---|---|---|---|
| 164 | XXXXXXXXXXXXXXXXXXXX | XXXXXXXXXXXXXXXXXXX | |
| 165 | XXXXX | XXXX | XXX |
| 166 | XXX | XXXX | |
| 167 | XX | X | X |
| 168 | xx | x | x |
| 169 | X | x | |
| 170 | use label | use label | |
| 171 | seeattachlabel | seeattachlabel | seeatachlabel |
| 172 | SEE THE LABEL | . | . |
| 173 | see | . | |
| 174 | attached see | label | |
| 175 | attachlabel | seeatachlabel | |
| 176 | attached see | com | |
| 177 | attached see | LABEL | |
| 178 | ATTACHED SEE | LABRL | |
| 179 | ` | ` | `` |
| 180 | // | / | / |
| 181 | /. | / | |
| 182 | / | / | // |
| 183 | ./ | . | . |
| 184 | ./ | / | |
| 185 | ... | . | . |
| 186 | .. | .. | . |
| 187 | . | | |
| 188 | . | ./ | . |
| 189 | $ | $ | |
| 190 | .. | . | |
| 191 | . | . | . |
| 192 | | . | . |
| 193 | | ` | |
| 194 | ------------------------- | ------ | |
| 195 | ------------------------- | ----------- | |
| 196 | --------------------- | ---------------- | |
| 197 | --------------------- | ------ | |

Fig. 21-5

| TabCounts Table # | Tabulated_Counts Table Name | Description<br>*Count of the packages that were . . .* |
|---|---|---|
| 1 | Delivery Pattern cnt | . . . delivered to each permutation of Delivery Pattern. |
| 2 | Driver ID cnt | . . . delivered by each permutation of Driver ID. |
| 3 | (Sig Clarify) & (Del Pattern) cnt | . . . delivered to each permutation of Delivery Pattern and Signature clarification. |
| 4[1] | OPLD Ship-to cnt | . . . delivered with each permutation of OPLD Ship-To Address. |
| 5[2] | Consig Tok cnt | . . . delivered having each permutation of Consignee Token. |
| 6 | (Delivery Pattern) & (Driver ID) cnt | . . . delivered to each permutation of Delivery Pattern and Driver ID. |
| 7 | (Delivery Pattern) & (any Token) cnt | . . . matched and delivered to each permutation of Delivery Pattern. |
| 8[1] | (Delivery Pattern) & (OPLD Ship-to) cnt | . . . delivered with each permutation of OPLD Ship-To Address and Delivery Pattern. |
| 9[2] | (Delivery Pattern) & (Consig Tok) cnt | . . . delivered to each permutation of Delivery Pattern and Consignee Token. |
| 10 | (Driver ID) & (Sig Clarify) cnt | . . . delivered by each permutation of Driver ID and Signature clarification. |
| 11[1] | (Driver ID) & (OPLD Ship-to) cnt | . . . delivered with each permutation of OPLD Ship-To Address and Driver ID. |
| 12[2] | (Driver ID) & (Consig Tok) cnt | . . . delivered by each permutation of Driver ID and Consignee Token. |
| 13[1] | (OPLD Ship-to) & (Sig Clarify) cnt | . . . delivered with each permutation of OPLD Ship-To Address and Signature clarification. |
| 14[2] | (Consig Tok) & (Sig Clarify) cnt | . . . delivered with each permutation of Consignee Token and Signature clarification. |
| 15 | (Sig Clarify) & (Del Pattern) & (Driver ID) cnt | . . . delivered to each permutation of Delivery Pattern and Signature clarification and Driver ID. |
| 16[2] | (Sig Clarify) & (Del Pattern) & (Consig Tok) cnt | . . . delivered to each permutation of Delivery Pattern and Signature clarification and Consignee Token. |
| 17[2] | Nottokened_codel cnt | . . . not-matched and co-delivered with each permutation of Consignee Token. |
| 18[2] | Difftokened_codel cnt | . . . co-delivered and having a different token for each permutation of Consignee Token. |

[1] Only count if the Ship-To Address repeats more than once per stop.
[2] Only count if the Ship-To Address was matched.

Fig. 23

| Measure Number | TabCounts: Table # | Measure Equations | Possible Indications | Outcome Detection Coefficients (C) | | | | | | | | | | Weight Factors (W) | | | | | | |
|---|---|---|---|---|---|---|---|---|---|---|---|---|---|---|---|---|---|---|---|---|
| | | | | 1 OK | 2 False Positive | 3 Miss | 4 Miss: Persona Pkg. | 5 Miss: Corrupt Address | 6 Miss: Incorrect Driver | 7 OK: Late OPLD | 8 Miss: No OPLD | 9 Miss: Late OPLD | 10 Miss: ZIP Shipped | 1 OK | 2 False Positive | 3 Miss | 4 Miss: Persona Pkg. | 5 Miss: Corrupt Address | 6 Miss: Incorrect Driver | 7 OK: Late OPLD |
| 1 | 6 / 1 | (Delivery Pattern) & (Driver ID) cnt / Delivery Pattern cnt | High means that other drivers do not use this delivery pattern (which may also suggest a mis-recording OR the delivery pattern driver is not yet part of AMS). Extremely low indicates that the driver is new to this common delivery pattern (which may suggest a mis-recording). | H | H | H | | | H | H | - | - | - | 1 | 1 | 1 | | | 1 | 1 |
| 2 | 3 / 1 | (Delivery Pattern) & (Sig Clarify) cnt / Delivery Pattern cnt | High means that other signatures do not use this delivery pattern. Low indicates that the driver mis-recorded the delivery pattern OR mis-recorded the signature OR the signer is unusual. | H | H | H | | | L | H | - | - | - | 1 | 1 | 1 | | | 1 | 1 |
| 3 | 8 / 1 | (Delivery Pattern) & (OPLD Ship-to) cnt / Delivery Pattern cnt | High means that this delivery pattern does not have many other ship-to addresses. Low means lots of other ship-tos use this delivery pattern. | H | - | H | | | L | H | - | - | - | 1 | 0 | 1 | | | 1 | 1 |

Fig. 24-1

| Measure Number | TabCounts: Table # | Measure Equations | Possible Indications | \multicolumn{10}{c}{Outcome Detection Coefficients (C)} | \multicolumn{7}{c}{Weight Factors (W)} |
|---|---|---|---|---|---|---|---|---|---|---|---|---|---|---|---|---|---|---|---|---|
| | | | | 1 OK | 2 False Positive | 3 Miss | 4 Miss: Persona Pkg. | 5 Miss: Corrupt | 6 Miss: Incorrect | 7 OK: Late OPLD | 8 Miss: No OPLD | 9 Miss: Late OPLD | 10 Mis: ZIP Shipped | 1 OK | 2 False Positive | 3 Miss | 4 Miss: Persona Pkg. | 5 Miss: Corrupt | 6 Miss: Incorrect | 7 OK: Late OPLD |
| 4 | 9 / 1 | (Delivery Pattern) & (Consig Tok) cnt / Delivery Pattern cnt | High means that other tokens (or non-tokens) do not use this delivery pattern. Middle might be a clue that other tokens share this delivery pattern. Low might be a clue that the driver mis-delivered the package OR the token is incorrect. | H | L | - | | | - | H | - | - | - | 1 | 1 | 0 | | | 0 | 1 |
| 5 | 6 / 2 | (Delivery ID) & (Delivery Pattern) cnt / Driver ID cnt | High is unusual and means that the driver does not use many other delivery patterns. Average is normal. Extremely low means that the driver hardly ever uses this delivery pattern. | - | - | - | | | L | - | - | - | - | 0 | 0 | 0 | | | 1 | 0 |
| 6 | 10 / 2 | (Driver ID) & (Sig Clarify) cnt / Driver ID cnt | High is unusual and means that the driver does not gather many other signatures. Average is normal. Extremely low means that the driver hardly ever gathers this signature which may mean the signer is unusual for the driver OR the signature was gathered with an error. | - | - | - | | | L | - | - | - | - | 0 | 0 | 0 | | | 1 | 0 |

Fig. 24-2

| Measure Number | Table # / TabCounts | Measure Equations | Possible Indications | Outcome Detection Coefficients (C) | | | | | | | | | | Weight Factors (W) | | | | | | |
|---|---|---|---|---|---|---|---|---|---|---|---|---|---|---|---|---|---|---|---|---|
| | | | | 1 OK | 2 False Positive | 3 Miss | 4 Miss: Persona Pkg. | 5 Miss: Corrupt Address | 6 Miss: Incorrect Driver | 7 OK: Late OPLD | 8 Miss: No OPLD | 9 Miss: Late OPLD | 10 Mis: ZIP Shipped | 1 OK | 2 False Positive | 3 Miss | 4 Miss: Persona Pkg. | 5 Miss: Corrupt Address | 6 Miss: Incorrect Driver | 7 OK: Late OPLD |
| 7 | 11 / 2 | (Driver ID) & (OPLD Ship-to) cnt / Driver ID cnt | High means that this driver does not use many other ship-tos to addresses. Low means lots of other ship-tos are delivered by this driver. | - | - | - | | | L | - | - | - | - | 0 | 0 | 0 | | | 1 | 0 |
| 8 | 12 / 2 | (Driver ID) & (Consig Tok) cnt / Driver ID cnt | High is unusual and means that other tokens (or non-tokens) are not delivered by the driver. Mid indicates that other tokens share this driver. Low indicates that the driver hardly ever delivers this token which could be a clue that the package was mis-sorted OR the driver is new OR the token is incorrect. | - | L | - | | | - | - | - | - | - | 0 | 1 | 0 | | | 0 | 0 |
| 9 | 8 / 4 | (OPLD Ship-to) & (Delivery Pattern) cnt / OPLD Ship-to cnt | High means that the ship-to does not use many other delivery patterns. Middle means that the ship-to uses a variety of delivery patterns. Low could mean that the delivery pattern is mis-recorded OR the package is mis-delivered. | H | - | H | | | L | H | - | - | - | 1 | 0 | 1 | | | 1 | 1 |

Fig. 24-3

| Measure Number | TabCounts: Table # | Measures (M) | | Outcome Detection Coefficients (C) | | | | | | | | | | Weight Factors (W) | | | | | | |
|---|---|---|---|---|---|---|---|---|---|---|---|---|---|---|---|---|---|---|---|---|
| | | Measure Equations | Possible Indications | 1 OK | 2 False Positive | 3 Miss | 4 Miss: Persona Pkg. | 5 Miss: Corrupt | 6 Miss: Incorrect | 7 OK: Late OPLD | 8 Miss: No OPLD | 9 Miss: Late OPLD | 10 Mis: ZIP Shipped | 1 OK | 2 False Positive | 3 Miss | 4 Miss: Persona Pkg. | 5 Miss: Corrupt | 6 Miss: Incorrect | 7 OK: Late OPLD |
| 10 | 11 4 | (OPLD Ship-to) & (Driver ID) cnt / OPLD Ship-to cnt | High means that the ship-to does not use many other drivers. Mid means that the ship-to uses a variety of drivers. Low means that the driver is unusual. | H | - | H | | | L | H | - | - | - | 1 | 0 | 1 | | | 1 | 1 |
| 11 | 13 4 | (OPLD Ship-to) & (Sig Clarify) cnt / OPLD Ship-to cnt | High means that the ship-to does not use many other signatures. Middle means that the ship-to uses a variety of signatures. Low could mean that the signature is mis-recorded OR the package is misdelivered OR the signer is unusual. | H | - | H | | | L | H | - | - | - | 1 | 0 | 1 | | | 1 | 1 |
| 12 | 9 5 | (Consig Tok) & (Delivery Pattern) cnt / Consig Tok cnt | High is normal and means not much variability in delivery patterns for the token. Below average means that various delivery patterns happen for this token. Extremely low indicates that the token hardly ever uses this delivery pattern which could mean: the driver mis-recorded the delivery pattern OR mis-delivered the parcel OR the token is incorrect. | H | L | - | | | - | | - | - | - | 1 | 1 | 0 | | | 0 | 1 |

Fig. 24-4

| Measure Number | TabCounts: Table # | Measures (M) | | Outcome Detection Coefficients (C) | | | | | | | | | | Weight Factors (W) | | | | | | | |
|---|---|---|---|---|---|---|---|---|---|---|---|---|---|---|---|---|---|---|---|---|---|
| | | Measure Equations | Possible Indications | 1 OK | 2 False Positive | 3 Miss | 4 Miss: Persona Pkg. | 5 Miss: Corrupt Address | 6 Miss: Incorrect Driver | 7 OK: Late OPLD | 8 Miss: No OPLD | 9 Miss: Late OPLD | 10 Mis: ZIP Shipped | 1 OK | 2 False Positive | 3 Miss | 4 Miss: Persona Pkg. | 5 Miss: Corrupt Address | 6 Miss: Incorrect Driver | 7 OK: Late OPLD |
| 13 | 12 5 | (Consig Tok) & (Driver ID) cnt / Consig Tok cnt | High means not much variability in drivers for the token. Average means that various drivers deliver this token. Extremely low indicates that the token is hardly ever delivered by this driver which could mean: that the package was mis-sorted OR the driver is new to this route OR the token is incorrect. | H | L | - | | | - | H | - | - | - | 1 | 1 | 0 | | | 0 | 1 |
| 14 | 14 5 | (Consig Tok) & (Sig Clarify) cnt / Consig Tok cnt | High means not much variability in signatures for the token. Below average means that various signatures happen for this token. Extremely low indicates that the token hardly ever uses this signature which could mean: that the driver mis-recorded the signature OR mis-delivered the parcel OR the signer is unusual OR the token is incorrect. | H | L | - | | | - | H | - | - | - | 1 | 1 | 0 | | | 0 | 1 |

Fig. 24-5

| Measure Number | TabCounts: Table # | Measure Equations | Possible Indications | \multicolumn{10}{c}{Outcome Detection Coefficients (C)} | \multicolumn{7}{c}{Weight Factors (W)} |
|---|---|---|---|---|---|---|---|---|---|---|---|---|---|---|---|---|---|---|---|---|---|
| | | | | 1 OK | 2 False Positive | 3 Miss | 4 Miss: Persona Pkg. | 5 Miss: Corrupt Address | 6 Miss: Incorrect Driver | 7 OK: Late OPLD | 8 Miss: No OPLD | 9 Miss: Late OPLD | 10 Mis: ZIP Shipped | 1 OK | 2 False Positive | 3 Miss | 4 Miss: Persona Pkg. | 5 Miss: Corrupt Address | 6 Miss: Incorrect Driver | 7 OK: Late OPLD |
| 15 | 5 / 17 | Consig Tok cnt / Nottokened_codel cnt | High means most packages are co-delivered with a token. Low means co-delivered packages do not have a token. | H | L | - | | | | H | - | - | - | 1 | 1 | 0 | | | 0 | 1 |
| 16 | 5 / 18 | Consig Tok cnt / Difftokened_codel cnt | High means most co-delivered packages do not have a competing token. Low means co-delivered packages have token variations. | H | L | - | | | | H | - | - | - | 1 | 1 | 0 | | | 0 | 1 |
| 17 | 15 / 3 | (Sig Clarify) & (Del Pattern) & Driver ID) cnt / (Sig Clarify) & (Del Pattern) cnt | High means that other drivers do not use this delivery-signature pattern. Middle indicates that other drivers share this delivery-signature pattern. Low might be a clue that the driver mis-recorded the delivery-signature pattern OR mis-delivered the parcel OR the token is incorrect. | H | H | H | | | L | H | - | - | - | 1 | 1 | 1 | | | 1 | 1 |

Fig. 24-6

| Measure Number | TabCounts: Table # | Measure Equations | Possible Indications | Outcome Detection Coefficients (C) | | | | | | | | | | Weight Factors (W) | | | | | | |
|---|---|---|---|---|---|---|---|---|---|---|---|---|---|---|---|---|---|---|---|---|
| | | | | 1 OK | 2 False Positive | 3 Miss | 4 Miss: Persona Pkg. | 5 Miss: Corrupt Address | 6 Miss: Incorrect Driver | 7 OK: Late OPLD | 8 Miss: No OPLD | 9 Miss: Late OPLD | 10 Miss: ZIP Shipped | 1 OK | 2 False Positive | 3 Miss | 4 Miss: Persona Pkg. | 5 Miss: Corrupt Address | 6 Miss: Incorrect Driver | 7 OK: Late OPLD |
| 18 | 16 3 | (Sig Clarify) & (Del Pattern) & (Consig Tok) cnt / (Sig Clarify) & (Del Pattern) cnt | High means that the other tokens (or non-tokens) do not use this delivery-signature pattern. Mid might be a clue that other tokens share this delivery-signature pattern. Low might be a clue that the driver mis-recorded the delivery-signature pattern OR mis-delivered the parcel OR the token is incorrect. | H | L | - | | | | H | - | - | - | 1 | 1 | 0 | | | 0 | 1 |
| 19 | 9 7 | (Delivery Pattern) & (Consig Tok) cnt / (Delivery Pattern) & (any Token) cnt | High means that the other tokens do not use this delivery pattern. Low means that the delivery pattern gets other tokens. Really low increases the chance that the package was mis-delivered OR this was an incorrect token. | H | L | H | | | L | H | - | - | - | 1 | 1 | 1 | | | 1 | 1 |
| 20 | 7 1 | (Delivery Pattern) & (any Token) cnt / Delivery Pattern cnt | High means that this is a frequently-tokened (independent of token diversity) delivery pattern. | H | H | H | | | L | H | - | - | - | 1 | 1 | 1 | | | 1 | 1 |

Fig. 24-7

| Measure Number | TabCounts: Table # | Measures (M) | | Outcome Detection Coefficients (C) | | | | | | | | | | Weight Factors (W) | | | | | | | |
|---|---|---|---|---|---|---|---|---|---|---|---|---|---|---|---|---|---|---|---|---|---|
| | | Measure Equations | Possible Indications | 1 OK | 2 False Positive | 3 Miss | 4 Miss: Persona Pkg. | 5 Miss: Corrupt Address | 6 Miss: Incorrect Driver | 7 OK: Late OPLD | 8 Miss: No OPLD | 9 Miss: Late OPLD | 10 Mis: ZIP Shipped | 1 OK | 2 False Positive | 3 Miss | 4 Miss: Persona Pkg. | 5 Miss: Corrupt Address | 6 Miss: Incorrect Driver | 7 OK: Late OPLD |
| 21 | | Cotokened_codel_stop_cnt / Nottokened_codel_stop_cnt | High means most packages are co-delivered with a token. Low means co-delivered packages do not have a token. | H | L | 0 | | | 0 | H | - | - | - | 1 | 1 | 1 | | | 1 | 1 |
| 22 | | Cotokened_codel_stop_cnt / Difftokened_codel_stop_cnt | High (>1) means most co-delivered packages do not have a competing token. Low means co-delivered packages have token variations. | H | L | 0 | | | 0 | H | - | - | - | 1 | 1 | 1 | | | 1 | 1 |
| 23 | | Stop Delivery Pattern Consistency | High means other co-delivered ship-tos indicate a solid delivery pattern. The maximum of Measure #9 from amongst all packages at this stop. | H | H | H | | | L | H | - | - | - | 1 | 1 | 1 | | | 1 | 1 |
| | | | No OPLD Detected | N | N | N | N | N | N | N | Y | - | - | | | | | | | |
| | | | Late OPLD Detected | N | - | N | N | N | Y | Y | - | Y | - | | | | | | | |
| | | | ZIP-Shipped Detected | N | N | N | N | N | N | N | - | N | Y | | | | | | | |
| | | | Not Tokened | N | N | H | Y | Y | N | N | - | Y | Y | | | | | | | |

Fig. 24-8

| Measure Number | TabCounts: Table # | Measures (M) | | Outcome Detection Coefficients (C) | | | | | | | | | | Weight Factors (W) | | | | | | |
|---|---|---|---|---|---|---|---|---|---|---|---|---|---|---|---|---|---|---|---|---|
| | | Measure Equations | Possible Indications | 1 OK | 2 False Positive | 3 Miss | 4 Miss: Persona Pkg. | 5 Miss: Corrupt Address | 6 Miss: Incorrect Driver | 7 OK: Late OPLD | 8 Miss: No OPLD | 9 Miss: Late OPLD | 10 Miss: ZIP Shipped | 1 OK | 2 False Positive | 3 Miss | 4 Miss: Persona Pkg. | 5 Miss: Corrupt Address | 6 Miss: Incorrect Driver | 7 OK: Late OPLD |
| 19 | 9÷7 | "(Delivery Pattern) & (Consig Tok) cnt" *divided by* "(Delivery Pattern) & (any Token) cnt" [Note: This measure is available for matched addresses.] | High indicated that other tokens do not use this delivery pattern. Low indicates that the delivery pattern gets other tokens. Really low increases the chances that the package was mis-delivered or this was an incorrect token. | H | L | H | | | L | H | - | - | - | 1 | 1 | 1 | | | 1 | 1 |
| 20 | 7÷1 | "(Delivery Pattern) & (any Token) cnt" *divided by* "Delivery Pattern cnt" | High indicates that this is a frequently-tokened (independent of token diversity) delivery pattern | H | H | H | | . | L | H | - | - | - | 1 | 1 | 1 | | | 1 | 1 |
| 21 | | "Cotokened_codel_stop cnt" *divided by* "Nottokened_codel_stop cnt" [Note: This is a transient (per stop) Measure.] | High indicates most packages are co-delivered with a token. Low indicates that co-delivered packages do not have a token. | H | L | 0 | | | 0 | H | - | - | - | 1 | 1 | 1 | | | 1 | 1 |

Fig. 24-9

| Measure Number | TabCounts: Table Numbers | Measure Equations | Possible Indications | Outcome Detection Coefficients (C) | | | | | | | | | | Weight Factors (W) | | | | | | |
|---|---|---|---|---|---|---|---|---|---|---|---|---|---|---|---|---|---|---|---|---|
| | | | | 1 OK | 2 False Positive | 3 Miss | 4 Miss: Personal Pkg. | 5 Miss: Corrupt Address | 6 Miss: Incorrect Driver | 7 OK: Late OPLD | 8 Miss: No OPLD | 9 Miss: Late OPLD | 10 Miss: ZIP Shipped | 1 OK | 2 False Positive | 3 Miss | 4 Miss: Personal Pkg. | 5 Miss: Corrupt Address | 6 Miss: Incorrect Driver | 7 OK: Late OPLD |
| 22 | | "Cotokened_codel_stop cnt" divided by "Difftokened_codel_sto pcnt" [Note: This is a transient (per stop) Measure.] | High (greater than 1) indicates that most co-delivered packages do not have a competing token. Low indicates that co-delivered packages have token variations. | H | L | 0 | | | 0 | H | - | - | - | 1 | 1 | 1 | | | 1 | 1 |
| 23 | | Stop Delivery Pattern Consistency [Note: This is a transient (per stop) Measure.] | High means other co-delivered ship-to addresses indicate a solid delivery pattern. The maximum of Measure #9 from amongst all packages at this stop. | H | H | H | | | L | H | - | - | - | 1 | 1 | 1 | | | 1 | 1 |
| | | | No OPLD Detected | N | N | N | N | N | N | N | Y | - | - | | | | | | | |
| | | | Late OPLD Detected | N | - | - | - | - | Y | Y | - | Y | - | | | | | | | |
| | | | ZIP-Shipped Detected | N | N | - | N | - | N | N | - | N | Y | | | | | | | |
| | | | Not Tokened | N | N | - | Y | - | N | N | - | Y | Y | | | | | | | |

Fig. 24-10

Begin of Score Keeping Input Message
Consignee Token
> Record 1
>> Delivery Date
>> Outcome 1 Count (Manifested OK)
>> Outcome 2 Count (Manifested False Positive)
>> Outcome xx Count (Manifested OK, Late OPLD)
>> Outcome 3 Count (Manifest Missed Corrupted Address)
>> Outcome 4 Count (Manifest Missed)
>> Outcome xx Count (Manifest Missed, Late OPLD)
>> Outcome xx Count (Manifest Missed, No OPLD)
>> Outcome 5 Count (Manifest Missed Personal Package)
>> Outcome 6 Count (Incorrect Driver Action)
> End Record 1
> Record 2
>   :
> End Record 2
>   :
> Record m
>   :
> End Record m End of Score Keeping Input Message

Fig. 25

| VOLUME COUNTS BY CATEGORY |||||
|---|---|---|---|---|
| | Data Gathering Outcome Determination | Abbreviation | ADA Override Selections ||
| Matched | OK | $M$ | | |
| | False-Positive | $M_F$ | | |
| | Late OPLD | $M_L$ | | |
| Not-Matched | Missed | $M_M$ | "Add" | $S_A$ |
| | Corrupted Address | $N_C$ | "Wrong-Consignee" | $S_W$ |
| | Incorrect Driver Action | $N_D$ | "ZIP-Shipped" | $S_Z$ |
| | Personal Package | $N_P$ | | |
| | Late OPLD | $N_L$ | | |
| | No OPLD | $N_O$ | | |
| | ZIP-Shipped | $N_Z$ | | |

Fig. 26

| LIMITS AND THRESHOLDS | STATIC VALUE |
|---|---|
| Maximum Number of Staging Queue Entries (k) | 20 entries |
| Trigger Age Minimum | 1 day |
| Trigger Age Maximum | 40 days |
| Trigger Duration Minimum | 3 days |
| Base Age Maximum | 400 days |
| Base Duration Minimum | 3 days |
| Minimum Negative Count Threshold | 10 parcels |
| Negative Count Threshold | 1,000 parcels |
| Negative Rate Threshold | 30% |
| Negative Acceleration Threshold | 1% per day |

Fig. 30

REGISTRATION AND MAINTENANCE OF ADDRESS DATA FOR EACH SERVICE POINT IN A TERRITORY

CROSS-REFERENCE TO RELATED APPLICATIONS

This patent application is a Continuation of U.S. Nonprovisional application Ser. No. 12/270,665, filed Nov. 13, 2008, now U.S. Pat. No. 7,912,854, which was a Continuation of U.S. Nonprovisional application Ser. No. 11/342,041, filed Jan. 27, 2006, now U.S. Pat. No. 7,542,972, both of which are hereby incorporated herein in their entirety by reference. This patent application also claims priority under Title 35, U.S.C. §119(e) to U.S. Provisional Application No. 60/648,577, filed Jan. 28, 2005 and entitled "Registration and Maintenance of Data, Including Address Data, for Each of a Plurality of Discrete Locations Within a Territory," which is incorporated herein by reference.

BACKGROUND

1. Technical Field

The following disclosure relates generally to the field of data mining and relational database management systems and, more particularly, to a system for creating and maintaining a database of address and related information about a plurality of discrete locations.

2. Description of Related Art

The database has been a staple of computing since the beginning of the digital era. A database refers generally to one or more large, structured sets of persistent data, usually associated with a software system to create, update, and query the data.

The relational database model was described in the early 1970s. In a relational database, the data is stored in a table. A table organizes the data into rows and columns, providing a specific location (such as row x, column y) for each field. Each row contains a single record. The columns are arranged in order, by attribute, so all the fields in each column contain the same type of data. The table format for a database file makes searching and accessing data faster and more efficient. The records (rows) can also be sorted into a new order, based on any one or more of the columns (fields). Sorting is often used to order the records such that the most desired data appears earlier in the file, thereby making searching faster. As computing speed and capacity increased, database tables were able to store larger amounts of data.

A database management system refers generally to an interface and one or computer software programs specifically designed to manage and manipulate the information in a database. The database management system may include a complex suite of software programs that control the organization, storage, and retrieval of data, as well as the security and integrity of the database. The database management system may also include an interface, for accepting requests for data from external applications. In a relational database including multiple tables, the database management system is generally responsible for maintaining all the links between and among key fields in the various tables. This is referred to as maintaining the "referential integrity" of the database.

Address Databases: The United States includes more than 145 million deliverable addresses. Address databases are available from private commercial sources or from government sources, such as the U.S. Postal Service (USPS). The USPS offers a variety of address databases to the public, including a City-State file, a Five-Digit ZIP file, and a ZIP+4 file. Because of growth and changes in population, address databases generally require frequent updating. As with any other large database, updating the data in a very large address database is often technically challenging and time-consuming. Many private companies build and maintain their own database of addresses, which can be updated using any of a variety of data sources.

Address standardization transforms a given address into the best format for meeting governmental guidelines, such as those established by the USPS. Standardization affects all components of the delivery address, including the format, font, spacing, typeface, punctuation, and ZIP code or delivery point bar code (DPBC). For example, a non-standard address may look quite different after standardization.

A parcel or letter can usually be delivered whether it bears the standardized address or not. Although USPS regulations encourage and educate mail senders about address standardization, no agency or company can expect to manage or enforce address formats. The capacity to handle and deliver a parcel or letter bearing a non-standard address format is an advantage to senders and receivers, but often represents a serious disadvantage to those attempting to maintain an accurate address database.

The existence of multiple representations for the same address represents one of the primary challenges in developing and maintaining an accurate and current database of deliverable addresses. The example above shows two non-standard addresses that refer to a single address. In a system like the U.S. Postal Service or a major parcel delivery company, there may be dozens of non-standard addresses accumulated over time—all of which refer to a single address at a discrete location.

Thus, there is a need in the art for a system that can uniquely identify a discrete address location based upon any kind of non-standard address indicia. There is also a need in the art for an improved database management system capable of creating and maintaining a database of address and related information about a group of discrete locations.

There is a related need to identify and store a single preferred address for each discrete physical location, while also identifying and storing any non-standard address that refers or relates to that discrete location, and providing a link to the preferred address.

There is also a need in the art for a database management system that is capable of continually monitoring the accuracy of an address database as new non-standard addresses enter the system.

SUMMARY OF THE INVENTION

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

The above and other needs are met by the present invention which provides a method of mining address data to locate a preferred address for each of a plurality of parcels. The method may include the steps of: maintaining a package-level detail database of active shipment records, each active shipment record comprising an active tracking number, an active ship-to address, and an active delivery pattern code; maintaining an archive of delivery records, each delivery record comprising a past tracking number, a past ship-to address, a past delivery pattern code, and a stop identifier; receiving a current parcel bearing address indicia; assigning a mining key to the current parcel, the mining key comprising a parcel tracking number and a current delivery pattern code related to the address indicia; comparing the mining key to the package-level detail database and the archive by: (a) retrieving from the archive those select delivery records having a past delivery pattern code that matches the current delivery pattern code, each of the select delivery records having a select past ship-to address; and (b) retrieving from the package-level detail database those select active shipment records having an active ship-to address that matches any the select past ship-to address in the select delivery records. The method may further include: building a set of mined data comprising the select delivery records and the select active shipment records; prioritizing the set of mined data in order of the records most closely associated with the mining key, such that a preferred address related to the mining key occurs first; and assigning the preferred address to the current parcel for delivery.

The step of comparing may further include: (c) retrieving from the archive those additional delivery records having a past delivery pattern code that matches any the current delivery pattern code in the select active shipment records, each of the additional delivery records having an additional past ship-to address; (d) retrieving from the package-level detail database those additional active shipment records having an active ship-to address that matches any the select additional ship-to address in the additional delivery records; and repeating steps (c) and (d) in a plurality of iterations until the step of building a set of mined data reaches a limit condition.

The method may further include selecting the preferred address as a preferred consignee address for a single consignee location; assigning a unique consignee token related to the single consignee location; and storing the unique consignee token and the preferred consignee address in a master address database.

The step of prioritizing the set of mined data may further include: replacing one or more sequence values in a plurality of ship-to address records stored in the set of mined data with a representative symbol; clustering together those the ship-to address records having the same stop identifier; and clustering together those the ship-to address records having the same delivery pattern code.

The step of prioritizing the set of mined data may further include: building a delivery pattern similarity matrix by counting the coincidence of each delivery pattern code and each ship-to address within the set of mined data; summing the overlapping delivery pattern occurrences within the delivery pattern similarity matrix for each pair of ship-to addresses; building a stop identifier similarity matrix by counting the coincidence of each stop identifier and each ship-to address within the set of mined data; summing the overlapping stop occurrences within the stop identifier similarity matrix for each pair of ship-to addresses; and sorting the set of mined data in order the highest number of overlapping delivery pattern occurrences and the highest number of overlapping stop occurrences.

The step of prioritizing the set of mined data may further include: converting the stop identifier similarity matrix into a stop identifier dendrogram; constructing a stop-joined dendrogram by joining the pair of ship-to addresses having the highest number of overlapping stop occurrences, summing the number of occurrences to form a joined stop node, and by joining the next stop pair of ship-to addresses or joined stop nodes having the highest number of overlapping stop occurrences, by successive iterations, until the number of overlapping stop occurrences for each the next stop pair is zero; converting the delivery pattern similarity matrix into a delivery pattern dendrogram; and constructing a pattern-joined dendrogram by joining the pair of ship-to addresses having the highest number of overlapping stop occurrences, using the minimum of the number of occurrences to form a joined pattern node, and by joining the next pattern pair of ship-to addresses or joined pattern nodes having the highest number of overlapping stop occurrences, by successive iterations, until the number of overlapping stop occurrences for each the next pattern pair is zero.

The step of assigning the preferred address to the current parcel for delivery may further include presenting the set of mined data to an address database administrator, and receiving a selection of the preferred address by the administrator.

The present invention may also include a method of scoring and maintaining address data for any of a plurality of records in an address database, including the steps of: maintaining a package-level detail database of active shipment records, each active shipment record comprising an active tracking number, an active ship-to address, and an active delivery pattern code; maintaining an archive of delivery records, each delivery record comprising a past tracking number, a past ship-to address, a past delivery pattern code, and a stop identifier; gathering address data from the detail database and the archive into a queue for a period of days; scoring the address data in the queue; building a consignee staging queue for storing those data in the queue related to a select consignee location; assigning a mining key to a current parcel selected from the consignee staging queue, the mining key comprising a parcel tracking number and a current delivery pattern code; comparing the mining key to the package-level detail database and the archive by: (a) retrieving from the archive those select delivery records having a past delivery pattern code that matches the current delivery pattern code, each of the select delivery records having a select past ship-to address; and (b) retrieving from the package-level detail database those select active shipment records having an active ship-to address that matches any the select past ship-to address in the select delivery records. The method may further include: building a set of mined data comprising the select delivery records and the select active shipment records; prioritizing the set of mined data in order of the records most closely associated with the mining key, such that a preferred address related to the mining key occurs first; and assigning the preferred address to the current parcel and updating the address database.

The step of comparing may further include: (c) retrieving from the archive those additional delivery records having a past delivery pattern code that matches any the current delivery pattern code in the select active shipment records, each of the additional delivery records having an additional past ship-to address; (d) retrieving from the package-level detail database those additional active shipment records having an active ship-to address that matches any the select additional ship-to address in the additional delivery records; and repeating steps (c) and (d) in a plurality of iterations until the step of building a set of mined data reaches a limit condition.

The method may further include the steps of: selecting the preferred address as a preferred consignee address for a single consignee location; assigning a unique consignee token related to the single consignee location; and storing the unique consignee token and the preferred consignee address in a master address database.

The step of prioritizing the set of mined data may further include: replacing one or more sequence values in a plurality of ship-to address records stored in the set of mined data with a representative symbol; clustering together those the ship-to address records having the same stop identifier; and clustering together those the ship-to address records having the same delivery pattern code.

The step of prioritizing the set of mined data may further include the steps of: building a delivery pattern similarity matrix by counting the coincidence of each delivery pattern code and each ship-to address within the set of mined data; summing the overlapping delivery pattern occurrences within the delivery pattern similarity matrix for each pair of ship-to addresses; building a stop identifier similarity matrix by counting the coincidence of each stop identifier and each ship-to address within the set of mined data; summing the overlapping stop occurrences within the stop identifier similarity matrix for each pair of ship-to addresses; and sorting the set of mined data in order the highest number of overlapping delivery pattern occurrences and the highest number of overlapping stop occurrences.

The step of prioritizing the set of mined data may further include the steps of: converting the stop identifier similarity matrix into a stop identifier dendrogram; constructing a stop joined dendrogram by joining the pair of ship-to addresses having the highest number of overlapping stop occurrences, summing the number of occurrences to form a joined stop node, and by joining the next stop pair of ship-to addresses or joined stop nodes having the highest number of overlapping stop occurrences, by successive iterations, until the number of overlapping stop occurrences for each the next stop pair is zero; converting the delivery pattern similarity matrix into a delivery pattern dendrogram; and constructing a pattern-joined dendrogram by joining the pair of ship-to addresses having the highest number of overlapping stop occurrences, using the minimum of the number of occurrences to form a joined pattern node, and by joining the next pattern pair of ship-to addresses or joined pattern nodes having the highest number of overlapping stop occurrences, by successive iterations, until the number of overlapping stop occurrences for each the next pattern pair is zero.

The step of scoring the address data in the queue may include: generating a count table for the number of occurrences of each of a plurality of delivery conditions on each day of the period; calculating for each stop identifier a measure number for each of a plurality of corresponding outcomes, based upon the count table and a plurality of measure equations; and building an output message for each parcel tracking number based upon the measure number and the corresponding outcome.

The step of assigning the preferred address to the current parcel and updating the address database may further include presenting the set of mined data to an address database administrator, and receiving a selection of the preferred address by the administrator.

The present invention may also include a system for locating a preferred address for each of a plurality of parcels. The system may include: a package-level detail database of active shipment records, each active shipment record comprising an active tracking number, an active ship-to address, and an active delivery pattern code; an archive of delivery records, each delivery record comprising a past tracking number, a past ship-to address, a past delivery pattern code, and a stop identifier; a current parcel bearing address indicia; a mining key assigned to the current parcel, the mining key comprising a parcel tracking number and a current delivery pattern code related to the address indicia; and an association process for comparing the mining key to the package-level detail database and the archive. The association process may include the steps of (a) retrieving from the archive those select delivery records having a past delivery pattern code that matches the current delivery pattern code, each of the select delivery records having a select past ship-to address; and (b) retrieving from the package-level detail database those select active shipment records having an active ship-to address that matches any the select past ship-to address in the select delivery records. The system may further include: a set of mined data comprising the select delivery records and the select active shipment records, the set of mined data prioritized in order of the records most closely associated with the mining key, such that a preferred address related to the mining key occurs first; and an address database administrator for assigning the preferred address to the current parcel for delivery.

The association process may further include: (c) retrieving from the archive those additional delivery records having a past delivery pattern code that matches any the current delivery pattern code in the select active shipment records, each of the additional delivery records having an additional past ship-to address; (d) retrieving from the package-level detail database those additional active shipment records having an active ship-to address that matches any the select additional ship-to address in the additional delivery records; and repeating steps (c) and (d) in a plurality of iterations until the step of building a set of mined data reaches a limit condition.

The system may further include a unique consignee token related to a single consignee location associated with the preferred address.

The set of mined data may further include: a plurality of ship-to address records having a representative symbol in place of one or more sequence values; clusters of the ship-to address records having the same stop identifier; and clusters of the ship-to address records having the same delivery pattern code.

The system may further include: a delivery pattern similarity matrix built upon a counting the coincidence of each delivery pattern code and each ship-to address within the set of mined data; a sum of the overlapping delivery pattern occurrences within the delivery pattern similarity matrix for each pair of ship-to addresses; a stop identifier similarity matrix built upon a counting the coincidence of each stop identifier and each ship-to address within the set of mined data; a sum of the overlapping stop occurrences within the stop identifier similarity matrix for each pair of ship-to addresses; and the set of mined data sorted in order the highest number of overlapping delivery pattern occurrences and the highest number of overlapping stop occurrences.

The system may further include: a stop identifier dendrogram built by converting the stop identifier similarity matrix; a stop joined dendrogram constructed by joining the pair of ship-to addresses having the highest number of overlapping stop occurrences, summing the number of occurrences to form a joined stop node, and by joining the next stop pair of ship-to addresses or joined stop nodes having the highest number of overlapping stop occurrences, by successive iterations, until the number of overlapping stop occurrences for each the next stop pair is zero; a delivery pattern dendrogram built by converting the delivery pattern similarity matrix; and a pattern-joined dendrogram constructed by joining the pair of ship-to addresses having the highest number of overlapping stop occurrences, using the minimum of the number of occurrences to form a joined pattern node, and by joining the next pattern pair of ship-to addresses or joined pattern nodes having the highest number of overlapping stop occurrences, by successive iterations, until the number of overlapping stop occurrences for each the next pattern pair is zero.

The present invention may further include a system for scoring and maintaining address data for any of a plurality of records in an address database. The maintenance system may include: a package-level detail database of active shipment records, each active shipment record comprising an active tracking number, an active ship-to address, and an active delivery pattern code; an archive of delivery records, each delivery record comprising a past tracking number, a past ship-to address, a past delivery pattern code, and a stop identifier; a queue of address data gathered from the detail database and the archive for a period of days; a scoring process for assigning a score to the address data in the queue; a consignee staging queue for storing those data in the queue related to a select consignee location; a mining key assigned to a current parcel selected from the consignee staging queue, the mining key comprising a parcel tracking number and a current delivery pattern code; and an association process for comparing the mining key to the package-level detail database and the archive. The association process may include the steps of (a) retrieving from the archive those select delivery records having a past delivery pattern code that matches the current delivery pattern code, each of the select delivery records having a select past ship-to address; and (b) retrieving from the package-level detail database those select active shipment records having an active ship-to address that matches any the select past ship-to address in the select delivery records. The system may further include: a set of mined data comprising the select delivery records and the select active shipment records, the set of mined data prioritized in order of the records most closely associated with the mining key, such that a preferred address related to the mining key occurs first; and an address database administrator for assigning the preferred address to the current parcel and for updating the address database.

The association process may further include: (c) retrieving from the archive those additional delivery records having a past delivery pattern code that matches any the current delivery pattern code in the select active shipment records, each of the additional delivery records having an additional past ship-to address; (d) retrieving from the package-level detail database those additional active shipment records having an active ship-to address that matches any the select additional ship-to address in the additional delivery records; and repeating steps (c) and (d) in a plurality of iterations until the step of building a set of mined data reaches a limit condition.

The system may further include a unique consignee token related to a single consignee location associated with the preferred address.

The set of mined data may further include: a plurality of ship-to address records having a representative symbol in place of one or more sequence values; clusters of the ship-to address records having the same stop identifier; and clusters of the ship-to address records having the same delivery pattern code.

The system may further include: a delivery pattern similarity matrix built upon a counting the coincidence of each delivery pattern code and each ship-to address within the set of mined data; a sum of the overlapping delivery pattern occurrences within the delivery pattern similarity matrix for each pair of ship-to addresses; a stop identifier similarity matrix built upon a counting the coincidence of each stop identifier and each ship-to address within the set of mined data; a sum of the overlapping stop occurrences within the stop identifier similarity matrix for each pair of ship-to addresses; and the set of mined data sorted in order the highest number of overlapping delivery pattern occurrences and the highest number of overlapping stop occurrences.

The system may further include: a stop identifier dendrogram built by converting the stop identifier similarity matrix; a stop joined dendrogram constructed by joining the pair of ship-to addresses having the highest number of overlapping stop occurrences, summing the number of occurrences to form a joined stop node, and by joining the next stop pair of ship-to addresses or joined stop nodes having the highest number of overlapping stop occurrences, by successive iterations, until the number of overlapping stop occurrences for each the next stop pair is zero; a delivery pattern dendrogram built by converting the delivery pattern similarity matrix; and a pattern-joined dendrogram constructed by joining the pair of ship-to addresses having the highest number of overlapping stop occurrences, using the minimum of the number of occurrences to form a joined pattern node, and by joining the next pattern pair of ship-to addresses or joined pattern nodes having the highest number of overlapping stop occurrences, by successive iterations, until the number of overlapping stop occurrences for each the next pattern pair is zero.

The scoring process for assigning a score to the address data in the queue may further include: a count table for storing the number of occurrences of each of a plurality of delivery conditions on each day of the period; for each stop identifier, a measure number calculated and stored for each of a plurality of corresponding outcomes, based upon the count table and a plurality of measure equations; and an output message constructed for each parcel tracking number based upon the measure number and the corresponding outcome.

These and other objects are accomplished by the present invention and will become apparent from the following detailed description of a preferred embodiment in conjunction with the accompanying drawings in which like numerals designate like elements.

BRIEF DESCRIPTION OF THE DRAWINGS

The invention may be more readily understood by reference to the following description, taken with the accompanying drawing figures.

FIG. 2 is an illustration of a screen shot showing a graphical user interface, according to one embodiment of the present invention.

FIG. 4 is a representation of the steps involved in an initial data gathering step, according to one embodiment of the present invention.

FIG. 7 is a table of data gathered and processed through several iterations of a registration process, according to one embodiment of the present invention. FIG. 7 appears on several pages, which are numbered consecutively beginning with FIG. 7-1 (indicating FIG. 7, Page 1) and continuing through FIG. 7-8.

FIG. 8 includes two sorted tables of mined data, according to one embodiment of the present invention. Table 1 appears on two pages, labeled FIG. 8-1 and FIG. 8-2. Table 2 appears on two pages, labeled FIG. 8-3 and FIG. 8-4.

FIG. 10 includes a table of delivery pattern code data and a corresponding similarity matrix, according to one embodiment of the present invention.

FIG. 11 includes a table of stop identifier data and a corresponding similarity matrix, according to one embodiment of the present invention. FIG. 11 appears on two pages, labeled FIG. 11-1 and FIG. 11-2.

FIG. 12 is an illustration of a dendrogram of ship-to addresses, joined by stop, according to one embodiment of the present invention.

FIGS. 13A-13C illustrate the iterative processing of a succession of stop similarity matrices, according to one embodiment of the present invention.

FIG. 14 is an illustration of a dendrogram of ship-to addresses, joined by delivery pattern, according to one embodiment of the present invention.

FIGS. 15A-15C illustrate the iterative processing of a succession of delivery pattern code similarity matrices, according to one embodiment of the present invention.

FIG. 16 is a representation of the steps involved in producing a dendrogram, according to one embodiment of the present invention.

FIG. 20 is a representation of the steps involved in a cluster cruncher, according to one embodiment of the present invention.

FIG. 21 is a table of address patterns, according to one embodiment of the present invention. FIG. 21 appears on several pages, which are numbered consecutively beginning with FIG. 21-1 and continuing through FIG. 21-5.

FIG. 23 is a list of count tables, with a description of the criteria for each count, according to one embodiment of the present invention.

FIG. 24 is a table showing a variety of measures, outcome determination coefficients, and weight factors, according to one embodiment of the present invention. FIG. 24 appears on several pages, which are numbered consecutively beginning with FIG. 24-1 and continuing through FIG. 24-10.

FIG. 25 is a representation of the steps involved in score keeping, according to one embodiment of the present invention.

FIG. 26 is a table describing the possible outcome determinations and override selections for certain match categories, according to one embodiment of the present invention.

FIG. 30 is a table of static values, according to one embodiment of the present invention.

DETAILED DESCRIPTION

Figure 1:
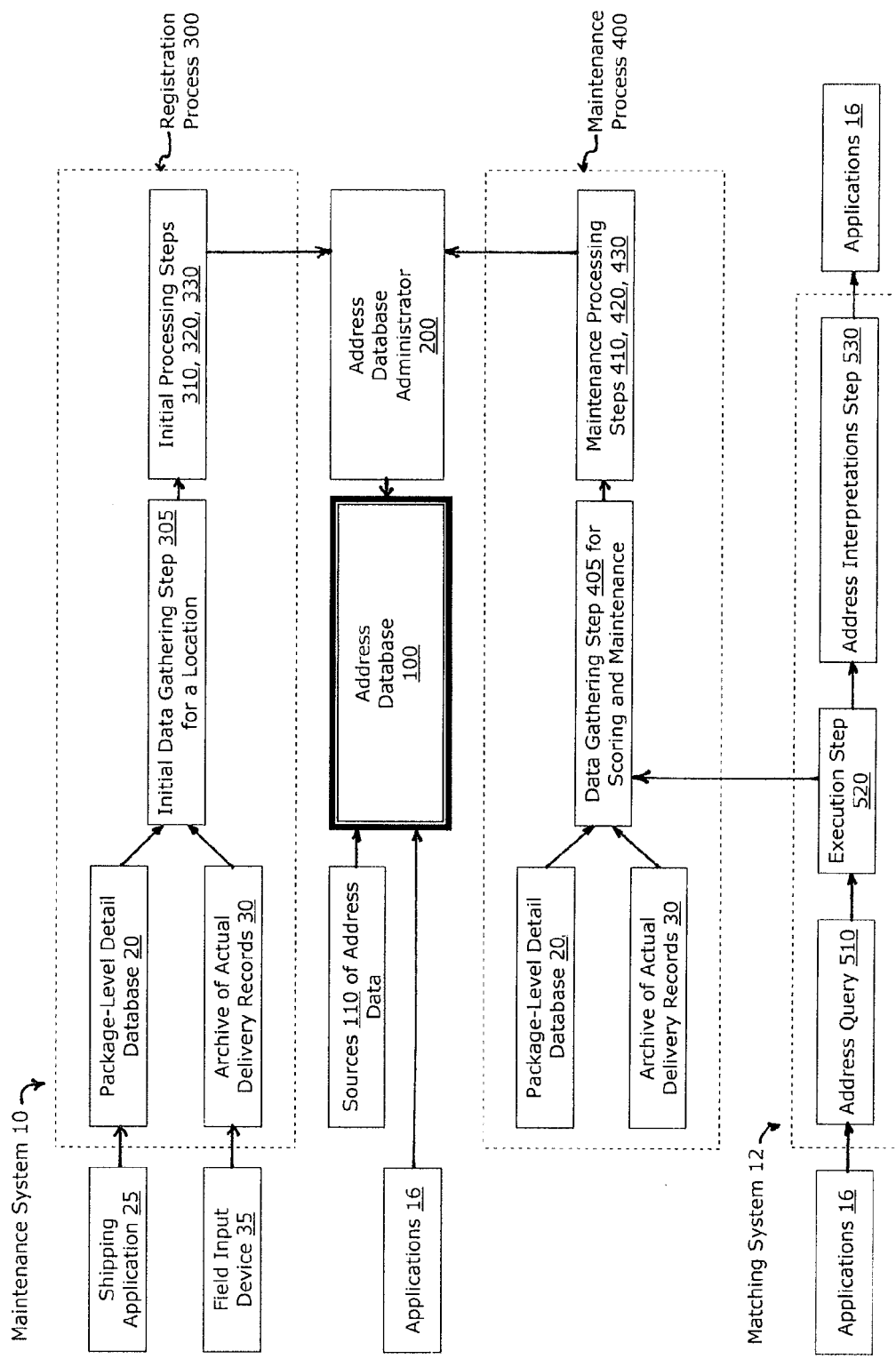
FIG. 1 is a flow chart illustrating a maintenance system and a matching system, according to one embodiment of the present invention.

Certain illustrative and exemplary apparatuses, systems, and methods are described herein in connection with the following description and the accompanying drawing figures. The examples discussed represent only a few of the various ways of applying the principles supporting the material disclosed and, thus, the examples are intended to include equivalents. Other advantages and novel features may become apparent from the detailed description which follows, when considered in conjunction with the drawing figures, in which like numerals indicate like elements throughout the several views.

Definitions. As used in this application, the term "computer component" refers to a computer-related entity, such as hardware, firmware, software, a combination thereof, or software in execution. For example, a computer component can be, but is not limited to being, a process running on a processor, a processor itself, an object, an executable, a thread of execution, a program, and a computer. By way of illustration, both an application running on a server and the server itself can be a computer component. One or more computer components cans reside within a process and/or thread of execution and a computer component can be localized on a single computer and/or distributed between and among two or more computers.

"Computer communications," as used herein, refers to a communication between two or more computer components and can be, for example, a network transfer, a file transfer, an applet transfer, an e-mail, a Hyper-Text Transfer Protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic," as used herein, includes but is not limited to hardware, firmware, software and/or combinations of each to perform one or more functions or actions. For example, based upon a desired application or needs, logic may include a software controlled microprocessor, discrete logic such as an Application-Specific Integrated Circuit (ASIC), or other programmed logic device. Logic may also be fully embodied as software.

"Signal," as used herein, includes but is not limited to one or more electrical or optical signals, analog or digital, one or more computer instructions, a bit or bit stream, or the like.

"Software," as used herein, includes but is not limited to, one or more computer readable and/or executable instructions that cause a computer, computer component and/or other electronic device to perform functions, actions and/or behave in a desired manner. The instructions may be embodied in various forms like routines, algorithms, stored procedures, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel-processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer or programmer or the like.

An "operable connection" (or a connection by which entities are "operably connected") is one in which signals, physical communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Database," as used herein, refers to a physical and/or logical entity that can store data. A database, for example, may be one or more of the following: a list, a table, a file, a data store, a relational database, a data table, a queue, a heap, and so on. A database may reside in one logical and/or physical entity and/or may be distributed between two or more logical and/or physical entities. The term database may be understood to include a database management system for controlling the organization, storage, and retrieval of data housed in the database.

A "database management system" refers generally to an interface and one or more computer software applications specifically designed to manage and manipulate the information in a database. An interface generally refers to a computer program designed to provide an operative connection or interface between a user and a software application. The database management system may include a complex suite of software programs that control the organization, storage, and retrieval of data, as well as the security and integrity of the database.

An interface for a database management system may provide a series of commands that allow a user to create, read, update, and delete the data values stored in the database tables. These functions (create, read, update, delete) are sometimes referred using the acronym CRUD, so an interface with those commands may be called a CRUD interface. A database interface that includes a query function may be called a CRUDQ interface.

Query language allows users to interact with a database and analyze the data in the tables. A query is a collection of instructions used to extract a set of data from a database. Queries do not change the information in the tables; they merely display the information to the user. The result of a query is sometimes called a view. One of the best known query languages is Structured Query Language (SQL, sometimes pronounced "sequel"). SQL is one of the standard languages for database interoperability. Queries are probably the most frequently used aspect of SQL, but SQL commands may also be used as a programming tool for building, altering, configuring, and generally maintaining a database.

The terms "fuzzy" or "blurry" refer to a superset of Boolean logic dealing with the concept of partial truth; in other words, truth values between "completely true" and "completely false." Any specific theory or system may be generalized from a discrete or crisp form into a continuous or fuzzy form. A system based on fuzzy logic or fuzzy matching may use truth values that have various degrees similar to probabilities except the degrees of truth do not necessarily need to sum to one. In terms of applying fuzzy matching to a string of alpha-numeric characters, the truth value may be expressed as the number of matching characters in the string, for example.

The systems, methods, and objects described herein may be stored, for example, on a computer readable media. Media may include, but are not limited to, an ASIC, a CD, a DVD, a RAM, a ROM, a PROM, a disk, a carrier wave, a memory stick, and the like. Thus, an example computer readable medium can store computer executable instructions for a method for managing transportation assets. The method includes computing a route for a transportation asset based on analysis data retrieved from an experience based travel database. The method also includes receiving real-time data from the transportation asset and updating the route for the transportation asset based on integrating the real-time data with the analysis data.

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor circuit, a software controlled microprocessor, or an application specific integrated circuit. Components implemented as software are not limited to any particular programming language. Rather, the description herein provides the information one skilled in the art may use to fabricate circuits or to generate computer software and/or incorporate hardware technologies in order to perform the processing of the system. It will be appreciated that some or all of the functions and/or behaviors of the present system and method may be implemented as logic as defined above.

To the extent that the term "includes" is employed in the detailed description or the list of exemplary inventive concepts, it is intended to be inclusive in a manner similar to the term "comprising" as that term is interpreted when employed as a transitional word in a claim. Further still, to the extent that the term "or" is employed in the list of exemplary inventive concepts (for example, A or B) it is intended to mean "A or B or both." When the author intends to indicate "only A or B but not both," the author will employ the phrase "A or B but not both." Thus, use of the term "or" herein is the inclusive use, not the exclusive use. See Garner, A Dictionary of Modern Legal Usage 624 (2d ed. 1995).

Introduction. Exemplary systems, methods, and apparatuses are now described with reference to the drawing figures, where like reference numerals are used to refer to like elements throughout the several views. In the following description, for purposes of explanation, numerous specific details are set forth in order to facilitate a thorough understanding of the systems, methods, apparatuses, and the like. It may be evident, however, that the exemplars described may be practiced without these specific details. In other instances, common structures and devices are shown in block diagram form in order to simplify the description.

Many modifications and other embodiments may come to mind to one skilled in the art who has the benefit of the teachings presented in the description and drawings. It should be understood, therefore, that the invention is not be limited to the specific embodiments disclosed and that modifications and alternative embodiments are intended to be included within the scope of the disclosure and the exemplary inventive concepts. Although specific terms may be used herein, they are used in a generic and descriptive sense only and not for purposes of limitation.

For example, the system of the present invention is often described herein, by way of example, in the context of its usefulness with an address management system. Although the address-related example may be described in considerable detail, it is not the intention of the applicants to restrict or in any way limit the scope of the invention to use with addresses. Additional uses, applications, advantages, and modifications of the inventive system will be readily apparent to those skilled in the art. Therefore, the invention, in its broader aspects, is not limited to the specific details, the representative apparatus, and illustrative examples shown and described. Accordingly, departures may be made from such details without departing from the spirit or scope of the general inventive concept.

System Description: As shown in FIG. 1, in the exemplary context of address management systems, a central component of the present invention is an address database 100, which may be developed and maintained by a person or system known as the address database administrator (ADA) 200. As the arrows indicate, the address database 100 may receive input from a variety of sources, including but not limited to trusted sources 110 of address data (such as the U.S. Postal Service), data from applications 16, data obtained from a registration process 300, and data obtained from a maintenance process 400. By gathering data from a variety of sources, the maintenance system 10 of the present invention builds and maintains an address database 100 that is accurate and current. In general, the system 10 of the present invention relies more heavily on actual address data (stored in the database 20 or the archive 30) than on external sources 110 of address data. In this aspect, the system 10 responds to actual delivery data rather than relying upon idealized standardized data from an external source.

In one embodiment, the present invention may include a maintenance system 10 for registering and maintaining data for a plurality of discrete physical locations or addresses. The data may include a standard or non-standard mailing address, a shipping address, a consignee identifier, or any other of a variety of data describing or related to the location. In one aspect, the present invention is directed toward building and maintaining an address database 100 including a single, preferred address for each of a plurality of discrete, deliverable locations within a territory. The maintenance system 10, as shown, may include a registration process 300 and a maintenance process 400.

A matching system 12 may cooperate with the maintenance system 10, as shown in FIG. 1. In one embodiment, the matching system 12 may include the system described in co-pending U.S. patent application Ser. No. 10/690,322 entitled, "Data Structure and Management System for a Superset of Relational Databases," which is incorporated herein by reference. In one aspect, the present invention, including the maintenance system 10, may serve as a source of data to be processed and matched using the system described in the co-pending application.

The matching system 12, as shown, may include an address query 510 in relation to one or more software applications 16. For example, a candidate address from an application 16 may be submitted to the address query 510 in order to find a match from among all the potential preferred addresses stored in the address database 100. The matching or execution step 520 may include one or more of the steps in the maintenance process 400 of the present invention. The matched address may be further processed in the address interpretations step 530, as shown, and the resulting preferred address representation may be passed back to any of a variety of applications 16.

The Registration Process 300, as shown in FIG. 1, may be in communication with a shipping application 25 and a field input device 35. The shipping application 25 may provide records in a package-level detail database 20 that includes, for example, a list of destination addresses and other data related to the current, active shipment of a plurality of parcels. A destination address may be referred to as a ship-to address. The package-level detail database 20 may include an active tracking number, an active ship-to address, and an active delivery pattern code, associated with one or more parcels to be delivered.

A field input device 35, such as a handheld data collection device, may collect and provide data for an archive of actual delivery records 30. The archived records 30 may include the locations or delivery patterns describing where an actual past delivery took place. The delivery records 30 may include a past tracking number, a past ship-to address, a past active delivery pattern code, and a stop identifier, associated with a completed delivery of one or more parcels. Both the package-level detail database 20 and the archive of actual delivery records 30 may include records gathered and stored over a number of days.

A delivery pattern code refers to the information recorded by a shipping service provider that specifies the physical location of a parcel delivery. The delivery pattern code is used instead of delivery address, to avoid confusion with the written address or address indicia that may appear on a parcel. The stop identifier may include additional information about the physical location of a parcel delivery.

In general, the registration process 300 may begin with an initial data gathering step 305 for a particular location, known as a candidate address. The candidate address may be identified from indicia on a parcel itself. For example, the address indicia on a parcel may be a handwritten address, a typed label, a Maxicode or other symbology, a radio frequency identification (RFID) tag, or any of a variety of indicia capable of holding and communicating the intended delivery address for the parcel. The candidate address may also be identified from the records in the package-level detail database 20, or from a request initiated by a manifest application or any of a variety of other shipping applications 16. In one embodiment, a customer or consignee may enter the registration process 300 by affirmatively registering a physical location to act as a preferred address for all deliveries.

Figure 33:
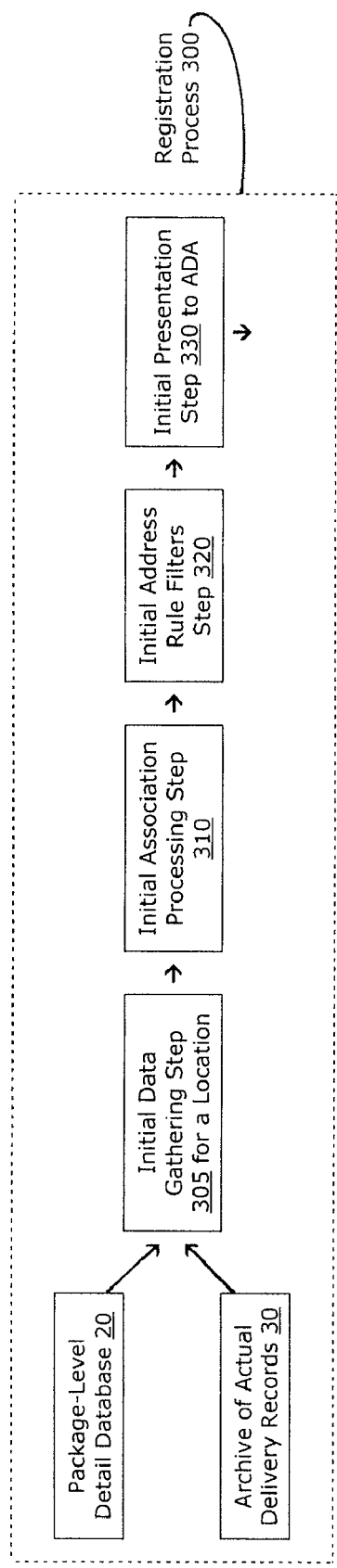
FIG. 33 is a flow chart illustrating an address registration process, according to one embodiment of the present invention.

The initial processing steps 310, 320, 330 are illustrated in more detail in FIG. 33. Through a process known as association processing 310, described in more detail herein, the registration process 300 uses all available data in order to determine whether the candidate address matches any of the preferred address representations stored in the address database 100. The possible matches may be narrowed or otherwise limited by one or more initial rule filters in step 320. The output of the registration process 300 may include the step 330 of showing an initial presentation to a person or system known as the address database administrator (ADA) 200. The initial presentation may include a hierarchical or otherwise prioritized list of possible matches for the candidate address.

Figure 2:
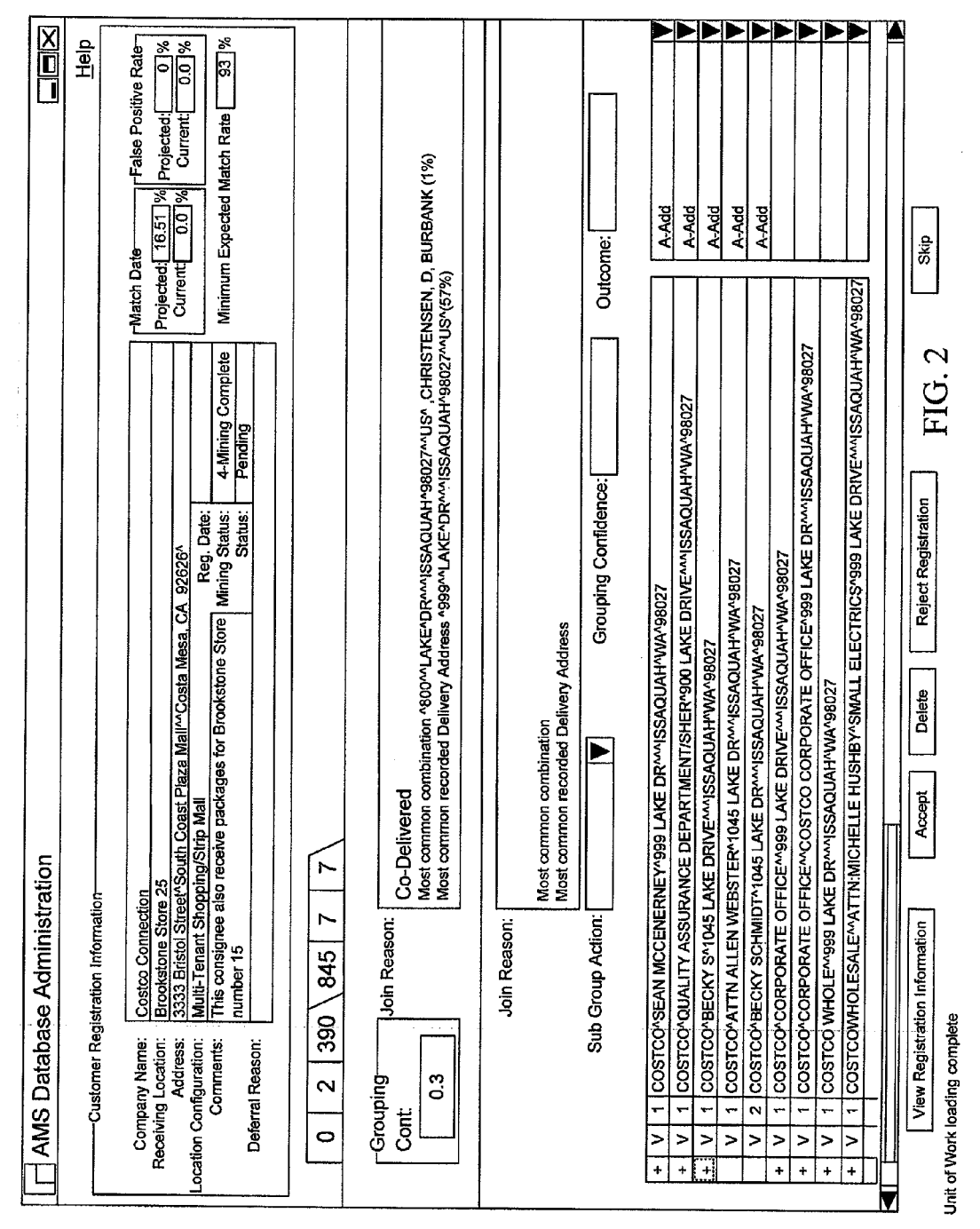

As shown in FIG. 1, the candidate address may be identified from one or more applications 16 such as a manifest application 14. In one embodiment, a manifest application 14 generates a manifest of ship-to addresses, each one describing a candidate address. In the initial presentation step 330, a list of possible matches may be presented to the ADA 200. The link between step 330 and the ADA 200 is shown in FIG. 1; the downward pointing arrow in FIG. 33 is intended to indicate the link to ADA 200 in FIG. 1. In one embodiment, the initial presentation step 330 may include a graphical user interface (GUI) in order to present the data to the ADA 200. A sample screen shot of the GUI is shown in FIG. 2. The list of data may be referred to as a unit of work (UOW). The ADA 200 may accept or reject from among the options presented in the list. In one embodiment, following entry by the ADA 200, the address database 100 may register the location, assign a unique identifier known as a consignee token, and may generate a manifest or provide another response back to the manifest application 14 or other application 16. In this aspect, the input obtained from the manifest application 14 or other application 16 to initiate the registration process 300 may result in an output generated by the address database 100.

Figure 34:
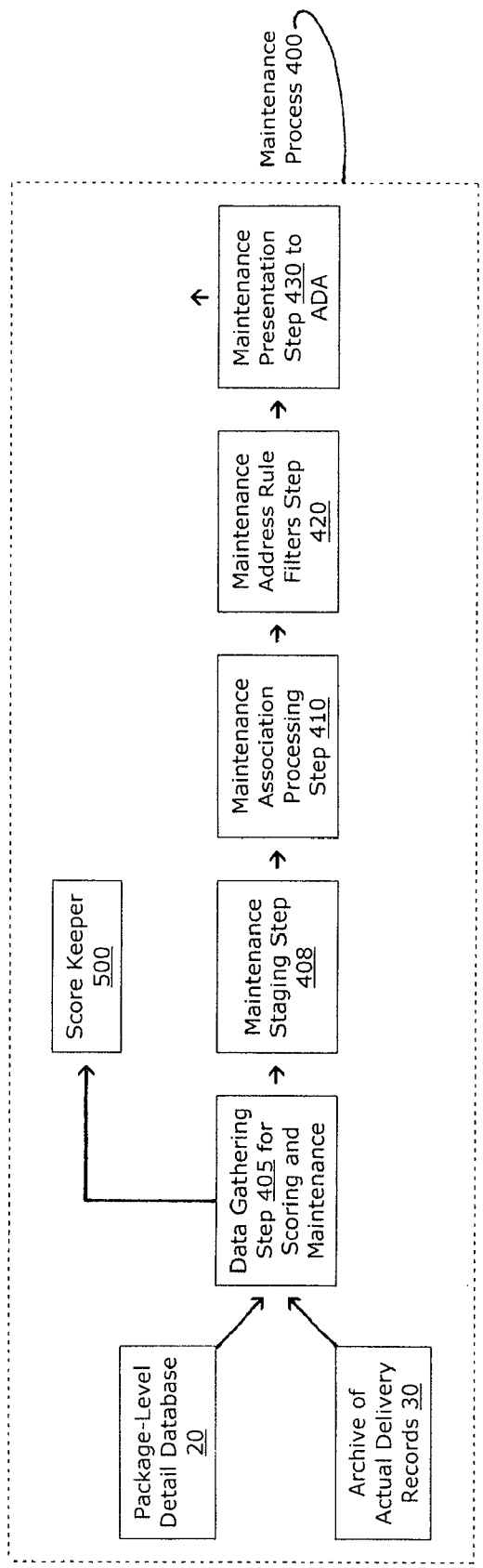
FIG. 34 is a flow chart illustrating an address maintenance process, according to one embodiment of the present invention.

The Maintenance Process: In one embodiment, the present invention may include a maintenance process 400, depicted generally in FIG. 1 and in more detail in FIG. 34. In general, the maintenance process 400 may be ongoing and continuous, requiring no specific input. The maintenance process 400 may begin, initially, after a certain number of days of data accumulates with respect to a particular location or a particular consignee. After a minimum quantity of data is accumulated and available for processing, the data may enter a queue or waiting list in the maintenance staging step 408, as shown in FIG. 34. The staging step 408 and the score keeper 500 are described in more detail below.

In one embodiment, the maintenance staging step 408, as described in more detail below, may monitor or count a number of specific types of occurrences until a threshold limit is reached before processing the data and presenting a unit of work to the ADA 200. In one aspect, the staging step 408 may hold the data for a pre-set duration, in order to accumulate sufficient data to warrant processing. The staging step 408 may also monitor the rate of change in any of a number of factors (delivery efficiency, success rate, and the like) and hold the data until the rate of change exceeds a pre-set limit. For example, the staging step 408 may monitor certain factors during a rolling multiple-day time window, comparing the factors to an historical time window, calculate the rate of change, and compare the rate of change to the pre-set limit.

When the stored data is released for processing, the maintenance association processing step 410 may be used to analyze the stored data in much the same way as the initial association processing step 310 analyzed a candidate address. The possible matches may be narrowed or otherwise limited by one or more maintenance rule filters in step 420. The output of the maintenance process 400 may include the step 430 of showing a maintenance presentation of an address to the address database administrator (ADA) 200. The ADA 200 may accept or reject from among the options presented in the list. In one embodiment, following entry by the ADA 200, the address database 100 may update the registration of the location.

DATA GATHERING: Referring again to FIG. 33, the registration process 300 may begin with an initial data gathering step 305. In one embodiment, the initial data gathering step 305 may include the steps shown in the FIG. 3. As shown at the left, the data gathering step 305 may begin with the assignment of an identifier known as a mining key 40 in step 60. As shown in FIG. 7, the mining key 40 may include a parcel tracking number and a delivery pattern code.

Figure 3:
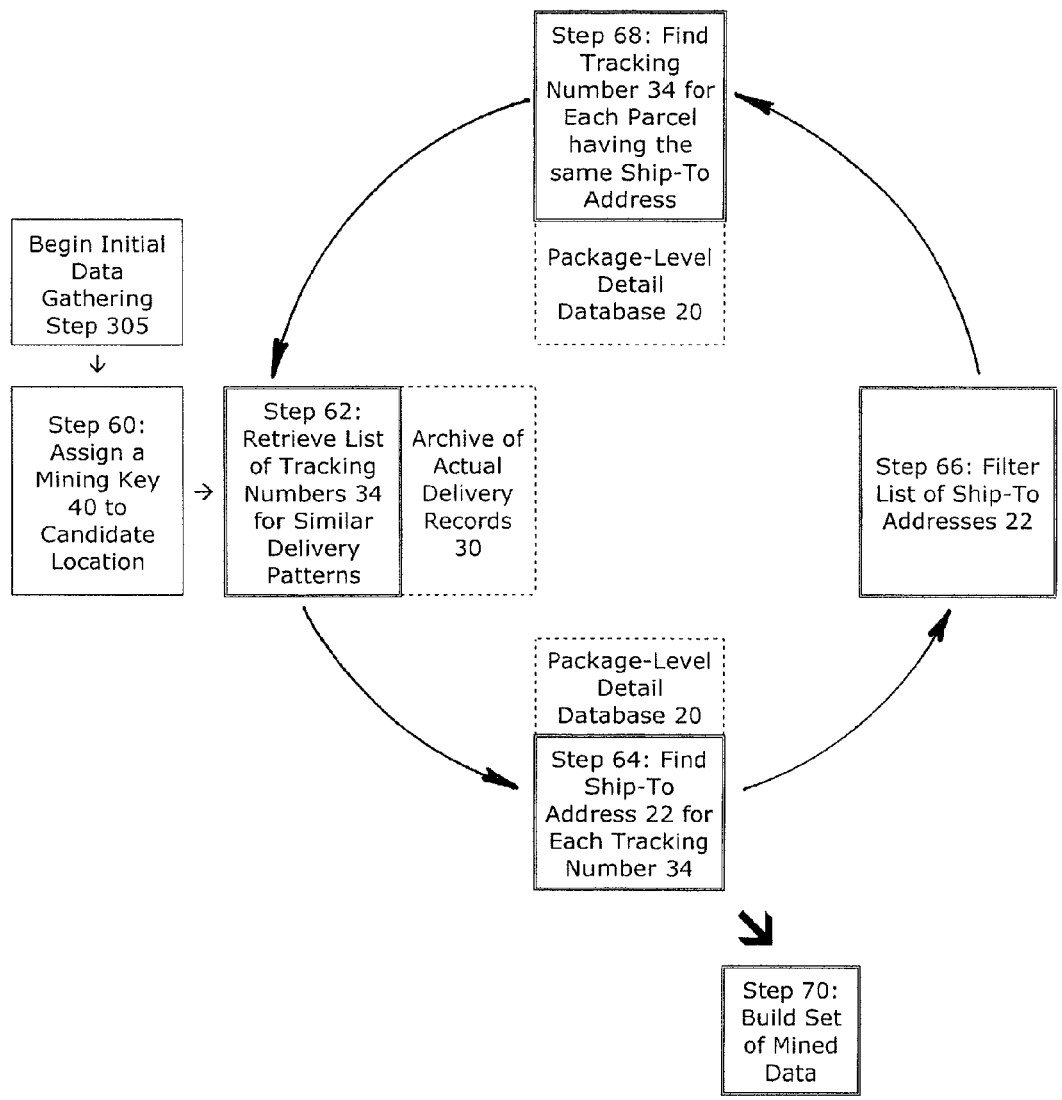
FIG. 3 is a flow chart illustrating an initial data gathering step, according to one embodiment of the present invention.

As illustrated in FIG. 3, the mining key may be used in step 62 to retrieve a variety of data from the archive of actual delivery records 30 about shipments having the same delivery pattern code as the one in the mining key. For example, if the mining key includes the "JZJ" delivery pattern code, then step 62 would include the retrieval of actual delivery records 30 having the "JZJ" delivery pattern code. For each matching record found, a parcel tracking number is retrieved.

In step 64, the parcel tracking numbers from step 62 are used to match records from the package-level detail database 20 of current active shipments having the same ship-to address. The results of steps 62 and 64 are shown in tabular form in FIG. 7.

Certain ship-to addresses may be disregarded in step 64 if they fit a pattern indicating they were ZIP-shipped. A "ZIP-shipped" parcel is one where the shipper uses minimal information (a ZIP code only, for example) to obtain a rate and a tracking number, and upload those to a parcel delivery service using off-the-shelf shipping systems. A ship-to address that includes only a ZIP code, for purposes of the data gathering step 305, would not produce meaningful results.

The results of steps 62 and 64 are used, in step 70, to build a set of mined data. For each pass or iteration through the cycle, the results may be added to the mined data in step 70.

Continuing through the cyclical data gathering step 305 illustrated in FIG. 3, the results are next compared to the previous results in step 66 and duplicate ship-to addresses are removed. Step 68 represents another iteration similar to the one in step 64.

As shown, the data gathering step 305 may include several iterations or passes. Each pass through the cycle produces additional potential matches that may be added to the set of mined data in step 70. The data gathering step 305 may be terminated if any of a variety of pre-set limits is reached. In one embodiment, the limits include a pass limit and an exit limit. The pass limit may act as an upper limit on the number of iterations or passes executed. For example, the pass limit may be set to ten. The exit limit may act as an upper limit on the quantity or number of matches to be processed. The exit limit may be a quantity, such as one thousand. The exit limit may be a percentage, triggering the end of data gathering if, for example, the total number of unique ship-to addresses increase less than five percent compared to the previous pass. FIG. 4 shows the list of programming steps in the data gathering process, according to one embodiment of the present invention.

Figure 5:
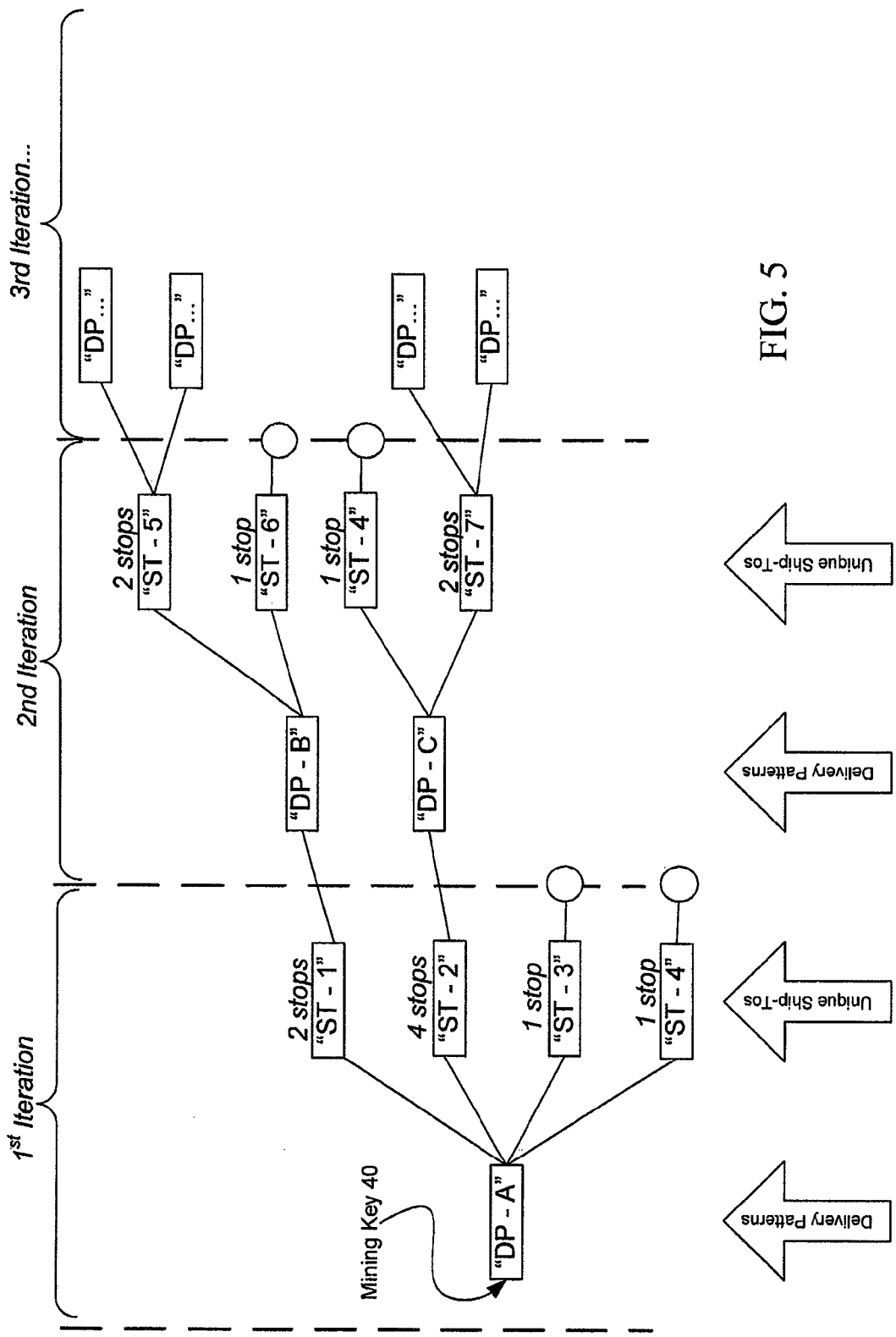
FIG. 5 is an illustration of several iterations of a registration process, according to one embodiment of the present invention.

FIG. 5 shows an example of an initial data gathering step 305 and illustrates the impact of filtering out the ship-to address delivery pattern searches that may result in collecting data for a wrong consignee. As shown in the column labeled "1st Iteration," the mining key 40 may include a delivery pattern code (DP) and a ship-to address (A). The mining key 40 (DP-A) may be used throughout the data gathering step 305 and subsequent processing. For the sake of clarity and simplicity in the figures and illustrations, the ship-to address data may be replaced with a single letter (A, R, G, T, and the like). For the actual processing steps, the ship-to address may include all the general attributes of address data.

The first iteration, as shown in FIG. 5, starts with the mining key 40 and delivery pattern code, and locates all the unique ship-to addresses (ST). For ship-to address one (ST-1), there are two stops or stop identifiers found. For ship-to address two (ST-2), there are four. For ship-to address three and four (ST-3 and ST-4), only one stop is found. The ship-to addresses that have fewer than two stops for the delivery pattern code are not used to search for more delivery patterns. By not using these ship-to addresses, the system avoids gathering data from a separate stop location that was either a likely mis-delivery and/or a very infrequent stop. On the other hand, by reducing the data set for a consignee who might have a low parcel volume per stop could produce unusually high variances in delivery patterns or variability in ship-to addresses.

The second iteration, as shown in FIG. 5, starts with finding the delivery pattern code (DP) for each stop identifier (ST-1 and ST-2). The delivery pattern code DP-B related to stop ST-1 produces two additional stop identifiers: ST-5 (with 2 stops) and ST-6 (with one). In the third iteration, only the stop identifiers with more than two stops are used to find additional delivery pattern codes.

Figure 6:
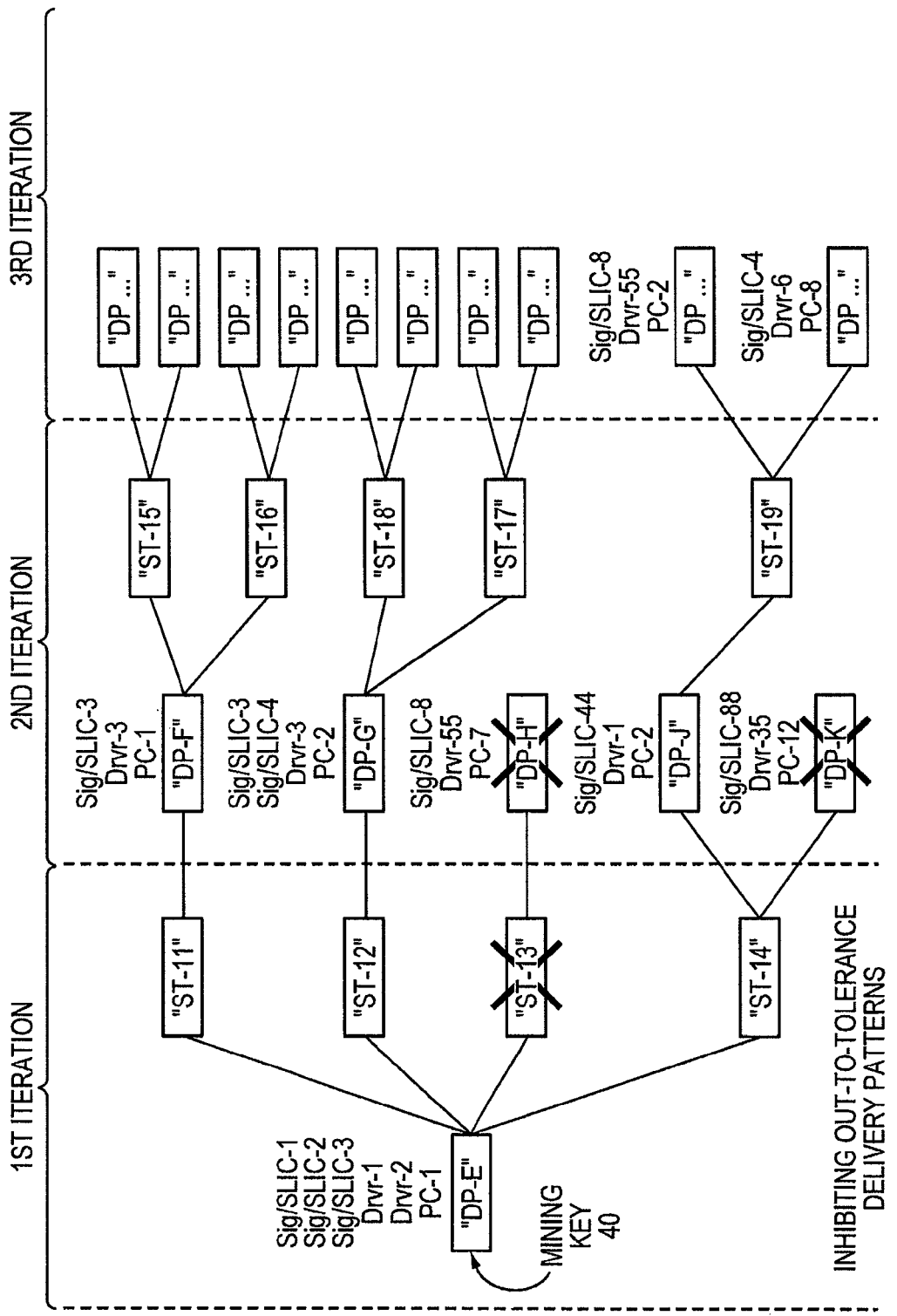
FIG. 6 is an illustration of several iterations of a delivery pattern in a registration process, according to one embodiment of the present invention.

The data related to each delivery pattern code may also include additional information, as shown in FIG. 6. Such additional information may include a signature capture with clarification, an SLIC code, a driver identifier, a postal code, and other stored data. As shown in FIG. 6, a variety of filters or inhibitors may be used to eliminate delivery patterns that are not representative of the desired consignee location. For example, one or more of the following inhibitors may be activated to eliminate delivery patterns that are not within a reasonable proximity of the consignee.

(1) A postal code inhibitor, with a tolerance of plus or minus zero within the same delivery pattern, may be used to eliminate an address having the desired delivery pattern but a different postal zip code.

(2) A driver identifier inhibitor may be used to eliminate an address with a driver who does not actually work in the delivery pattern.

(3) A signature and SLIC (combined) inhibitor may be used to eliminate an address associated with a stop for which the signature and SLIC do not match the signature and SLIC for other deliveries within the delivery pattern.

For example, referring to the second iteration in FIG. 6, the delivery pattern code DP-K is associated with postal code PC-12, which is different from the code PC-2 associated with the same stop identifier ST-14. Because the code PC-2 is similar to the others and the code PC-12 is different, the delivery pattern for the PC-12 stop is eliminated. Similarly, for delivery pattern DP-H is eliminated because the associated code is PC-7; furthermore, because the pattern DP-H is the only one associated with stop identifier ST-13 from the first iteration, stop ST-13 is also eliminated. In this aspect, delivery patterns eliminated in later iterations may be used to remove matches found in previous iterations when it is determined the data is not accurate.

The method of applying inhibitors to the data may include two general steps. First, for allowed delivery patterns in a current iteration, new inhibitor values may be added to the list of allowed inhibitors. Second, on the next subsequent iteration, the list of allowed inhibitors may be compared to the candidate inhibitors discovered in the current iteration. If any set of stops defined by a given delivery pattern do not have a candidate inhibitor that matches one of the allowed inhibitors, then the given delivery pattern is not allowed. If the previous or root ship-to address for the dis-allowed delivery pattern is not a root for one or more other, allowed delivery patterns, then the root ship-to is not allowed. In this aspect, the elimination of data may propagate back, to remove unreliable data from previous iterations.

Referring again to FIG. 3, the mining key 40, in one embodiment, may include a parcel tracking number and a delivery pattern code. In the example illustrated in the tables of mined data in FIG. 7, "JZJ" is the delivery pattern code associated with the example mining key 40. In step 62 illustrated in FIG. 3, the data gathering step 305 of the system of the present invention searches all the actual delivery records 30 for parcels having the same delivery pattern (JZJ) as the mining key 40. The list of matches is tabulated in FIG. 7 in the left column under Iteration #1. For each delivery record having the same delivery pattern (JZJ), step 62 includes finding the tracking number and the ship-to address. The parcel tracking numbers begin with the characters "1Z . . . " and the ship-to address is represented by a single capital letter (F, R, N, B, etc.).

In step 68, illustrated in FIG. 3, the data gathering step 305 of the system of the present invention searches all the records in a package-level detail database 20 for parcels having the same ship-to address (F, R, N, B, etc.) as the matches found in step 62. The list of matches for step 64 is tabulated in the right column under Iteration #1 in FIG. 7. For each delivery record having the same ship-to address, step 68 includes finding the tracking number and the delivery pattern (JZJ, TKI, etc.). As illustrated, the use of the ship-to addresses for searching (in step 64) may result in the appearance of additional delivery patterns beyond the delivery pattern associated with the mining key 40 (JZJ). Thus, in subsequent iterations, the number of delivery patterns increases and, therefore, the number of matching records increases, as illustrated in FIG. 7, Iteration #2.

The several pages of FIG. 7 also include the data mined during Iteration #3 and Iteration #4. A review of the iterations, in succession, will illustrate how additional data is found using the mining key 40, subsequent matches, and the combination of various record elements (delivery pattern code, ship-to address, tracking number) used during subsequent iterations.

The data gathering step 305 of the system of the present invention may include the task of sorting the mined data from the final iteration. For example, the mined data shown in FIG. 7, Iteration #4, may be sorted. The mined data may be sorted by stop identifier, for example, as shown in the Table 1 of FIG. 8. The mined data may also be sorted by delivery pattern code, as shown in Table 2 of FIG. 8.

ASSOCIATION PROCESSING: Referring again to FIG. 33 and continuing with a description of the registration process 300, the present invention may include an initial association processing step 310. Step 310 may be used to establish statistically significant associations between and among the various ship-to addresses found during the initial data gathering step 305. In other words, association processing 310 may be used to determine which ship-to addresses in the set of mined data refer to the same discrete location or otherwise belong together.

In one embodiment, the associations between data are determined by observing the coincidence of different ship-to addresses within the same delivery event, and also by observing the coincidence of different ship-to addresses for parcels delivered to the same delivery pattern. As illustrated in Iterations #1 through #4 in FIG. 7, the data gathering step 305 may be over-inclusive. The association processing step 310 may be used to refine the results of the data gathering step 305 in order to help the ADA 200 to make sense of the data presented to her. In one embodiment, the goals of the association processing step 310 may include:

(1) Producing lists of ship-to addresses where the addresses within a list are statistically likely to belong to the same location;

(2) Producing the lists of ship-to addresses as a hierarchy such that multiple lists at the highest order are statistically less likely to belong to the same location; and (3) Providing statistically significant measures and/or observations related to each list of ship-to addresses.

One overall goal of the initial association processing step 310 is to provide sufficient information to the ADA 200 to enable a quick and accurate update of the address database 100.

The following processes and techniques may be referred to generally and collectively as association processing 310.

Ship-To Address Pre-conditioning: In one embodiment, the association processing step 310 may include a pre-conditioning of the ship-to addresses. In this aspect, the pre-conditioning may reduce the number and variety of permutations of the ship-to addresses by stripping away useless information that is most likely not related to the address. The pre-conditioning process is valuable because it reduces those address variations that may make it more difficult to detect useful trends. In one embodiment, the pre-conditioning process may include:

(1) Converting each ship-to address to a single letter case; either all upper or all lower.

(2) Removing redundant white-space from each ship-to address.

(3) Normalizing any non-address sequence values, such as purchase order numbers, return authorization numbers, etc., by replacing them with appropriate representative symbols. This process may be called Sequence Value Normalization, described in greater detail below.

(4) Placing a unique mark on any ship-to address that is completely blank, in order to prevent the incorrect assumption during association processing 310 that blank ship-to addresses are comparable.

Sequence Value Normalization: In one embodiment, the association processing step 310 may include a process called Sequence Value Normalization. The concept is to detect a sequence of characters that have unique values, and also have consistent adjoining text. The normalization process removes the highly-variable portion of an otherwise consistent pattern and, in use, usually does not remove any useful address information. The normalization process may include the general steps of:

(1) Identifying all one-time occurring words that contain numbers (and may also contain letters) from the set of one-occurrence ship-to addresses (records having a frequency of one) in the gathered data.

(2) For every potential detected sequence value, assure that the remaining text of the whole ship-to address is found multiple times throughout the other ship-to addresses and, if so, replacing the detected sequence value with a pre-set symbol or wildcard that represents what was replaced.

Figure 9:
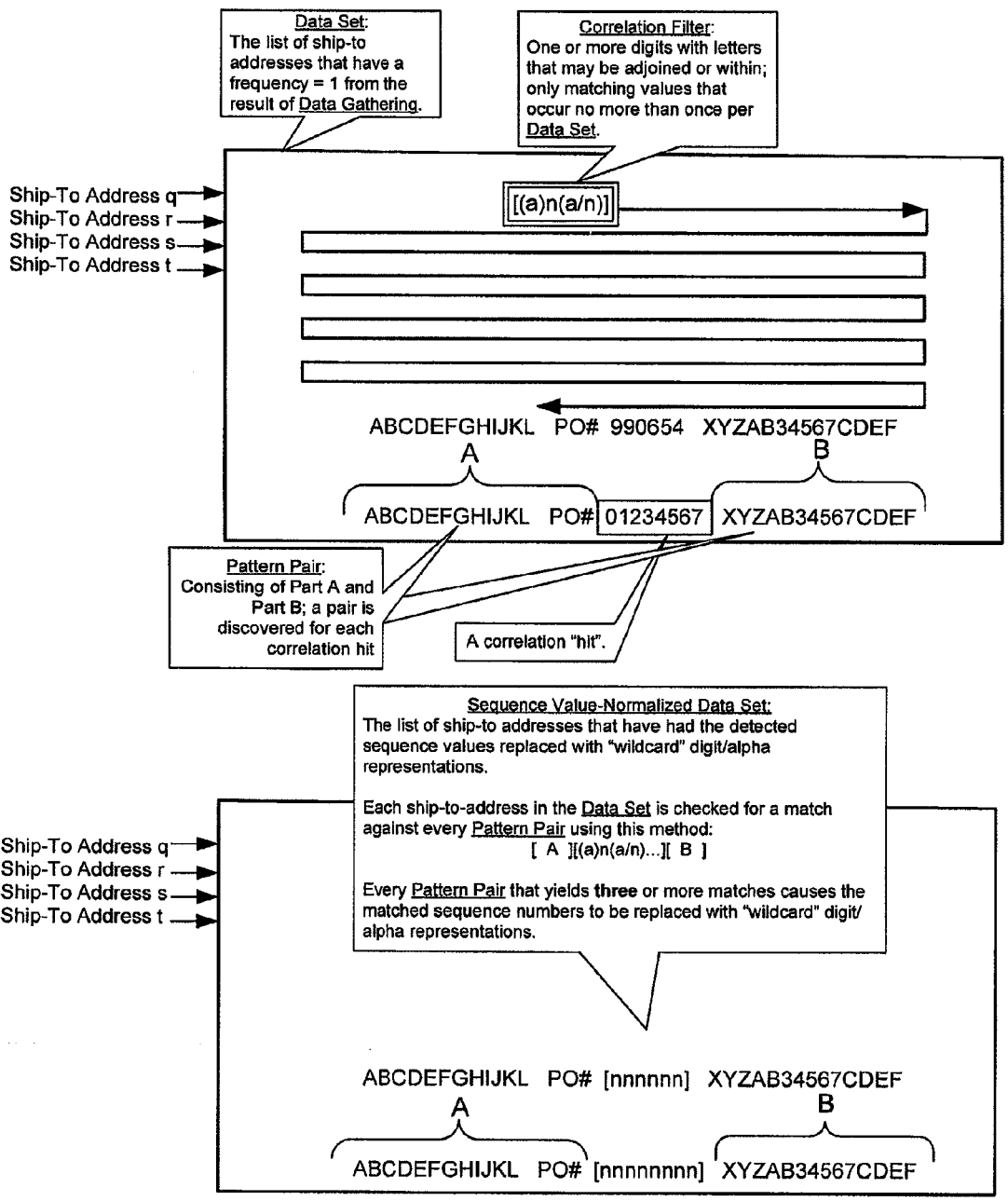
FIG. 9 is a graphical illustration of a sequence value normalization process, according to one embodiment of the present invention.

FIG. 9 illustrates the process of Sequence Value Normalization. The data set to be normalized may include only those ship-to addresses that appear once; in other words, have a frequency value equal to one. The Sequence Value Normalization process, in one embodiment, may be designed to be relatively cautious so that it will not replace all the possible sequence values that may exist in the data. In one embodiment, the Sequence Value Normalization process may contain the following restrictions:

(1) Target only those ship-to addresses that appear once.

(2) Use only sequence values that occur once throughout the data. Identification of the once-occurring sequence values may be accomplished by applying a correlation filter.

(3) A valid sequence value is a word that consists only of at least one digit and one or more alphabet letters.

(4) The other text of the ship-to address surrounding a sequence value must re-occur within other ship-to addresses that also contain a sequence value.

Clustering: The clustering process, in one embodiment, may use two of the most reliable and consistent measures available in the delivery data to determine likely associations between ship-to addresses: (a) stop coincidence, and (b) delivery pattern coincidence. Stop coincidence refers to a coincidence of delivery at the same delivery event or stop. Delivery pattern coincidence refers to a coincidence of delivery related to the same delivery pattern.

The relationships formed by stop coincidence may be the strongest and most reliable measures, but are sometimes weakened by mis-deliveries and lack of ship-to address diversity within a stop. The sorting by stop of the mined data tables, as shown in FIG. 8, represents an example of clustering based on stop identifier.

The relationships formed by delivery pattern coincidence may be strong only when delivery personnel make and record consistent delivery records, and when the delivery records uniquely define each location. The sorting by delivery pattern of the mined data tables, as shown in FIG. 8, represents an example of clustering based on delivery pattern.

Similarity Matrices: In one embodiment, the association processing step 310 may include the construction of one ore more similarity matrices. The process of building a similarity matrix may be illustrated graphically; however, in general, each matrix is built and stored mathematically. FIG. 10 shows an example construction of a Delivery Pattern Similarity Matrix. FIG. 11 shows show an example construction of a Stop Similarity Matrix. One purpose of these two matrices is to measure the relationships between pairs of ship-to addresses (A-B, A-C, A-D, and the like).

Referring to FIG. 10, a first step in constructing a delivery pattern similarity matrix is to count the coincidence of each delivery pattern versus each ship-to address. The steps may also include a sum for each ship-to address. The construction of a delivery pattern similarity matrix may include summing the coincidences for all the possible pairings of ship-to addresses. In general, the higher the coincidence count of two ship-to addresses, the more likely it is that the two addresses are similar and related to one another.

Referring to FIG. 11, a first step in constructing a stop similarity matrix is to count the coincidence of each stop identifier versus each ship-to address. The steps may also include a sum for each ship-to address. The construction of a stop similarity matrix may include summing the coincidences for all the possible pairings of ship-to addresses. In general, the higher the coincidence count of two ship-to addresses, the more likely it is that the two addresses are similar and related to one another.

Dendrograms: In one embodiment, the association processing step 310 may include the step of converting one or more of the similarity matrices shown in FIG. 10 and FIG. 11 into one or more dendrograms. A dendrogram is a hierarchical tree-like diagram used to illustrate the arrangement and relationship of data points in a set. One purpose of the dendrogram construction, in one embodiment, is to help mathematically force the association and dis-association between and among the set of all provided ship-to addresses. The dendrogram technique may involve iterative selections of the best available pairings of ship-to addresses and groups of ship-to addresses. The dendrogram may be considered complete when no additional pairings are possible. Once paired, the result may be referred to as a joined node.

In one embodiment, one dendrogram may be completed for ship-to addresses having a similar stop (stop-joined addresses). Another dendrogram may be completed for ship-to addresses having a similar delivery pattern (pattern-joined addresses).

In one embodiment, the technique for building a Stop-Joined Dendrogram, as shown in FIG. 12, may include the following steps:

(1) Evaluate the similarity matrix by choosing the pair of ship-to addresses with the highest count. If there is a tie of multiple pairs with the highest count, then prefer to choose a pairing of the highest levels (of the combined pairing).

(2) The selected pair becomes a new (next higher level) node. The node may be referred to as a joined stop node.

(3) The frequency of the new node is the count of the pair from the similarity matrix.

(4) The two sets of similarity matrix counts for the selected pair (as they relate to other ship-to addresses) are combined into a single new set. A summation of the two linear arrays is performed to yield a new array.

(5) Begin a new iteration for the next node-join. The dendrogram is complete when the available nodes in the similarity matrix have zero counts.

FIG. 12 illustrates the construction of a sample Stop-Joined Dendrogram. For each node in the dendrogram, there may be associated data including stop frequency, driver identifier, signature capture and clarification, delivery pattern, and date. For example, the node for ship-addresses H and N has a value or frequency of 4, and the node includes sample data such as Janovski for the driver identifier, a signature clarification including two entries for Amy, one for Bergeron, and one for Smit, two delivery patterns (JZJ and OZK), and a median event date of "7 Jul. 2005." Similar data is available and connected to each node in the dendrogram.

One underlying rationale for building a stop-joined dendrogram is that a co-delivery of parcels to multiple ship-to addresses is a highly-reliable indicator of a close association between those addresses. The system, therefore, accumulates and tabulates these coincidences. The relationship of co-delivered ship-to addresses is logical, based on the general rule: "If A is related to B, and B is related to C, then A is related to C according to a weighting factor that sums AB and BC." Also, note that a degradation of this association between co-delivered ship-to addresses may be caused by (a) mis-deliveries within multiple package stops, and/or (b) operations-initiated returns, which look like mis-deliveries if the user does not update the ship-to address.

Figure 13A:
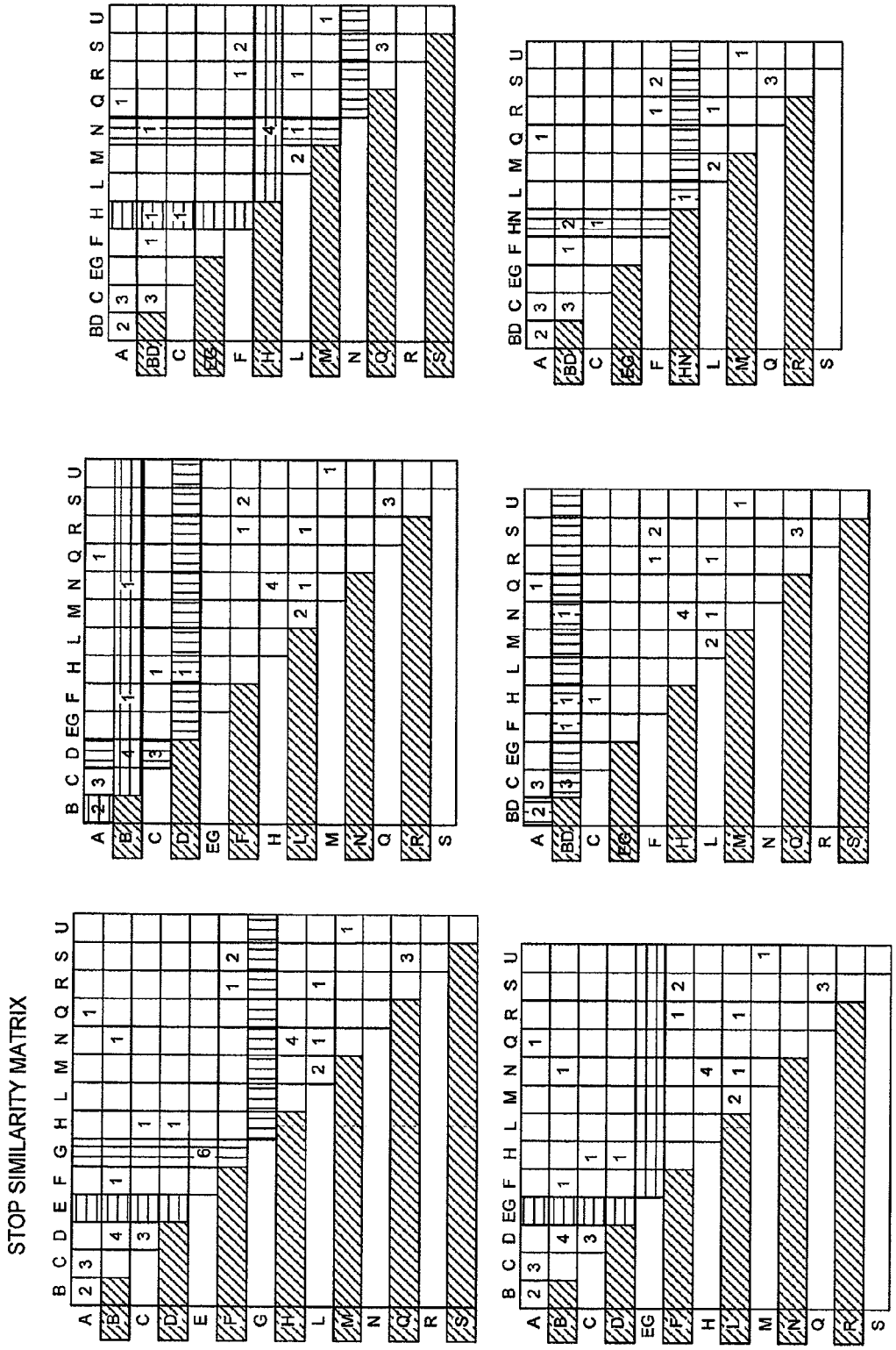
Figure 13B:
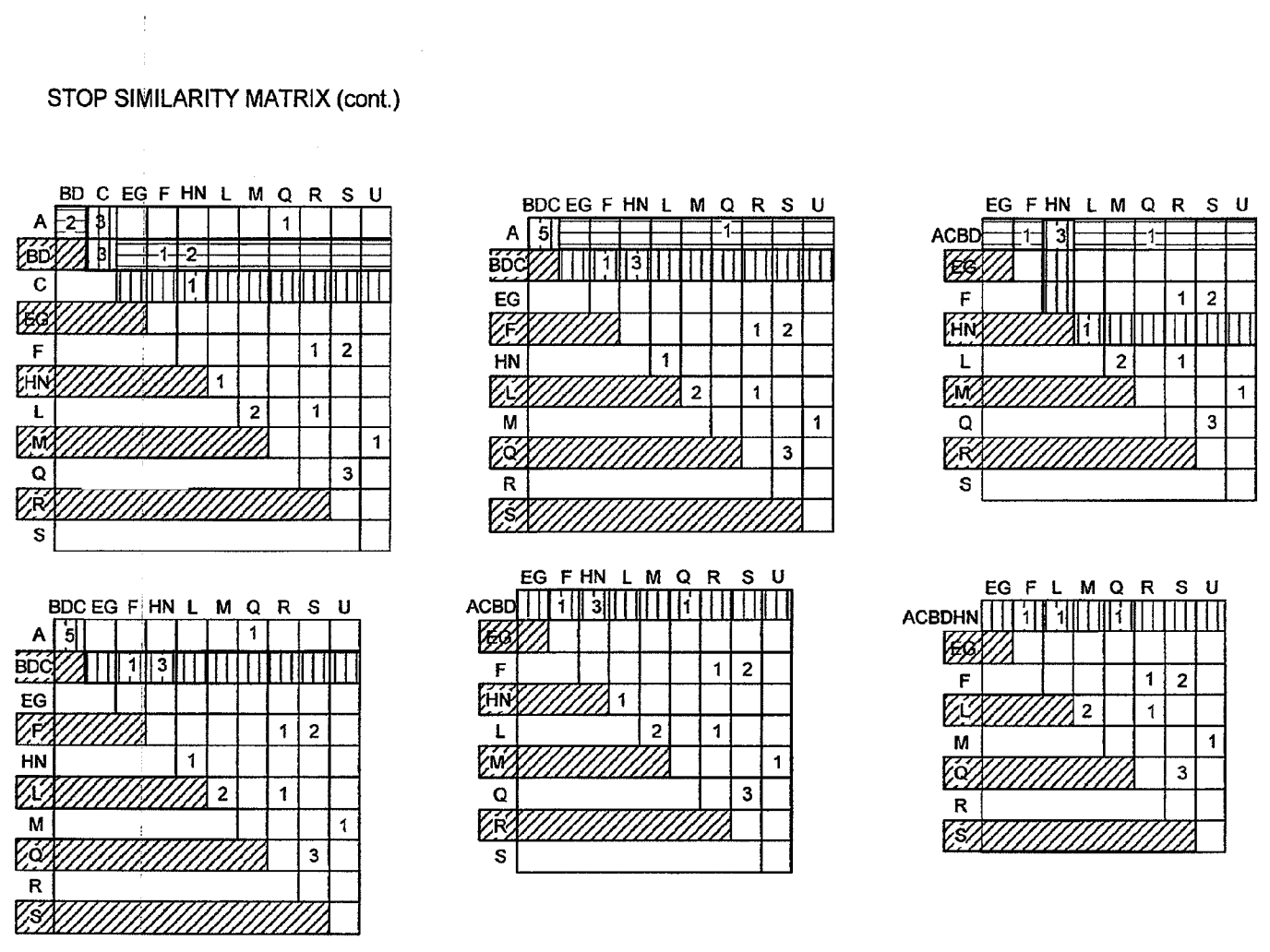
Figure 13C:
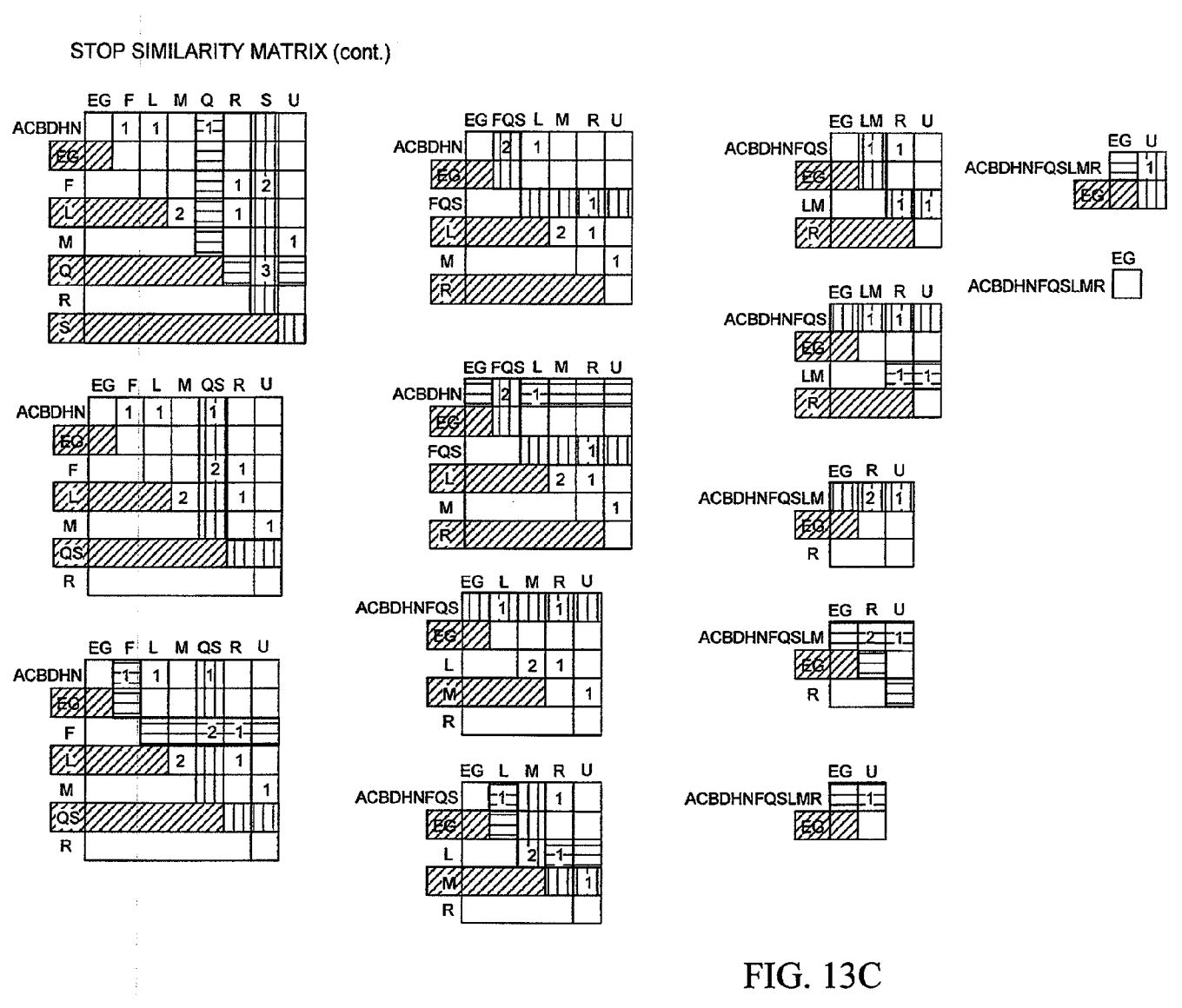

FIGS. 13A-13C are an example showing each iteration, and each decision made, during the construction of a Stop-Joined Dendrogram, according to one embodiment of the present invention. Each iteration may begin with the selection of the two nodes to join, with the overlap count highlighted.

In one embodiment, the technique for building a Delivery Pattern-Joined Dendrogram, as shown in FIG. 14, may include the following steps:

(1) Evaluate the similarity matrix by choosing the pair of ship-to addresses with the highest count. If there is a tie of multiple pairs with the highest count, then prefer to choose a pairing of the lowest levels (of the combined pairing).

(2) The selected pair becomes a new (next higher level) node. This node may be referred to as a joined pattern node.

(3) The frequency of the new node is the count of the pair from the similarity matrix.

(4) The two sets of similarity matrix counts for the selected pair (as they relate to other ship-to addresses) are combined into a single new set. A minimum of the two linear arrays is performed to yield a new array.

(5) Begin a new iteration for the next node-join. The dendrogram is complete when the available nodes in the similarity matrix have zero counts.

One underlying rationale for building a delivery pattern-joined dendrogram is that using the same delivery pattern for multiple ship-to addresses is a sometimes-reliable indicator of a close association between those addresses. Because the reliability of the association is somewhat less than for the stop joined dendrogram, a considerable weight may be attached only to those association where there is a strict overlap. The strict overlap limitation corresponds to the general rule: "If A is related to B, B is related to C, and A is related to C, then ABC are related according to a factor or weight equal to the minimum of AB, BC, and AC." Also, note that a degradation of the associations in the pattern-joined dendrogram may be caused by one or more of the following: (a) different stop locations with consistent and identically recorded delivery patterns; (b) mis-recorded deliveries that happen to have the same delivery pattern as another stop location: (c) actual mis-deliveries that happen to have the same delivery pattern as another stop location; and/or (d) operations-initiated returns that look like mis-deliveries if the user does not update the ship-to address.

Figure 15A:
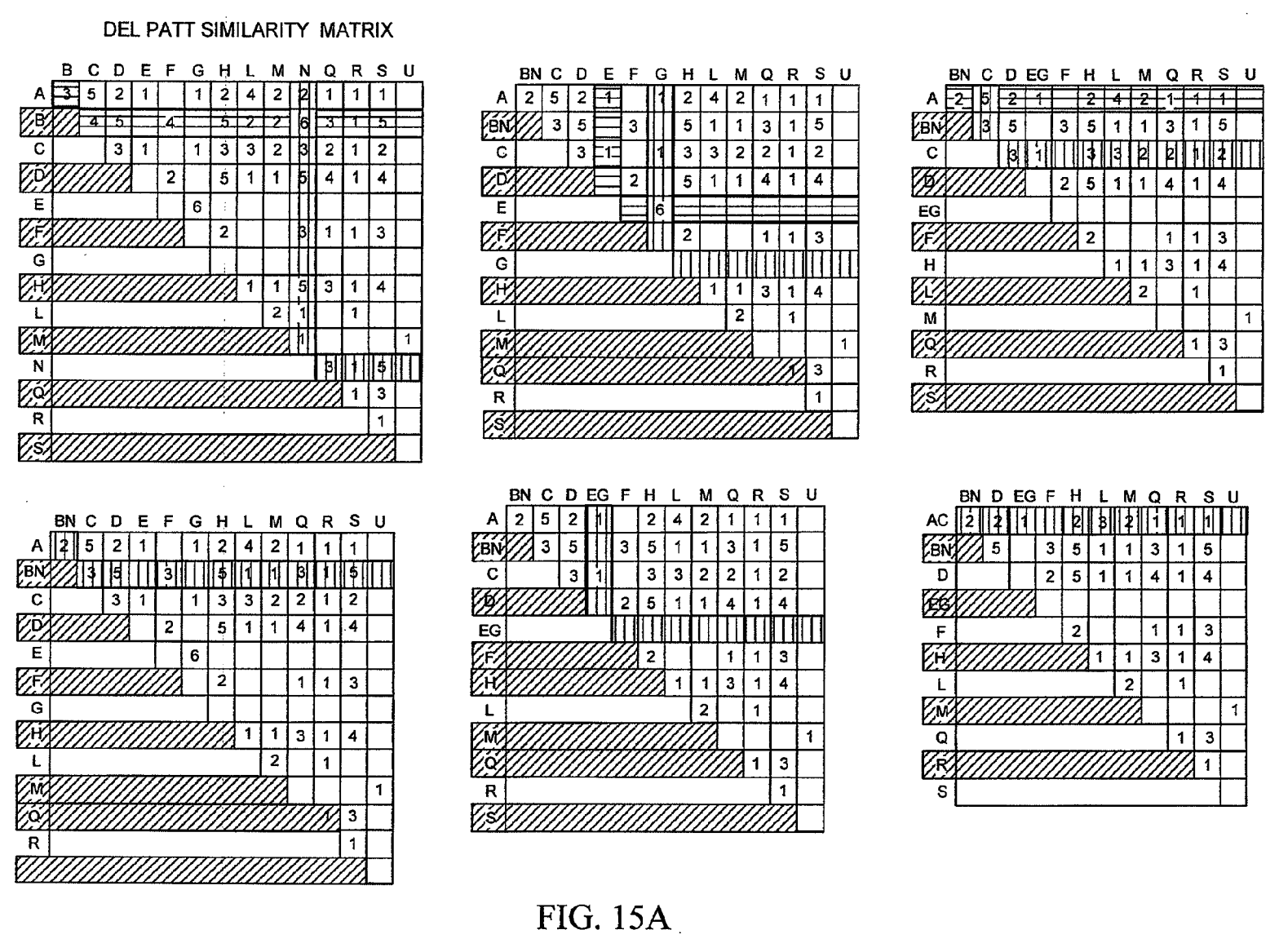
Figure 15B:
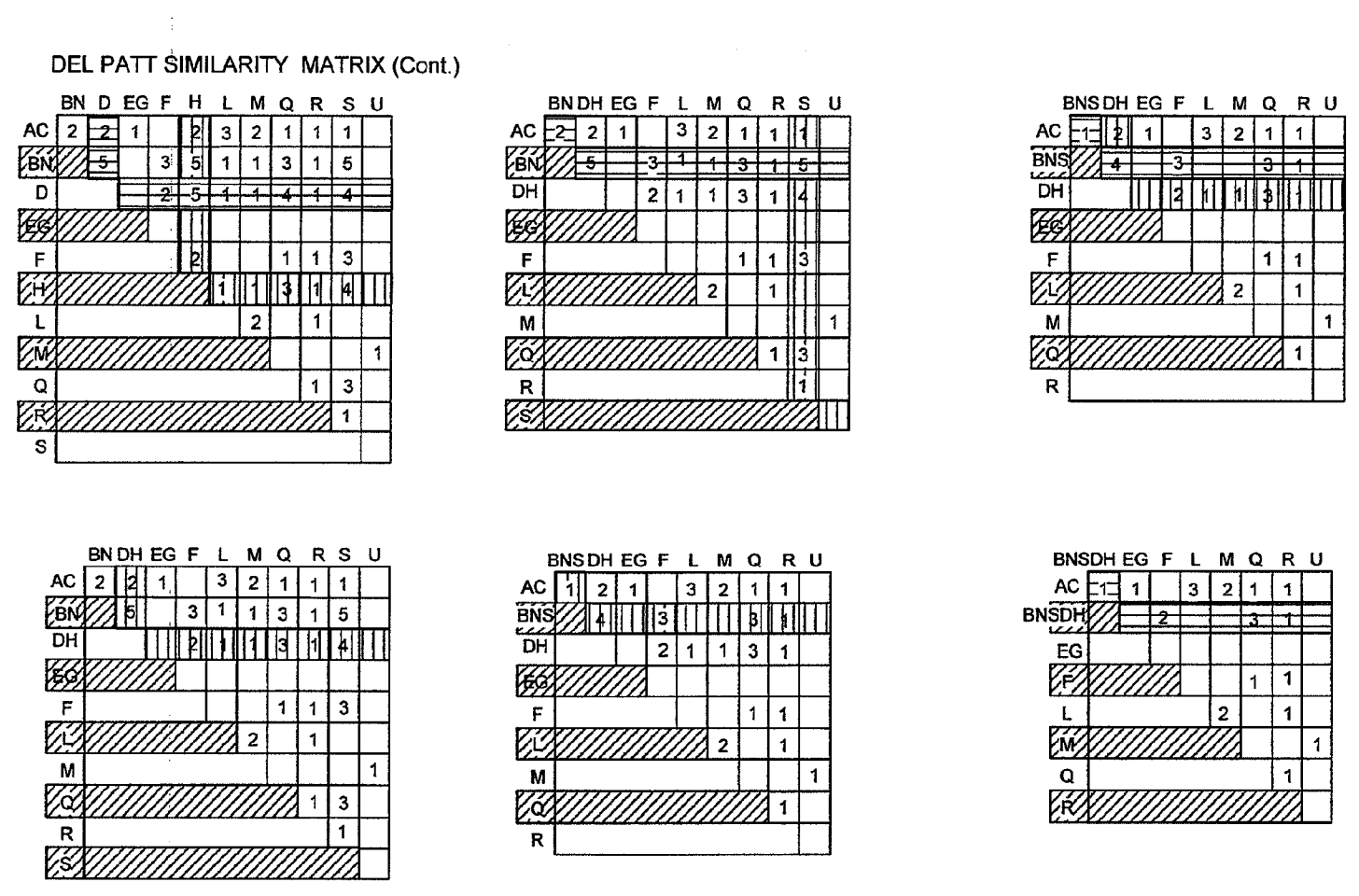
Figure 15C:
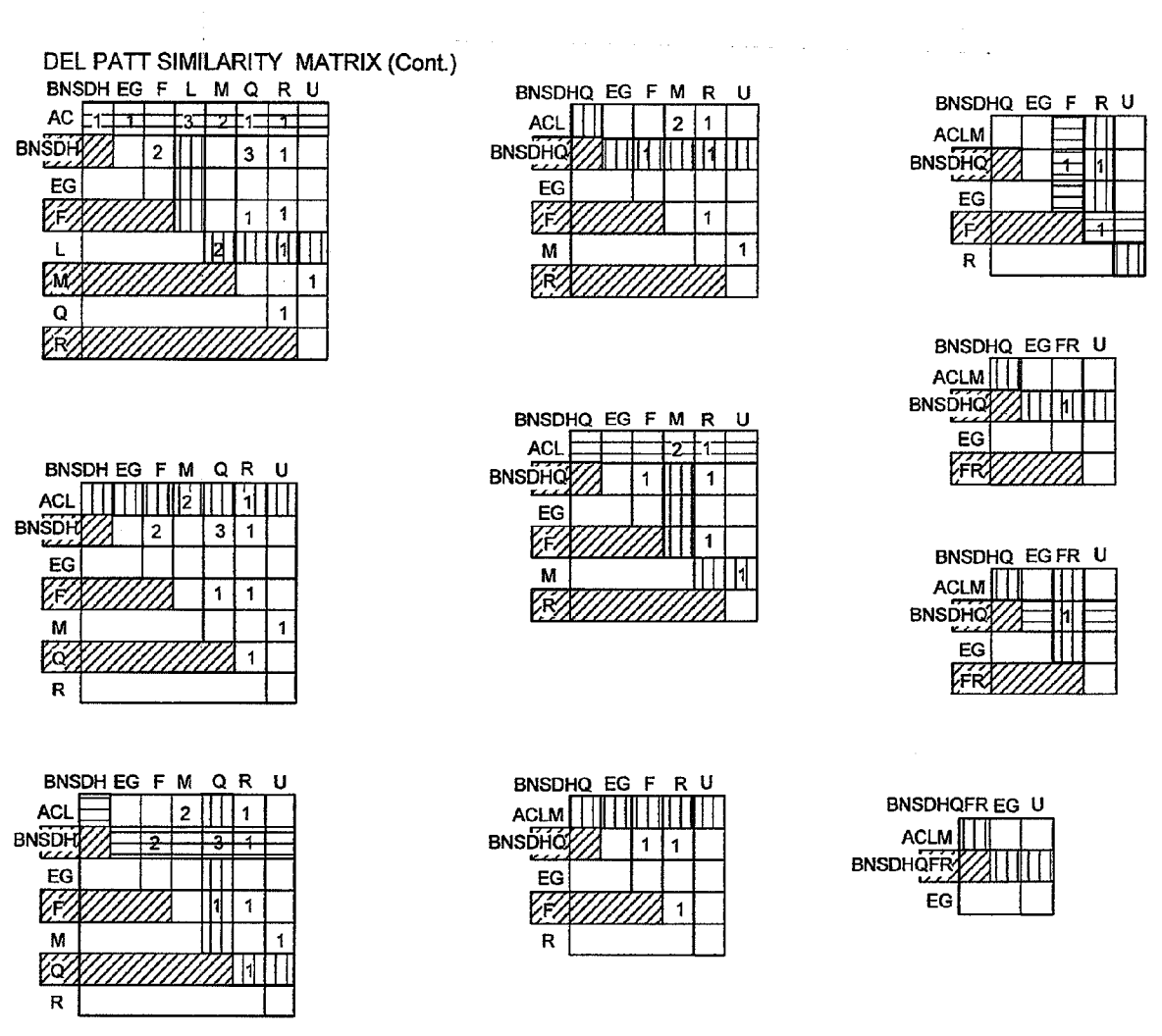

FIGS. 15A-15C are an example showing each iteration, and each decision made, during the construction of a Delivery Pattern-Joined Dendrogram, according to one embodiment of the present invention. Each iteration may begin with the selection of the two nodes to join, with the overlap count highlighted. FIG. 16 shows the list of programming steps in the dendrogram process, according to one embodiment of the present invention.

Cluster Cruncher: In one embodiment, the association processing step 310 may include the step known as the Cluster Cruncher process. One purpose of the cluster cruncher is to convert the dendrograms into a simple hierarchy of lists of statistically associated ship-to addresses.

Figure 17:
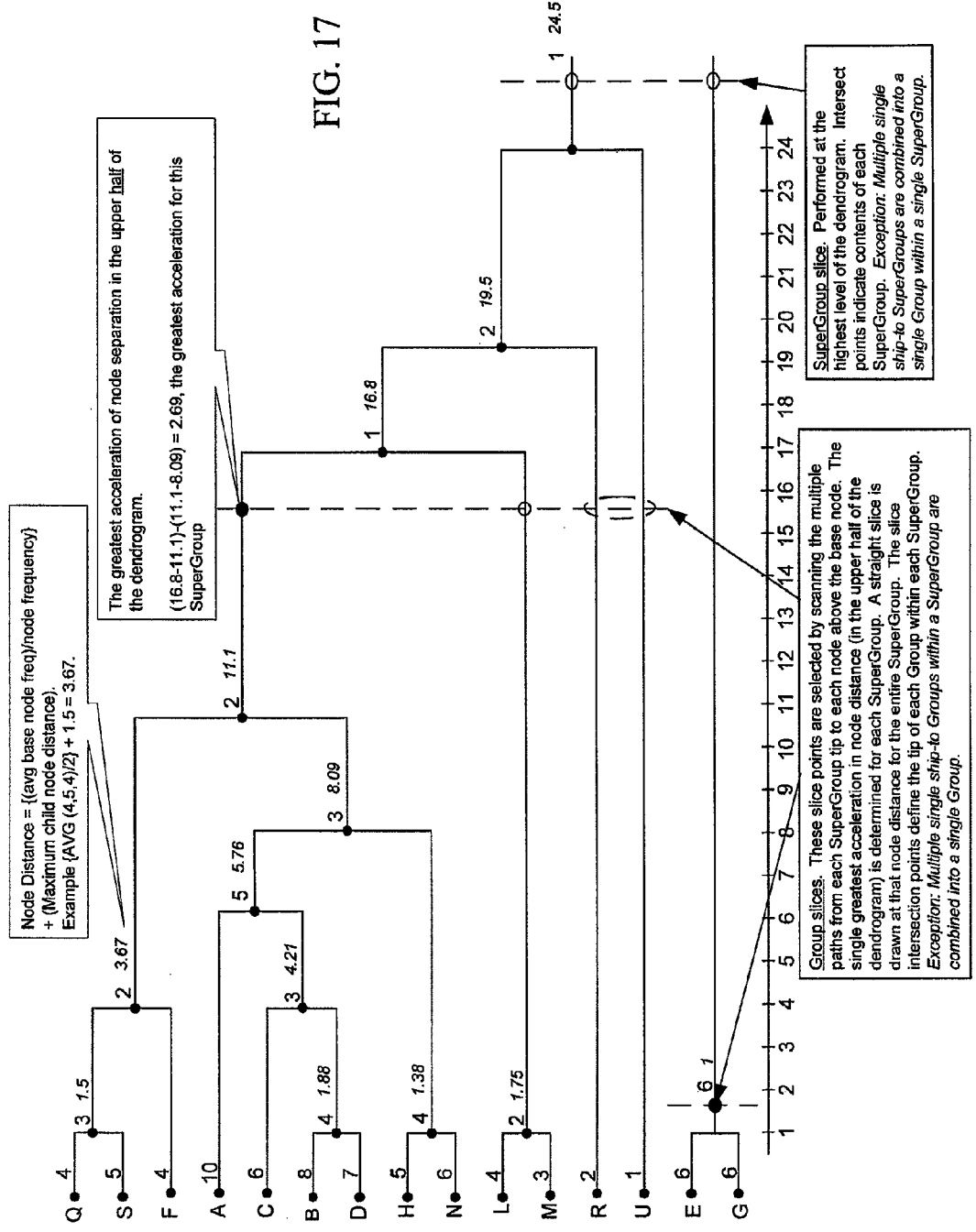
FIG. 17 is an illustration of a dendrogram of ship-to addresses, joined by stop, according to one embodiment of the present invention.

In the Cluster Cruncher output, in one embodiment, ship-to addresses may be grouped according to the base nodes of the Super Groups and Groups as defined by the Stop-Joined Dendrogram, as illustrated in FIG. 17. These Groups are clusters of ship-to addresses selected using a cluster detection algorithm. The first step in identifying the clusters may be to re-draw the dendrogram with a horizontal axis (shown across the bottom of FIG. 17) representing what is called the node distance.

As shown in FIG. 17, the example stop-joined dendrogram begins, at the left side, with base nodes representing pairs of stops. For example, the first base node is for stops Q and S. The next node is for stops Q and S, joined with stop F. The overlap for the Q-S-F node has a frequency of two stops. From the number of stops and the stop frequencies, a node distance may be calculated. The node distance may be expressed as the average of the base node frequencies, divided by the joined node frequency, plus the maximum child (previous) node distance. The node distance between stop nodes may be referred to as a stop node distance. This relation is applied to the Q-S-F node in FIG. 17, to calculate a node distance of 3.67.

The node distance for each node in the dendrogram may be used, in the Cluster Cruncher routine, to identify node Groups and Super Groups. Once the node distances are known, the degree of change between nodes (the node acceleration) may be calculated and compared to other nodes.

As shown in FIG. 17, a Super Group may be identified at the highest level, or right side, of a stop joined dendrogram. Once identified, the Super Groups may be connected by a Super Group slice, as shown.

The node Groups may be identified at one or more intermediate points in the dendrogram, as shown, by analyzing the distance from each Super Group tip to each intermediate node (above the base node level). In this analysis, the single greatest acceleration in node distance is determined for each Super Group. A vertical slice is drawn through that location, through all the node distances in each Super Group. The slice intersection points define the tip of each Group.

The adjacent node distances may be used to calculate the location of the greatest node acceleration, or rate of change of node distances. For example, as shown in the text box in FIG. 17, the mathematical point of greatest node acceleration lies along the node distance marked 11.1. As shown in the calculation, the subsequent node distance (16.8) and the immediately previous node distance (8.09) are compared, to calculate a node acceleration of 2.69.

Figure 18:
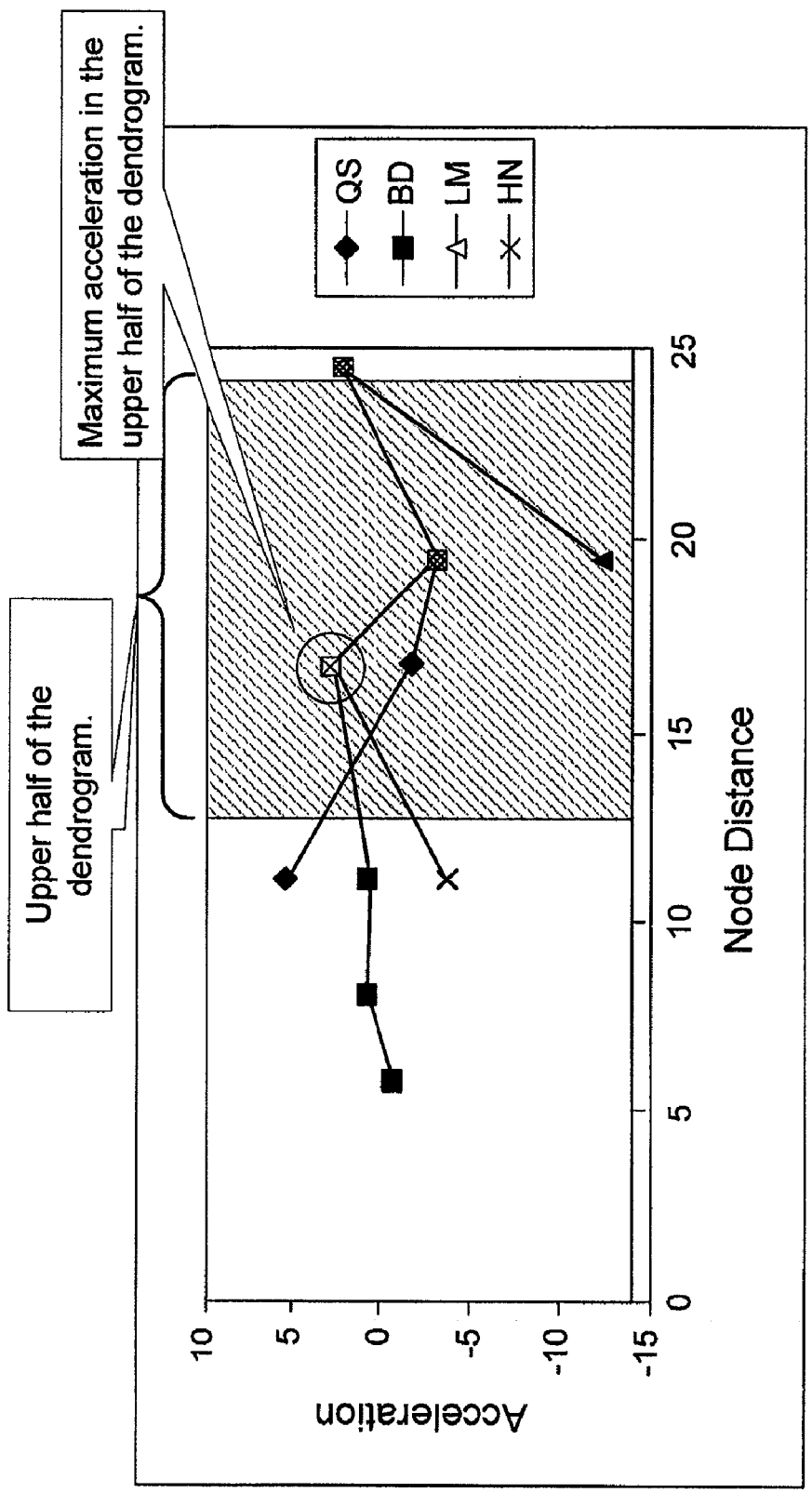
FIG. 18 is a graphical representation of acceleration versus node distance in a dendrogram, according to one embodiment of the present invention.

The node accelerations may be plotted on a graph, as a function of node distance, as shown in FIG. 18. The plot lines represent the various nodes (pairs of stops), such as the Q-S node, represented by the diamond-shaped points. The graph in FIG. 18 illustrates one technique for selecting the optimal Groups within each Super Group. The node acceleration for each sequence of node distances may be measured, for each path, from a base node to the Super Group tip. The maximum acceleration found inside the upper half of the dendrogram determines the distance value to be used as the slice point, which in turn determines the Groups within each the Super Group. The use of this data by the Cluster Cruncher process is explained below.

Figure 19:
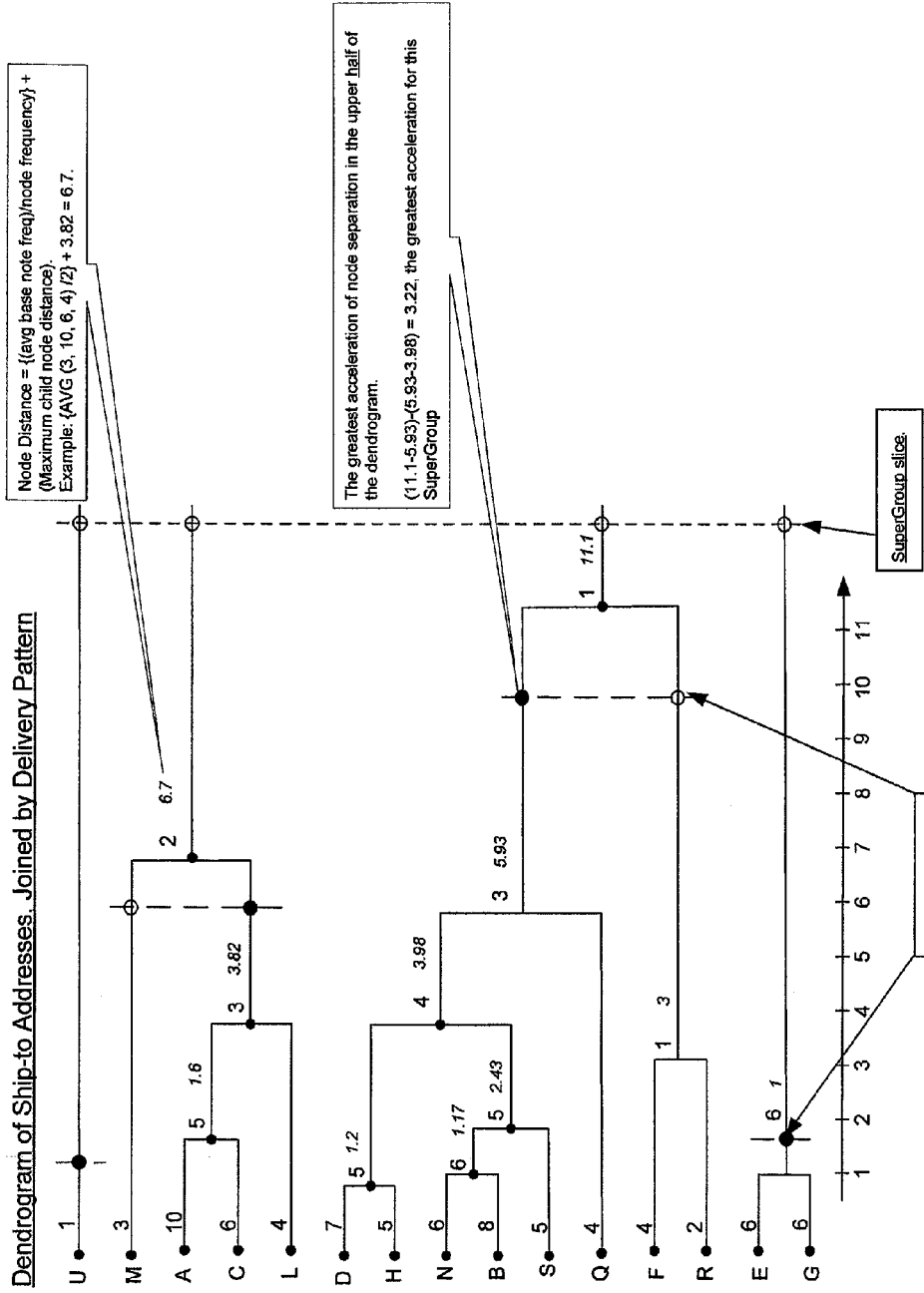
FIG. 19 is an illustration of a dendrogram of ship-to addresses, joined by delivery pattern, according to one embodiment of the present invention.

The techniques applied to the stop joined dendrogram in FIG. 17 and FIG. 18 may also be applied to a delivery pattern-joined dendrogram, as shown in FIG. 19. The node distance between pattern nodes may be referred to as a pattern node distance. The Super Groups and intermediate Groups may be identified according to the same relationships of node distance and node acceleration discussed above.

In one aspect, the Super Groups and Groups for the pattern-joined dendrogram offer an explanation of the reason each pair of ship-to addresses may be closely associated with one another. For example, if the set of ship-to addresses comprising a particular Super Group of this dendrogram is equal to the set of ship-to addresses from any group of the stop-joined dendrogram (FIG. 17), then the stops are part of the same group because (1) both stops were co-delivered (along the same delivery pattern), and (2) both stops represent the same delivery address (consignee location). In this aspect, the pattern-joined and stop-joined dendrograms, by and through the Cluster Cruncher process, may be used to identify the ship-to addresses in the set of mined data which are most likely to be closely related.

Although the Cluster Cruncher process may be illustrated graphically, as shown in FIG. 17, FIG. 18, and FIG. 19, the process, in general, occurs mathematically through a programmed series of staging, joining, and calculating steps. FIG. 20 shows the list of programming steps in the Cluster Cruncher process, according to one embodiment of the present invention.

The Cluster Cruncher process may be governed by one or more of the following general rules:

(a) A single ship-to address may be repeated in the output for as many permutations of the Outcome values as may be found in the base node. The concept of Outcome values is disclosed in more detail below. In general, an Outcome value represents a feature of the delivery, according to the record in the package-level detail database 20 associated with that particular delivery.

(b) The Count value(s) for each ship-to address may be determined by summing the counts, per unique Outcome value, at each base node.

(c) The Outcome value(s) for each ship-to address may be derived from the base node Outcome value(s).

(d) The Median Date for each ship-to address (the actual delivery date, typically) may be derived from the base-node Median Date.

(e) The relative Confidence of each Super Group and Group may be defined as equal to the reciprocal of the node distance of the respective tip from the stop-joined dendrogram. The relative Confidence values may be used, as disclosed below, for ordering or prioritizing the candidate addresses when presented to the ADA for selection. The Confidence value may be set to zero for Groups or Super Groups comprised of orphan (non-joined) ship-to addresses which, by definition, have a zero node distance.

(f) The Join Reason, referred to in FIG. 20, for each Super Group (or Group) may be expressed as "Co-Delivered and Common Delivery Address" if the set of ship-to addresses are identical for a pattern-joined Super Group or a pattern-joined Group.

(g) The Join Reason for each Super Group (or Group) may be expressed as "Co-Delivered" if the set of ship-to addresses are not identical for a pattern-joined Super Group or a pattern-joined Group.

(h) The Join Blob, referred to in FIG. 20, for each Super Group or Group may be determined from the information found at the relevant tip node, as expressed in one or more of the following programming calculations: (1) "Most common combination (xxx %): <deliv patt>, <servc provdr>, <signat>" or (2) "Most common recorded Delivery Address (xxx %): <deliv patt>" or (3) "Most common Service Provider (xxx %): <servc provdr>" or (4) "Most common Signature (xxx %): <signat>."

(i) The service provider-based tabulations for the Join Blob routine, in FIG. 20, are run per identifier; however, the Join Blob format contains the service provider name, not the identifier.

(j) The denominator used to calculate the Join Blob percentages, in one embodiment, may be the total of the counts for the Super Group or Group.

(k) All counts for the Cluster Cruncher output should equal the total count of gathered data.

Operation of the Cluster Cruncher, in one embodiment, may be governed by a resource limit, such as a maximum number of ship-to addresses. The resource limit may be determined by the capacity of the ADA who must process the incoming stream of mined data. The resource limit may be a simple quantity, such as one thousand ship-to addresses. The resource limit, in one embodiment, may include a number of rules to be applied to Groups and Super Groups. For example, a resource limit may require: (1) if a Super Group has more than one thousand ship-to addresses, then make each intermediate sub-group into its own Super Group; and, then (2) if any remaining Super Group has more than one thousand ship-to addresses, then randomly delete ninety-five percent of the singlets, doublets, triplets, and so forth, respectively, until the quantity is less than one thousand.

The output of the Cluster Cruncher process may be used for ordering or prioritizing the candidate addresses in the mined data set, in order to present a hierarchical list to the Address Database Administrator (ADA) in step 330, shown in FIG. 33.

Review of the Registration Process 300: Referring again to FIG. 33, the initial presentation step 330 follows the association processing 310 described above. In general, a candidate address is compared to address data stored in the package-level detail database 20 and the archive of actual past delivery records 30 to determine whether an address that matches or nearly matches the candidate address is already in the address management system. As shown in FIG. 33, after the initial data gathering step 305, the association processing step 310 includes a variety of data manipulations and comparisons in order to find those addresses most closely related to the candidate address, and to place them in order of priority, with the best matches first. After the application of any of a variety of initial address rule filters in step 320, the prioritized list of addresses may be presented in step 330 to a person or system known as the Address Database Administrator (ADA) (shown in FIG. 1).

Determining Overlapping or Duplicate Initializations: In one embodiment, the initial presentation step 330 may include a process to determine whether the candidate address already exists in the address database 100, shown in FIG. 1. Every preferred address representation stored in the main address database 100 has a unique consignee token associated with it, indicating the consignee location related to the address. In this aspect, the preferred address may be retrieved and used any time a parcel is marked with address indicia related to a particular consignee location that has been initialized or otherwise stored in the address database 100.

As part of the initial presentation step 300, each candidate address may be processed through the following steps:

(1) For every candidate address, a token lookup is performed. If a consignee token is found, it is attached to the ship-to address.

(2) The list of addresses presented to the ADA 200 may be referred to as a unit of work (UOW). For every unique token value detected within a UOW, attach the "prior_match_rate" as the most recent of the "match_rate" value or the previous "projected_match_rate" value.

(3) If multiple unique token values are found, then reject the UOW and assign its status as "Reject_Overlapping_Init." indicating the initialization could not be completed automatically. In other words, the registration of an address that appears to be related to multiple token values will require input from the ADA 200.

(4) If a single unique token value is found (not counting the value "zero"), then calculate the "tokenized_projected_match_rate" as equal to the "volume_of_tokenized" data divided by the "delivered_volume" total.

(4) If the "tokenized_projected_match_rate" is greater than the "prior_match_rate-duplicate_detected_match_slop," then accept the UOW and assign its status as "Accept_Dup_Init." The "duplicate_detected_match_slop" constant may be configurable.

(5) If the duplicate detection match threshold fails, then reject the UOW and assign its status as "Reject_Questionable_Dup_Init."

The steps above may be executed in order to better condition and prepare the data for review by the ADA 200.

Initial Rules for the Address Database Administrator (ADA) 200: The initial presentation step 330 may include a graphical user interface (GUI) in order to present the mined data to the ADA 200 in a prioritized list. A sample screen shot of the GUI is shown in FIG. 2. The ADA 200 may accept or reject from among the options presented in the list. In one embodiment, person or system known as the ADA 200 may be trained or otherwise configured to follow one or more of the following guidelines.

(1) The list of mined data may contain ship-to addresses for multiple consignee locations. Select the ship-to addresses that clearly do not belong to the consignee of interest and remove them from consideration.

(2) Every usable ship-to address must include a relevant business party name. Examine the business party name that appears in the address database 100 and compare that to the dominant similar business party names appearing in the mined data. The business party names may include a variety of different representations or aliases. Compare the various aliases and establish a reasonable range of relevant business party names. Select only those ship-to addresses having a party name within the range and add those to the address database 100. When the party names alone are not sufficient to determine the relevance of the addresses in the mined data, apply the following methods:

(a) Use the relative Confidence values assigned to the various ship-to address groupings during the dendrogram processing, described above. A higher Confidence value indicates a great likelihood that the ship-to addresses belong together (independent of whether the business party names match). Also refer to the frequency values. A high frequency value indicates an increased likelihood that the ship-to address is relevant.

(b) If the Confidence values are low, then examine the names of the service providers (driver name, driver identifier, and the like) and examine the signature captures and clarifications for the various ship-to groups. A high degree of consistency in service provider or signature indicates an increased likelihood the ship-to address is relevant.

(3) There may be business party names that appear in the list of mined ship-to address data that are not obviously related to the consignee of interest. Do not select these ship-to addresses for addition to the address database 100.

(4) Ship-to addresses that contain non-business names (person names, for example) or have no business party name are not to be selected for the address database 100. Non-business party names are not added to the address database 100 in order to avoid adding a high number of private individuals into the database 100 and to prevent personal parcels from appearing on a business consignee's manifest of incoming deliveries. If a person's name has a high frequency and/or the person appears to be a principle in the business at a particular consignee location, the address bearing that name may be selected and added to the address database 100.

(5) A single consignee may have multiple address representations or aliases that may or may not represent the same physical location. The aliases may be considered to be equivalent if the service provider or driver normally treats these aliases as indicating a single physical delivery location.

(6) The business party name of a consignee may have multiple address representations that are not the same location. Each location may be serviced separately, by a different driver or service provider. Only the ship-to addresses belonging to the single location matching the candidate address should be selected and added to the database 100.

(7) The data gathering process ends normally when there is diminishing value in continuing, as set by the limits described in the initial data gathering step 305 and illustrated in FIG. 3. For example, a pass limit may act as an upper limit on the number of iterations or passes to be executed. An exit limit may act as an upper limit on the quantity of matches, or percentage change in the recovery of potential matches, to be processed before the data gathering step 305 is exited. If the data gathering process 305 ends abnormally, the ADA 200 may execute one or more of the following additional steps:

(a) If data gathering ends because a quantity-based limit is reached, the mined data includes the maximum allowable quantity capable of being handled by the maintenance system 10. In this case, the mined data may not fully represent the consignee location. Extra care is needed when selecting the ship-to addresses to be added to the database 100.

(b) The data gathering process 305 may terminate because the number of gathered delivery patterns began an unexpected and/or steep acceleration during the iterative data-gathering process. This may indicate a large number of corrupted addresses, partial addresses, mis-deliveries, or other generally unreliable address data. ZIP-shipped parcels are one cause of large-scale partial address data. Another cause of apparent mis-deliveries are actually returns that look like mis-deliveries because the ship-to address was not updated. In either case, the mined data may contain information for a wide variety of consignees. Extreme effort may be required to identify the correct consignee, and extreme care is needed when selecting the ship-to addresses to be added to the database 100.

(8) In general, the target match rate values (for example, the "prior_match_rate" or "match_rate" or "projected_match_rate" values) are not used as the basis to accept or reject an address.

ZIP-Shipped Parcels generally include only minimal information, such as the destination postal ZIP code only—the minimum data required to obtain a shipping rate or cost and acquire a tracking number. A collection of ZIP-shipped parcels can be uploaded to a parcel delivery service using off-the-shelf shipping software. In most cases, the sender will provide the actual whole ship-to address in an order fulfillment process that may generate a separate shipping label but may not necessarily upload to the parcel delivery service. A ZIP-shipped ship-to address may contain the postal code, city, and state. Accordingly, the address data for every consignee within the same postal code that receives shipments from a ZIP-shipper may be collected during the data gathering process 305 for a single candidate address.

In one embodiment, the present invention may include pattern detection rules for identifying ZIP-shipped parcels. The following nine rules may provide a high rate of detection capability for identifying ship-to address patterns that have been ZIP-shipped.

1. Look for the following pattern anywhere within the concatenation of Addr1,2,3: "ATTACHED LABEL"
2. Look for the following pattern anywhere within the concatenation of Addr1,2,3: "OTHER LABEL"
3. Look for the following pattern anywhere within the concatenation of Addr1,2,3: "SEE LABEL"
4. Look for the following pattern anywhere within the concatenation of Addr1,2,3: "ADDRESS LABEL"
5. Look for the following pattern anywhere within the concatenation of Addr1,2,3: "SEE ADDRESS"
6. Look for the following pattern anywhere within the concatenation of Addr1,2,3: "SEE ATTACHED"
7. Look for the following patterns anywhere within the concatenation of Addr1,2,3: "SEE"-&-"FOR ADDRESS"
8. Look for a literal match of the postal code to the concatenated Addr1,2,3 (ignoring white space).
9. Look for a literal match of Addr1,2,3 to any of the list of 197 patterns tabulated in FIG. 21.

MAINTENANCE PROCESS: Referring again to FIG. 1, in the exemplary context of address management systems, the address database 100 may receive input from a variety of sources, including but not limited to trusted sources 110 of address data, data from applications 16, data obtained from a registration process 300, and data obtained from a maintenance process 400. By gathering data from a variety of sources, the maintenance system 10 of the present invention builds and maintains an address database 100 that is accurate and current.

The maintenance process 400, in one embodiment, as shown in FIG. 1, may be in communication with a package-level detail database 20 that includes, for example, a list of destination addresses and other data related to the current, active shipment of a plurality of parcels. A destination address may be referred to as a ship-to address. The package-level detail database 20 may include an active tracking number, an active ship-to address, and an active delivery pattern code, associated with one or more parcels to be delivered. The maintenance process 400 may also be in communication with an archive of actual delivery records 30. The archived records 30 may include the locations or delivery patterns describing where an actual past delivery took place. The delivery records 30 may include a past tracking number, a past ship-to address, a past active delivery pattern code, and a stop identifier, associated with a completed delivery of one or more parcels. Both the package-level detail database 20 and the archive of actual delivery records 30 may include records gathered and stored over a number of days.

DATA GATHERING FOR SCORING AND MAINTENANCE: In general, the maintenance process 400 may begin with a data gathering step 405 referred to generally as the data gathering for scoring and maintenance step 405. This data gathering step 405 collects and compares delivery information for the matched ship-to addresses. One purpose of step 405 is to determine if the matching activity from the registration process 300, described above, is producing the correct answers, and to generate the information needed to update the address database 100 to the extent the matching answers are not correct.

In one aspect of the data gathering for scoring and maintenance step 405, historical relationships between delivery data, ship-to addresses, and consignee token matches may be used to determine whether recently delivered ship-to addresses were matched correctly. Each determination results in an Outcome, such as "OK", "Missed", and the like, which can be tabulated. The most probable Outcome may be selected by choosing the best-fitting behavior pattern.

The behavior patterns may be pre-determined and listed, based upon analytical experience. The patterns may be described using tables that may be periodically updated to make improvements in outcome determination accuracy.

To prevent the outcome determination process from becoming an excessive computational burden, the process may be configured with an option to bypass a selectable percentage of delivery events. In so doing, the activities of the data gathering for scoring and maintenance step 405 may be, in effect, based upon a sampling of the actual data.

The result of this data gathering for scoring and maintenance step 405 may be used to drive a Score Keeper system 500 and a Maintenance Staging step 408. The maintenance processing steps are illustrated in more detail in FIG. 34.

Delivery Data Selection: As a starting point for the data gathering for scoring and maintenance step 405, the delivery data for every matched ship-to tracking number may be requested or otherwise retrieved. During the selection process, in one embodiment, a request may be executed for every new delivery record having the same delivery pattern code as the matched ship-to tracking number. All delivery data may be archived after arrival.

Upon arrival, the requested delivery data may be forwarded to a delivery and ship-to data counting process through a holding area that forces a delay in the scoring of all the matching. The holding area may include a queue of data accumulated over a number of days. One purpose of the delay is to wait until "late-OPLD" data can be received and matched. Late data may include active shipments not yet appearing in the package-level detail (PLD) database 20. The duration and other limits on the delay may be configurable and adjustable; for example, the default duration may be set for two days.

The delivery data selection may be used to process and track the requests, arrivals, and countings using one or more of the following structures:

(a) A Waiting-for-Delivery-Data List may include a list of the tracking numbers that are waiting for delivery data. The list may be referenced according to delivery date.

(b) A Tabulated List may include a list of the tracking numbers that have been forwarded to the delivery and ship-to data counting process. A newly delivered tracking number may not be forwarded if it already exists on the Tabulated List. The list may be referenced according to delivery date. Old entries, such as those older than forty-five days, may be removed from the Tabulated List.

Delivery and Ship-To Data Counting: In one embodiment, the data gathering for scoring and maintenance step 405 may include a process known as delivery and ship-to data counting. One purpose of this process is to build and maintain the stateful "Counts" that are used to provide the Cumulative Counts to an Outcome Determination process. As mentioned above, one purpose of the data gathering for scoring and maintenance step 405 is to determine whether recently delivered ship-to addresses were matched correctly. Each analysis or determination results in an Outcome. The Outcome Determination process, as discussed in more detail below, uses the Counts and Cumulative Counts generated by the delivery and ship-to data counting process.

Figure 22:
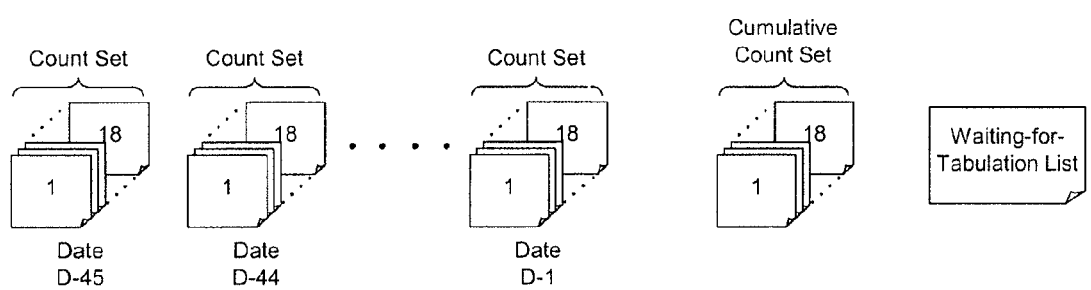
FIG. 22 is a graphical illustration of a plurality of count sets, generated through successive iterations, and a cumulative count set, according to one embodiment of the present invention.

The delivery and ship-to data counting process may use the input delivery data and the archived ship-to addresses. The "counts" may be stored in groups or sets accumulated over a number of days, For example, the counts may be stored as forty-five days' of count sets, plus a cumulative count set, plus a Waiting-for-Tabulation List, as illustrated in FIG. 22. The Cumulative Count Set may be the only information that is generated by this process and read or otherwise accessed by the Outcome Determination process. The input delivery data may be also passed to the Outcome Determination process.

In one embodiment, each count set may include eighteen or more tables (referred to as TabCounts) wherein each record contains an index text, such as a driver identifier (Driver ID) or a delivery pattern code, along with an associated count integer. FIG. 23 shows a list of eighteen example TabCounts tables, including a table name and a description of each index text and how to determine the count for each index.

In one embodiment, the delivery and ship-to data counting process may be performed in two phases:

(a) Generation of the Waiting-for-Tabulation List. The Waiting-for-Tabulation List, shown in FIG. 22, may be compiled using the input delivery data and the package-level detail ship-to addresses. Each entry may contain the indexes and respective counts determined from within the input data.

(b) Generation of the Cumulative Count Set. The Cumulative Count Set, shown in FIG. 22, may be compiled using the entries on the Waiting-for-Tabulation List to ADD to all count sets. Adding those entries, in effect, empties the Waiting-for-Tabulation List. The generation of the Cumulative Count Set may be run once a day, subtracting the counts in the oldest Count Set from the Cumulative Count Set, and then deleting the oldest Count Set.

In one embodiment, the phase of generating the Waiting-for-Tabulation List may use a configurable setting known as the Maintenance and Scoring Sampling Rate. This Sampling Rate may be set at 100% unless and until the processing needs become too cumbersome. The Sampling Rate may also be used determine how many delivery stops may be skipped when reading the input delivery data prior to generating entries for the Waiting-for-Tabulation List.

Outcome Determination: The data gathering for scoring and maintenance step 405 may include a process known as Outcome Determination. The Outcome Determination process, in one embodiment, may be the final stage of the data gathering for scoring and maintenance step 405. The Outcome Determination process, in general, may include the following sequence:

(a) Compute one or more Measures for each tracking number using the Cumulative Counts. The Measures (M) are explained and illustrated in FIG. 24.

(b) Use the Measures to calculate the Outcome Fits (F) for each possible Outcome of each tracking number. The calculation of Outcome Fits is explained in detail below.

(c) Select the best-fit Outcomes.

(d) Generate the Maintenance Staging Input Message and generate the input Score Keeper Message.

The Outcome Determination process, in one embodiment, may also generate the Scored List of the tracking numbers, including the various scores and calculations assigned to each one.

The table in FIG. 24 shows the Measures (M) that may be used in the Outcome Determination process to evaluate all the possible outcomes. The table includes a description of twenty-three Measures (M). The column labeled "TabCounts Table Numbers" refers to the types of Counts (see FIG. 23) to be used in the Measure Equations, which are explained mathematically using the TabCounts table names. The possible indications of a high, mid-range, average, or low Measure are listed in the column labeled "Possible Indications." The table in FIG. 24 also shows the configurable values for the Outcome Determination Coefficients (C) and the corresponding Weight Factors (W), which may be included in one embodiment of the present invention. There are ten sample Coefficients (C) appearing in the table, with sample values in each row including high (H), Low (L), zero, and other possibilities. Similarly, there are seven sample Weight Factors (W) appearing in the table, with sample values of one or zero, for example, indicating whether the Weight Factor may or may not be applied to a particular Measure.

In one embodiment, the Outcome Determination process may include one or more of the following steps:

Step 1. For each delivery stop:

Step 1.1 Determine the consignee token having the highest incidence. All outcomes determined at this delivery stop are relative to this token.

Step 1.2 Generate the token-indexed counts (see FIG. 23) that are transient for this stop.

Step 1.3 For each parcel tracking number:

Step 1.3.1 Using the Cumulative TabCnts (see FIG. 23), compute the Measures 1 through 22.

Step 1.4 Using the results of Measure 9, compute Measure 23.

Step 1.5 For each parcel tracking number:

Step 1.5.1 Apply the logical indicators, shown in the last four rows of FIG. 24, to reach early outcomes for the parcels with no package-level detail data ("No-OPLD Detected") or late data ("Late OPLD detected), ZIP-shipped parcels ("ZIP-Shipped Detected"), or parcels not associated with a consignee token ("Not Tokened").

Step 1.5.2 Calculate the multiple Outcome fits (F): The Coefficients (C), Measures (M), and Weight Factors (W) described in the table in FIG. 24 may be used to calculate each potential Outcome Fit (F) as explained below. Each potential Outcome Fit (F) may be determined by a method known as the weighted average of squares. The lowest Outcome Fit (F) is generally the best fit. In this step, calculate each Outcome Fit (F) using Coefficients (C), Measures (M), and Weights (W), where x represents outcomes 1 through 7 and n represents Measures 1 through 23.

$$F_x = \frac{\sum_{n=1}^{23} W_{n,x}(M_n - C_{n,x})^2}{\sum_{n=1}^{23} W_{n,x}}$$

Step 1.5.3 Apply the logical indicators to further reduce the remaining possible outcomes.

Step 1.5.4 Choose the remaining outcome with the lowest fit value.

Step 1.6 Use the input data (in the package-level detail database 20 and the archive of actual delivery records 30), together with the Outcome results, to build the output messages.

In one aspect, the present invention produces opportunities for efficiency at various levels. For example, newly arriving delivery data may be bundled into multi-consecutive-day groups. This technique provides larger sets of data to process, which inherently results in a reduction in overhead and processing expense.

Score Keeper: In one embodiment, the maintenance process 400 may include a Score Keeper system 500, as illustrated in FIG. 34. The Score Keeper 500 may be used to store scores for the purpose of external reporting and tracking the status of each discrete consignee location. In one embodiment, the scores may be kept for the most-recent forty-five delivery days, per consignee. The oldest scores may be deleted as new scores arrive. Alternatively, the oldest scores may be deleted according to age. FIG. 25 shows the list of programming steps in the Score Keeper process, according to one embodiment of the present invention.

Status Reporting: In one embodiment, the maintenance process 400 may include a status reporting system. In one embodiment, the scores or counts that are collected, per consignee, may be used to determine key indicators that are used to outwardly measure the past and future quality of the address database. The table in FIG. 26 shows the system-wide categories for the volume counts. These values may be calculated using the equations below.

In one embodiment, the initiation or maintenance projection rates, per consignee, may be computed and presented during the initiation or maintenance processes. The Projected Match Rate may be expressed as the delivered volume projected to match divided by the delivered volume for a particular consignee.

Delivered volume projected to match=$x_p$=$M+M_L+S_A$

Delivered volume for this consignee=$x_p+N_M+N_C+N_D+N_P+N_L+N'$

The non-matching ("no data") volume (N') for this consignee may be determined by applying a ratio (this consignee volume, compared to the total volume) after accounting for the volume that is identified as being associated with the wrong consignee. The ratio may be applied on a per-group basis, because the non-matching data rates may vary significantly by consignee.

$$N' = \sum_{group} \left\{ \left( \frac{(S_A + N_M + N_C + N_D + N_P + N_L + M + M_L)}{(S_A + N_M + N_C + N_D + N_P + N_L + M + M_L) + S_W + M_F} \right) \times (N_O + N_Z + S_Z) \right\}$$

The Projected False Positive Rate may be expressed as the volume projected false positive divided by the delivered volume projected to match.

$$\frac{M_F}{M + M_L + S_A}$$

In one embodiment, the actual status rates, per consignee, may be computed and presented on-demand in response to a status request. Each on-demand request may specify a particular date range used to collect the counts.

The Match Rate of Delivered items may be expressed as the delivered volume matched divided by the delivered volume.

Delivered volume matched=$x_m$=$M+M_L$

Delivered volume=$x_m+N_M+N_C+N_D+N_P+N_L+N_O+N_Z$

The False Positive Rate of Manifested Volume may be expressed as the volume false positive divided by delivered volume matched.

$$\frac{M_F}{M + M_L}$$

The Match Rate of Uploaded Delivered Volume may be expressed as the delivered volume matched divided by the uploaded delivered volume. An item or parcel has been uploaded if the associated data has been saved to the package-level detail (PLD) database 20 within a set number of days of the delivery date. Parcels with data uploaded later than that may be labeled as late-OPLD or no-OPLD.

Delivered volume matched=$x_m$=$M+M_L$

Uploaded delivered volume=$x_m+N_M+N_C+N_D+N_P+N_L+N_Z$

The Match Rate of Delivered Volume Uploaded Late may be expressed as the delivered volume matched that was uploaded late divided by the delivered volume. The term "uploaded late" refers to an item or parcel having an upload date later than or equal to its delivery date.

Delivered volume matched that was uploaded late=$M_L$

Delivered volume=$x_m+N_M+N_C+N_D+N_P+N_L+N_O+N_Z$

Figure 27:
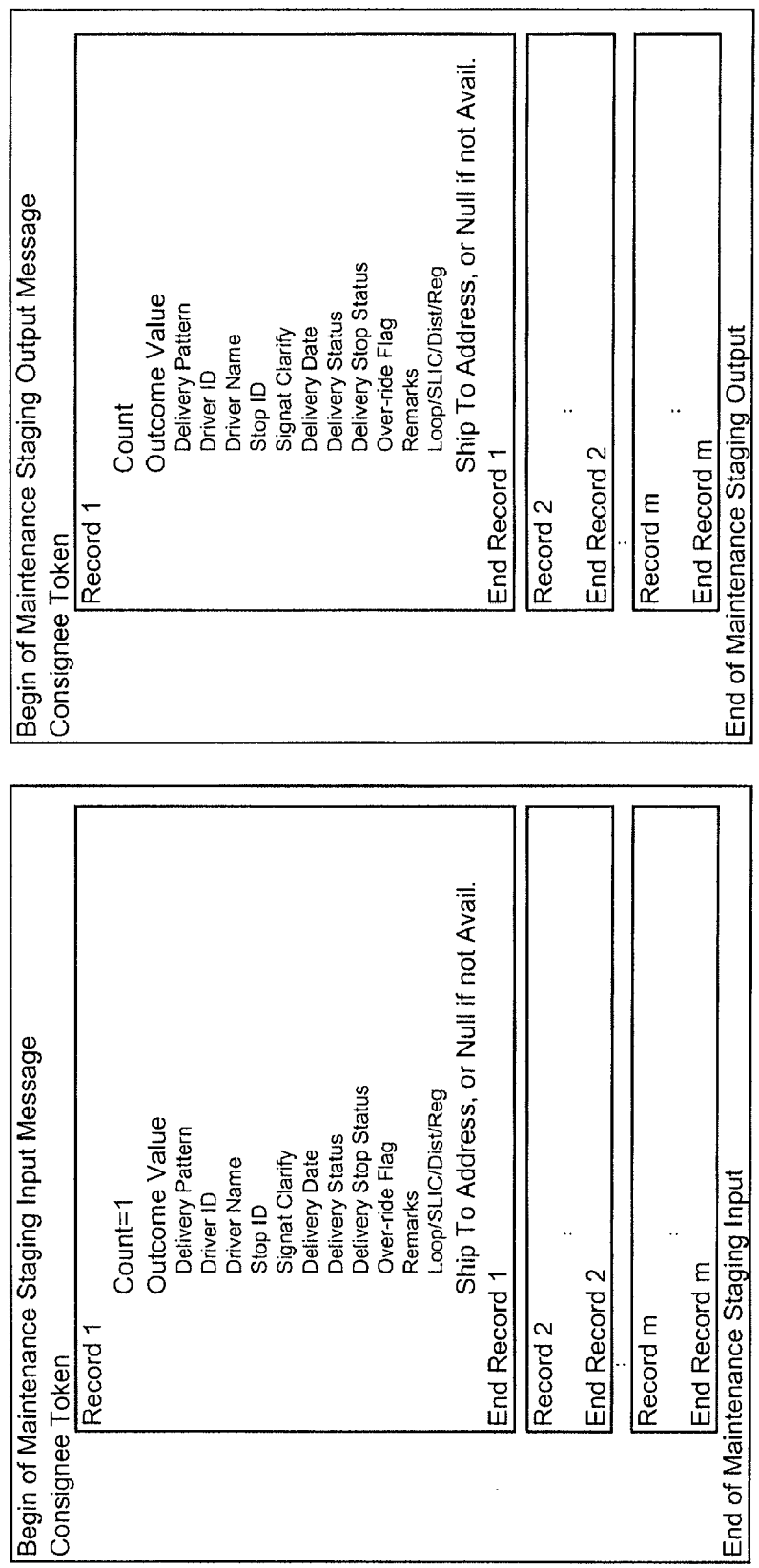
FIG. 27 is a representation of the steps involved in maintenance staging, according to one embodiment of the present invention.

Maintenance Staging: In one embodiment, the maintenance process 400 may include a maintenance staging step 408, as shown in FIG. 34. One purpose of the maintenance staging step 408 is to provide current information about the performance of the address database 100, to detect trends in performance, and to trigger maintenance activity for the purpose of improving database performance. FIG. 27 shows the list of programming steps in the maintenance staging processes, both input and output, according to one embodiment of the present invention. FIG. 27 shows information entering the staging process 408 and information that may be passed on, in the form of a request for maintenance, following the staging process, in one embodiment of the present invention.

Figure 28:
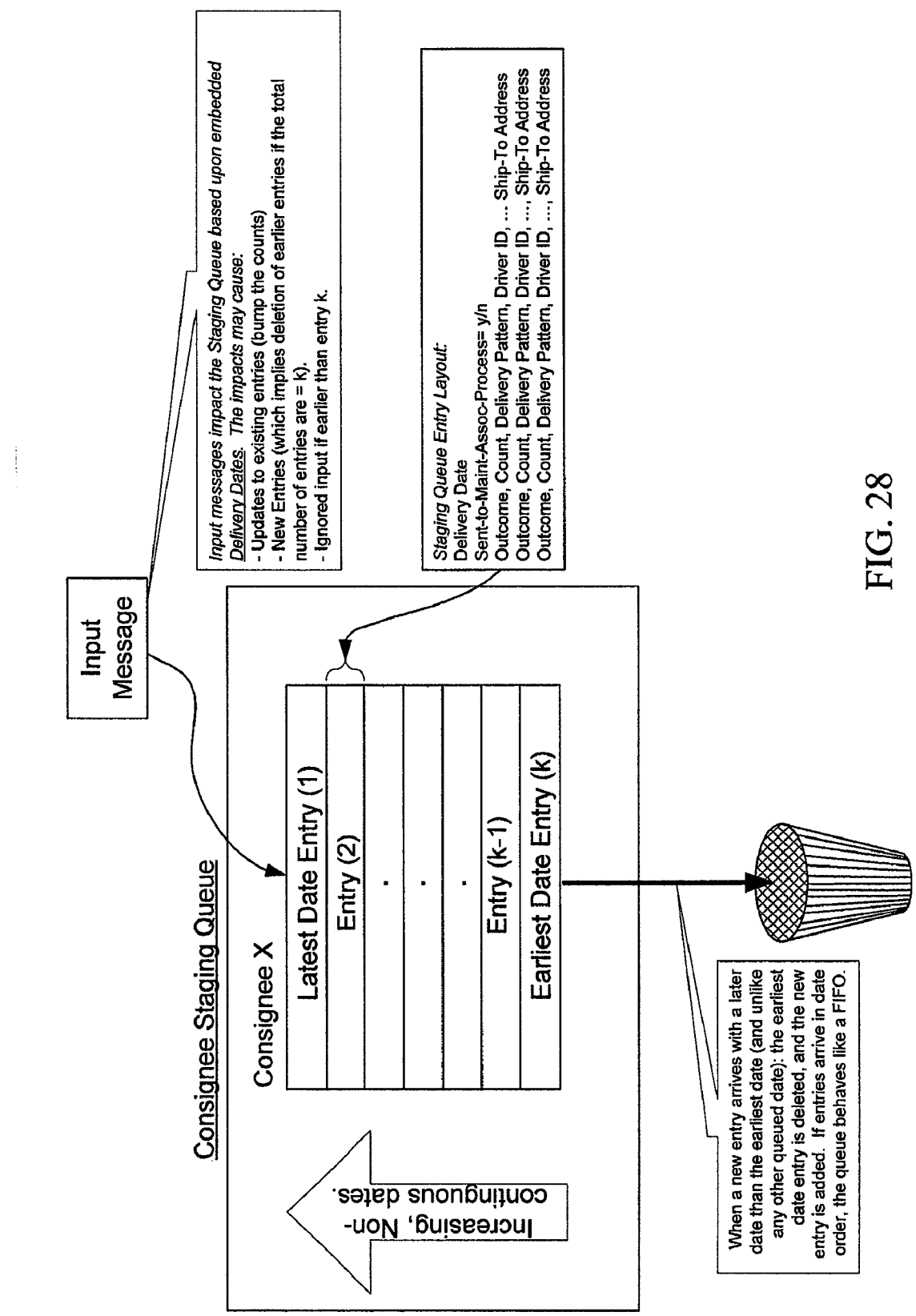
FIG. 28 is a graphical representation of a consignee staging queue, according to one embodiment of the present invention.

A consignee staging queue may be part of the maintenance staging step 408. FIG. 28 illustrates the use, in one embodiment, of a consignee staging queue to store a collection of recent data that provides current information about the performance of the address database 100. The performance data may be maintained over a number of days, per consignee location. In one embodiment, each and every match or non-match event may be accessed and used to form input messages to this process. The staging queue may include recent data collected over a number of days and it may be limited in size to a set number of entries (k).

Figure 29:
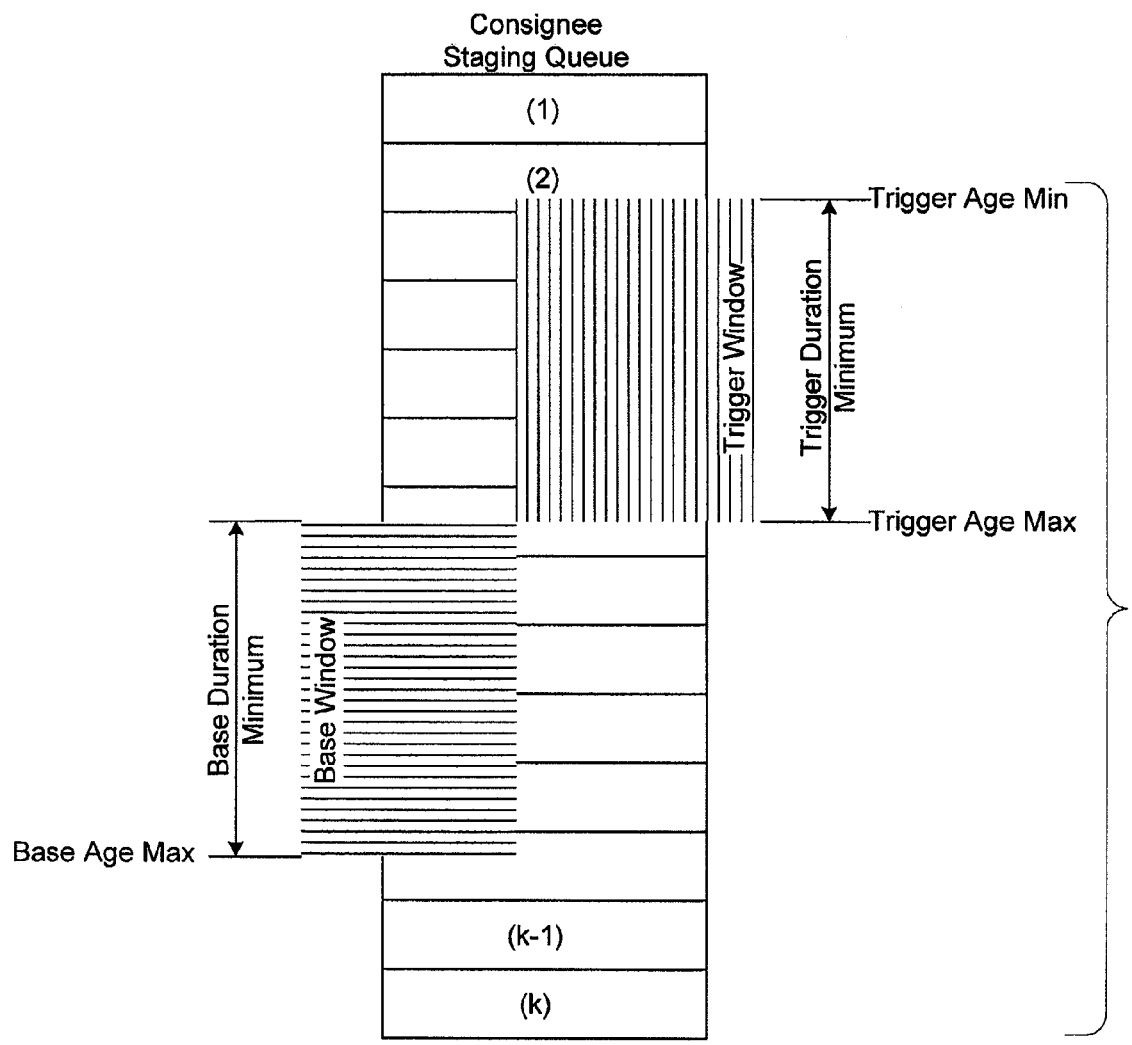
FIG. 29 is a graphical representation of a trigger window and a base window, in relation to a consignee staging queue, according to one embodiment of the present invention.

The data stored in the consignee staging queue may be divided into groups for the purpose of evaluating trends in the data. In one embodiment, the data may be divided into a base window group and a trigger window group, as shown in FIG. 29. The base window may include relatively older data, having a maximum age referred to in FIG. 29 as Base Age Max. The base window may span a group of data over a number of days or records, shown graphically and labeled as the Base Duration Minimum. Similarly, the trigger window may span a group of relatively recent data over a number of days or records, shown graphically and labeled as the Trigger Duration Minimum. The trigger window may have a minimum and maximum age, as shown. The base and trigger windows of the consignee staging queue may be used, as part of the maintenance staging process 408, to evaluate or trigger whether a request for database maintenance is needed. In one embodiment, each and every update to the consignee staging queue may force an evaluation of the trigger decision tree.

The trigger process, as illustrated in FIG. 29, may include one or more of the following steps:

1. Select a Trigger Window (TW) of the greatest duration within the set limits of Trigger Duration Minimum, Trigger Age Max, and Trigger Age Min.

2. Select a Base Window (BW) of the greatest duration within the set limits of Base Duration Minimum and Base Age Max.

3. If a Trigger Window exists, calculate the following factors:
   NegTWCnts=sum of all TW negative counts.
   AllTWCnts=sum of all TW counts.
   NegRate=NegTWCnts divided by AllTWCnts.

4. If a Trigger Window and a Base Window exist, calculate the following factors:
   NegBWCnts=sum of all BW negative counts.
   AllBWCnts=sum of all BW counts.
   NegBWRate=NegBWCnts divided by AllBWCnts.
   Time=latest TW date minus earliest BW date.
   NegAccel=(NegRate minus NegBWRate) divided by Time.

5. Generate or trigger an Output, based on the following relationships, if (d) is true and (a or b or c) is true:
   NegTWCnts is greater than a Negative Count Threshold.
   NegRate is greater than a Negative Rate Threshold.
   NegAccel is greater than a Negative Acceleration Threshold.
   NegTWCnts is greater than a Min Negative Count Threshold.

6. The message associated with an Output may include all the entries, in both Windows, that have not been sent previously to the maintenance association process step 410. The entries sent with the Output may include a marker.

The trigger process, in one embodiment, may be controlled using a variety of limits or thresholds, as described above. The table in FIG. 30 shows the available limits, in one embodiment, that may be used to balance the costs and capacity limits of the system and the quality of the address database 100.

Review of the Maintenance Process 400: Referring again to FIG. 34, the data gathering step 405 uses data stored in the package-level detail database 20 and the archive of actual past delivery records 30. The maintenance staging step 408, described above, includes a review of a queue of data to determine whether maintenance processing is desired or needed. If the staging step 408 results in an Output, described above, the entries may be passed to the maintenance association processing step 410. In one embodiment, the maintenance association processing step 410 is similar to the initial association processing step 310 of the registration process 300. Accordingly, the entries passed to the maintenance association processing step 410 may undergo the same or similar data manipulations, dendrogram constructions, prioritizing, and hierarchical preparation as the candidate addresses underwent during the registration process 300. After the application of any of a variety of maintenance address rule filters in step 420, a prioritized list may be presented in step 430 to a person or system known as the Address Database Administrator (ADA) (shown in FIG. 1).

Maintenance Activity by the Address Database Administrator (ADA) 200: The maintenance presentation step 330 may use the graphical user interface (GUI) to present the data entries to the ADA 200 in a prioritized list. A sample screen shot of the GUI is shown in FIG. 2. The ADA 200 may accept or reject from among the options presented in the list. The list of entries may include a message associated with each entry or Output, indicating the reason or rationale that triggered the need for a maintenance activity.

The maintenance operation for the address database 100 may be an active and ongoing and activity. The ADA 200 may include a supervisor and one or more data entry personnel to review and execute the selections according to the rules outlined in this description. The supervisory function may include one or more of the following management tools.

Observing the Work-in-Progress: In one embodiment, there may be one or more work queues that are dispatched in a first-in, first-out order. The work queue may receive units of work from the registration process 300 and the maintenance process 400. The task of monitoring the work queue, in one embodiment, may include observation of the current queue statistics, such as the number and age of the units of work in the queue. The statistics may be segregated into work groups, such as initiations from the initial registration process 300, maintenance orders from the maintenance process 400, deferred initiations, and deferred maintenance orders. A work summary log may be maintained including time-stamped units of work, start and stop times, data staging and termination codes, and summaries of the action taken.

Corrective Action for the Work Queues: The maintenance operation for the address database 100 by the ADA 200 may include the adjustment of one or more limits or thresholds established to optimize the operation of the system. The invention, in one embodiment, may include one or more of the following actions to correct problems observed in the work queues.

If the age of the initiations from the initial registration process 300 is too old, then the ADA 200 may request a reduction in the rate of new registrations, increase ADA staff productivity or work force, of request a reduction in the amount of maintenance orders coming from the maintenance process 400.

Similarly, if the age of the maintenance orders coming from the maintenance process 400 is too old, then the ADA 200 may request a reduction in the rate of maintenance orders or increase ADA staff productivity or work force.

If the amount of maintenance orders coming from the maintenance process 400 needs to be reduced, the efficiency of the ADA activity may be improved by increasing the duration of the time spans of the Base Window and the Trigger Window (see FIG. 29). Longer time windows may have the general side effect of increasing the time between incoming maintenance orders and/or delaying maintenance orders for a particular consignee or group of consignees. For example, increasing the Trigger Duration Minimum and the Base Duration Minimum will force a greater time distance between incoming maintenance orders. The number of days of staging queue entries (k) should always be kept greater than the sum of the duration minimums. Also, increasing the Trigger Age Minimum will delay the arrival of incoming maintenance orders. A greater delay, however, may increase the number and complexity of the problems to be solved in each maintenance order.

Another approach to reduce the rate of incoming maintenance orders is to lower the quality threshold, incrementally, by adjusting the limits and thresholds in the maintenance process 400. The results may be a reduction in the address match rate.

Increasing the Negative Count (upper limit) may reduce the incoming maintenance orders caused by high-volume consignee locations that typically experience a high number of mis-deliveries.

Increasing the Negative Rate (upper limit) may the average match quality to drop for one or more consignees locations. As the match quality for the lowest-performing consignee locations hits bottom, those locations will become the best-performing because of the new upper limit. Increasing the limit has the side effect of increasing the amplitude and period of the up-and-down quality cycle for the average consignee.

Raising the Negative Acceleration (upper limit) may cause the system to ignore gradual drops in match rates for consignees that have higher levels of performance.

Raising the Min Negative Count (lower limit) may cause the system to ignore match quality problems for the smallest consignees.

Lowering the Trigger Age Maximum values may cause the system to prevent smaller consignees with seasonal address matching problems from producing maintenance orders after the season has passed. Accordingly, a portion of the mostly-seasonal matching problems may not be corrected.

Figure 31:
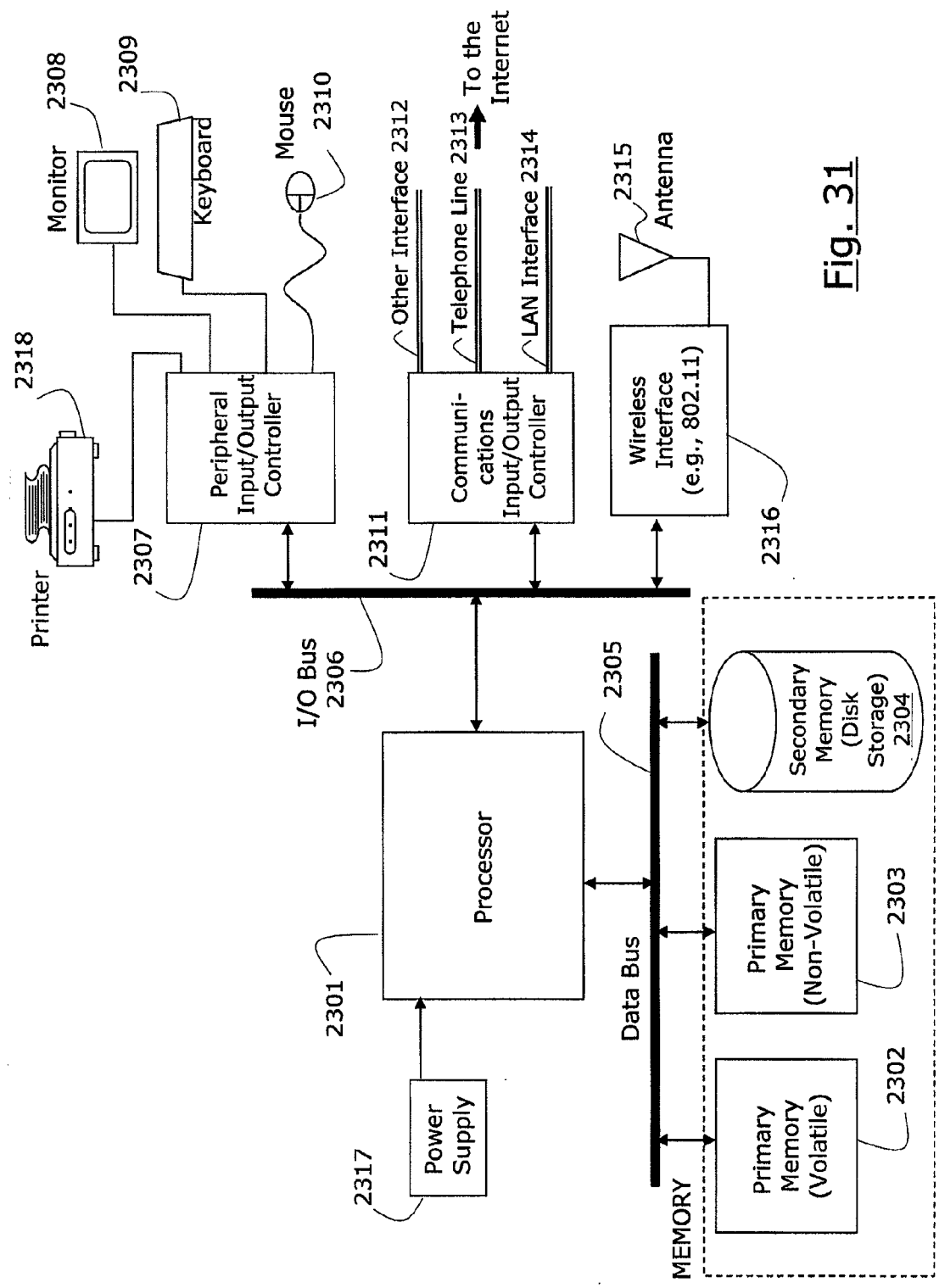
FIG. 31 is an illustration of a computer, according to one embodiment of the present invention.

System Architecture. In several of the embodiments of the invention referenced herein, a computer is referenced. The computer, for example, may be a mainframe, desktop, notebook or laptop, hand-held, or a handheld device such as a data acquisition and storage device. Turning to FIG. 31, one embodiment of a computer is illustrated that can be used to practice aspects of the present invention. In FIG. 31, a processor 2301, such as a microprocessor, is used to execute software instructions for carrying out the defined steps. The processor 2301 receives power from a power supply 2317 that may also provide power to the other components as necessary. The processor 2301 communicates using a data bus 2305 that is typically sixteen or thirty-two bits wide (e.g., in parallel). The data bus 2305 is used to convey data and program instructions, typically, between the processor 2301 and the memory. In the present embodiment, the memory may be considered to include a volatile primary memory 2302 such as RAM or another form of memory which retains the contents only during operation, or it may be non-volatile 2303, such as ROM, EPROM, EEPROM, FLASH, or other types of memory that retain the memory contents at all times. The memory could also be secondary memory 2304, such as disk storage, that stores large amount of data. In some embodiments, the disk storage may communicate with the processor using an I/O bus 2306 instead or a dedicated bus (not shown). The secondary memory may be a floppy disk, hard disk, compact disk, DVD, or any other type of mass storage type known to those skilled in the computer arts.

The processor 2301 also communicates with various peripherals or external devices using an I/O bus 2306. In the present embodiment, a peripheral I/O controller 2307 is used to provide standard interfaces, such as RS-232, RS-422, DIN, USB, IDE, SCSI, SATA, FireWire, Bluetooth, or other interfaces as appropriate to interface various input/output devices. Typical input/output devices include local printers 2318, a monitor 2308, a keyboard 2309, and a mouse 2310 or other pointing devices (e.g., rollerball, trackpad, joystick, and the like).

The processor 2301 typically also communicates using a communications I/O controller 2311 with external communication networks, and may use a variety of interfaces 2312 such as data communication oriented protocols such as X.25, ISDN, T-1, T-3, OC-3, OC-12, satellite, DSL, cable modems, and the like. The communications controller 2311 may also incorporate a modem (not shown) for interfacing and communicating with a standard telephone line 2313. Finally, the communications I/O controller may incorporate an Ethernet interface 2314 for communicating over a LAN. Any of these interfaces may be used to access the Internet, intranets, LANs, or other data communication facilities.

Finally, the processor 2301 may communicate with one or more wireless interfaces 2316 operatively connected to one or more antennae 2315 for communicating wirelessly with another devices, using for example, one of the IEEE 802.11 protocols, the 802.15.4 protocol, the 802.17 protocol, or any of the standard 3G wireless telecommunications protocols, such as CDMA2000 1x EV-DO, GPRS, GMPRS, W-CDMA, or any other suitable protocol.

Figure 32:
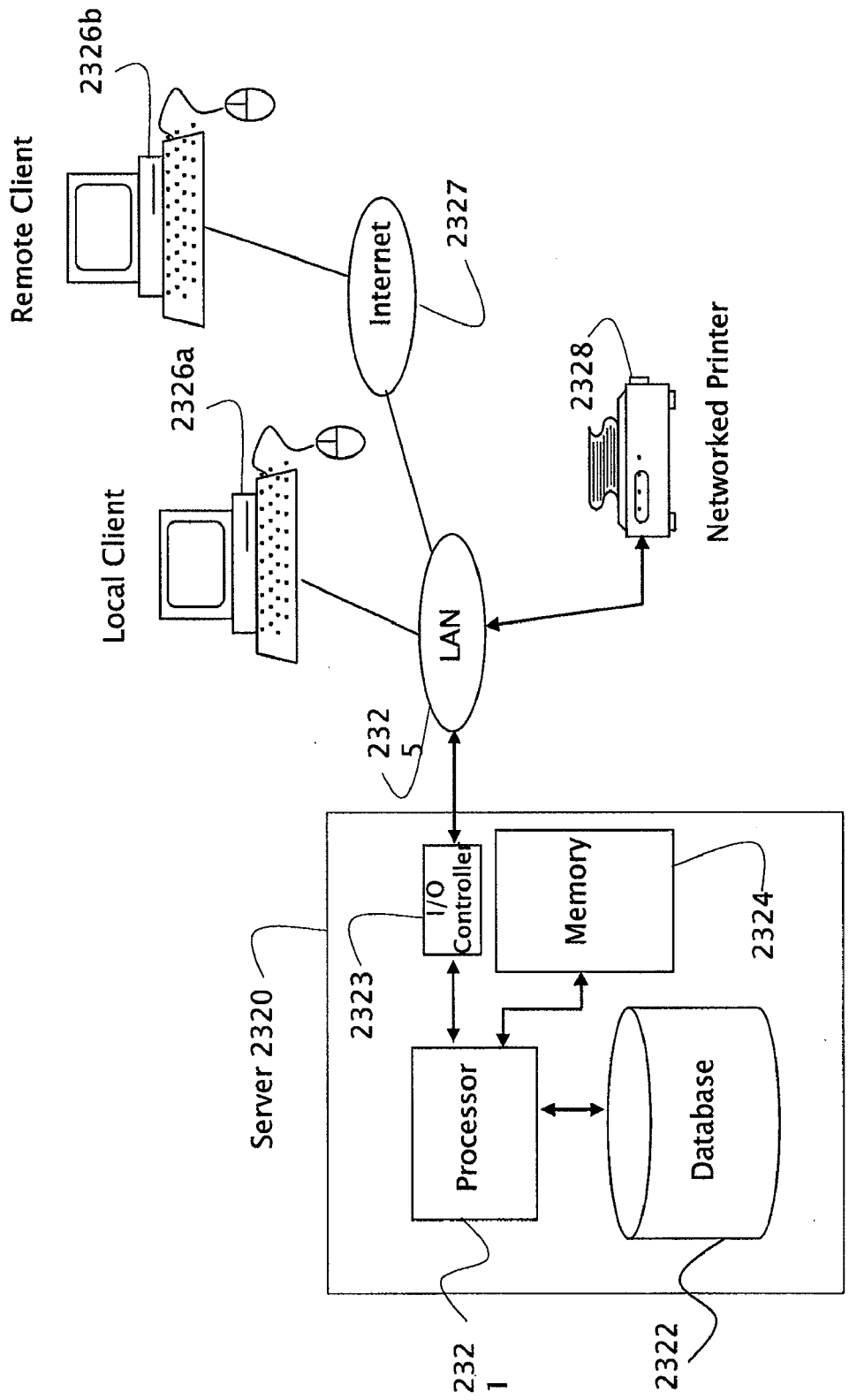
FIG. 32 is an illustration of a distributed server-client network, according to one embodiment of the present invention.

An alternative embodiment of a processing system that may be used is shown in FIG. 32. In this embodiment, a distributed communication and processing architecture is shown involving a server 2320 communicating with either a local client computer 2326a or a remote client computer 2326b. The server 2320 typically comprises a processor 2321 that communicates with a data storage system including a database 2322, through the utilization of a secondary memory, as well as primary memory 2324. The processor also communicates with external devices using an I/O controller 2323 that typically interfaces with a LAN 2325. The LAN may provide local connectivity to one or more networked printers 2328 and one or more local client computers 2326a. The networked printers 2328 may be located in the same facility as the server, though not necessarily in the same room. Communication with remote devices typically is accomplished by routing data from the LAN 2325 over a communications facility to the Internet 2327. A remote client computer 2326b may be used to establish remote connectivity to a server 2320 over a Wide Area Network (WAN), a remote desktop session, or a Virtual Private Network (VPN) so the remote client 2326b may interact with the server, as required, by data transmitted through the Internet 2327, over the LAN 2325 or WAN or VPN, to the server 2320.

Those skilled in the art of data networking will realize that many other alternatives and architectures are possible and can be used to practice the principles of the present invention. The embodiments illustrated in FIG. 31 and FIG. 32 can be modified in different ways and be within the scope of the present invention as claimed.

In one embodiment, as illustrated in FIG. 32, the architecture may include one or more servers 2320, one or more computer networks, and one or more local or remote clients 2326a, 2326b distributed in a multi-tiered client-server relationship. The one or more computer networks may include a variety of types of computer networks such as the internet 2327, a private intranet, a private extranet, a public switch telephone network (PSTN), a wide area network (WAN), a local area network (LAN) 2325, or any other type of network known in the art. The network, such as the LAN 2325, facilitates communications between the server 2320 and the one or more local clients 2326a. The LAN 2325 and the internet 2327 facilitate communications between the server 2320 and the one or more remote clients 2326b. Communication between two or more computer components may including, for example, a network transfer, a file transfer, an applet transfer, an Open Database Connectivity (ODBC) connection, a document mail merge, an e-mail, a Hyper-Text Transfer Protocol (HTTP) message, an XML message, a datagram, an object transfer, a binary large object (BLOB) transfer, and so on. The present invention, in one embodiment, uses the internet 2327 and its highly-efficient transmission protocols to send short, quick, efficient messages and data between and among the various computing components. In this aspect, the present invention is optimized for efficient communications and data transfer.

Conclusion. The described embodiments of the invention are intended to be merely exemplary. Of course, it is not possible to describe every conceivable combination of components or methodologies for purposes of describing the systems, methods, and apparatuses for accomplishing the various objectives of the invention. One of ordinary skill in the art may recognize that further combinations and permutations are possible. Accordingly, this application is intended to embrace alterations, modifications, and variations that fall within the scope of the appended claims and their equivalents.

The invention claimed is:

1. A method of mining address data to locate a preferred address for a parcel, comprising the steps of:
   maintaining one or more databases comprising a plurality of active shipment records and a plurality of delivery records;
   receiving a current parcel bearing address indicia;
   determining a preferred address corresponding to said address indicia based, at least in part, on said active shipment records and said delivery records; and
   assigning said preferred address to said current parcel;
   wherein said one or more databases comprise a package-level detail database and a delivery records archive;
   wherein said package-level detail database comprises said plurality of active shipment records, each active shipment record comprising an active tracking number, an active ship-to address, and an active delivery pattern code;
   wherein said delivery records archive comprises said plurality of delivery records, each delivery record comprising a past tracking number, a past ship-to address, a past delivery pattern code, and a stop identifier; and
   wherein said step of determining a preferred address corresponding to said address indicia comprises:
      assigning a mining key to said current parcel, said mining key comprising a parcel tracking number and a current delivery pattern code related to said address indicia;
      comparing said mining key to said package-level detail database and said delivery records archive by:
         (a) retrieving from said delivery records archive a first set of delivery records, each of said first set of delivery records having a past delivery pattern code that matches said current delivery pattern code; and
         (b) retrieving from said package-level detail database a first set of active shipment records, each of said first set of active shipment records having an active ship-to address that matches any past ship-to address in said first set of delivery records;
      building a set of mined data comprising said first set of delivery records and said first set of active shipment records; and
      prioritizing said set of mined data in order of the records most closely associated with said mining key, such that a preferred address related to said mining key occurs first.

2. The method of claim 1, wherein said step of comparing said mining key to said package-level detail database and said delivery records archive further comprises:
   (c) retrieving from said delivery records archive a second set of delivery records having past delivery pattern codes that match any said current delivery pattern code in said first set of active shipment records;
   (d) retrieving from said package-level detail database a second set of active shipment records having active ship-to addresses that match any ship-to address in said second set of delivery records; and
   (e) repeating steps (c) and (d) in a plurality of iterations until said step of building a set of mined data reaches a limit condition.

3. The method of claim 1, further comprising:
   selecting said preferred address as a preferred consignee address for a certain consignee location;
   assigning a unique consignee token related to said certain consignee location; and
   storing said unique consignee token and said preferred consignee address in a master address database.

4. The method of claim 1, wherein said step of prioritizing said set of mined data comprises:
   replacing one or more sequence values in a plurality of ship-to address records stored in said set of mined data with a representative symbol;
   clustering together delivery records in said set of mined data having the same stop identifier and the same ship-to address; and
   clustering together delivery records in said set of mined data having the same delivery pattern code and the same ship-to address.

5. The method of claim 4, wherein said step of prioritizing said set of mined data further comprises:
   building a delivery pattern similarity matrix by counting the coincidence of each delivery pattern code and each ship-to address within said set of mined data;
   summing the overlapping delivery pattern occurrences within said delivery pattern similarity matrix for each pair of ship-to addresses;
   building a stop identifier similarity matrix by counting the coincidence of each stop identifier and each ship-to address within said set of mined data;
   summing the overlapping stop occurrences within said stop identifier similarity matrix for each pair of ship-to addresses; and
   sorting said set of mined data in order the highest number of overlapping delivery pattern occurrences and the highest number of overlapping stop occurrences.

6. The method of claim 5, wherein said step of prioritizing said set of mined data further comprises:

converting said stop identifier similarity matrix into a stop identifier dendrogram;

constructing a stop-joined dendrogram by joining the pair of ship-to addresses having the highest number of overlapping stop occurrences, summing said number of occurrences to form a joined stop node, and by joining the next stop pair of ship-to addresses or joined stop nodes having the highest number of overlapping stop occurrences, by successive iterations, until said number of overlapping stop occurrences for each said next stop pair is zero;

converting said delivery pattern similarity matrix into a delivery pattern dendrogram; and constructing a pattern-joined dendrogram by joining the pair of ship-to addresses having the highest number of overlapping stop occurrences, using the minimum of said number of occurrences to form a joined pattern node, and by joining the next pattern pair of ship-to addresses or joined pattern nodes having the highest number of overlapping stop occurrences, by successive iterations, until said number of overlapping stop occurrences for each said next pattern pair is zero.

7. The method of claim 1, wherein said step of assigning said preferred address to said current parcel for delivery comprises:

presenting said set of mined data to an address database administrator; and receiving a selection of said preferred address by said administrator.

8. A method of maintaining address data for a plurality of records in one or more address databases, comprising:

maintaining one or more address databases comprising a plurality of active shipment records and a plurality of delivery records;

determining a preferred address for a select active shipment record or select delivery record based, at least in part, on said active shipment records and said delivery records; and updating said one or more address databases to associate said preferred address with said select active shipment record or said select delivery record;

wherein said one or more databases comprise a package-level detail database and a delivery records archive;

wherein said package-level detail database comprises said plurality of active shipment records, each active shipment record comprising an active tracking number, an active ship-to address, and an active delivery pattern code;

wherein said delivery records archive comprises said plurality of delivery records, each delivery record comprising a past tracking number, a past ship-to address, a past delivery pattern code, and a stop identifier; and wherein said step of determining a preferred address comprises:

gathering address data from said package-level detail database and said delivery records archive into a queue for a period of days;

scoring said address data in said queue;

building a consignee staging queue for storing data in said queue related to a certain consignee location;

assigning a mining key to a current parcel selected from said consignee staging queue, said mining key comprising a parcel tracking number and a current delivery pattern code;

comparing said mining key to said package-level detail database and said delivery records archive by:

(a) retrieving from said delivery records archive a first set of delivery records having past delivery pattern codes that match said current delivery pattern code;

(b) retrieving from said package-level detail database a first set of active shipment records having active ship-to addresses that match any past ship-to address in said first set of delivery records;

building a set of mined data comprising said first set of delivery records and said first set of active shipment records; and prioritizing said set of mined data in order of the records most closely associated with said mining key, such that a preferred address related to said mining key occurs first.

9. The method of claim 8, wherein said step of comparing further comprises:

(c) retrieving from said delivery records archive a second set of delivery records having past delivery pattern codes that match any current delivery pattern code in said first set of active shipment records;

(d) retrieving from said package-level detail database a second set of active shipment records having active ship-to addresses that match any ship-to address in said second set of delivery records; and (e) repeating steps (c) and (d) in a plurality of iterations until said step of building a set of mined data reaches a limit condition.

10. The method of claim 8, further comprising:

selecting said preferred address as a preferred consignee address for a certain consignee location;

assigning a unique consignee token related to said certain consignee location; and storing said unique consignee token and said preferred consignee address in a master address database.

11. The method of claim 8, wherein said step of prioritizing said set of mined data comprises:

replacing one or more sequence values in a plurality of ship-to address records stored in said set of mined data with a representative symbol;

clustering together delivery records in said set of mined data having the same stop identifier and the same ship-to address; and clustering together delivery records in said set of mined data having the same delivery pattern code and the same ship-to address.

12. The method of claim 11, wherein said step of prioritizing said set of mined data further comprises:

building a delivery pattern similarity matrix by counting the coincidence of each delivery pattern code and each ship-to address within said set of mined data;

summing the overlapping delivery pattern occurrences within said delivery pattern similarity matrix for each pair of ship-to addresses;

building a stop identifier similarity matrix by counting the coincidence of each stop identifier and each ship-to address within said set of mined data;

summing the overlapping stop occurrences within said stop identifier similarity matrix for each pair of ship-to addresses; and sorting said set of mined data in order the highest number of overlapping delivery pattern occurrences and the highest number of overlapping stop occurrences.

13. The method of claim 12, wherein said step of prioritizing said set of mined data further comprises:
    converting said stop identifier similarity matrix into a stop identifier dendrogram;
    constructing a stop-joined dendrogram by joining the pair of ship-to addresses having the highest number of overlapping stop occurrences, summing said number of occurrences to form a joined stop node, and by joining the next stop pair of ship-to addresses or joined stop nodes having the highest number of overlapping stop occurrences, by successive iterations, until said number of overlapping stop occurrences for each said next stop pair is zero;
    converting said delivery pattern similarity matrix into a delivery pattern dendrogram; and
    constructing a pattern-joined dendrogram by joining the pair of ship-to addresses having the highest number of overlapping stop occurrences, using the minimum of said number of occurrences to form a joined pattern node, and by joining the next pattern pair of ship-to addresses or joined pattern nodes having the highest number of overlapping stop occurrences, by successive iterations, until said number of overlapping stop occurrences for each said next pattern pair is zero.

14. The method of claim 8, wherein said step of scoring said address data in said queue comprises:
    generating a count table for the number of occurrences of each of a plurality of delivery conditions on each day of said period;
    calculating for each stop identifier a measure number for each of a plurality of corresponding outcomes, based upon said count table and a plurality of measure equations; and
    building an output message for each parcel tracking number based upon said measure number and said corresponding outcome.

15. The method of claim 8, wherein said step of assigning said preferred address to said current parcel and updating said address database comprises:
    presenting said set of mined data to an address database administrator; and
    receiving a selection of said preferred address by said administrator.

16. A system for locating a preferred address for a parcel, said system comprising:
    one or more processors; and
    one or more memory storage areas configured for storing one or more databases comprising a plurality of active shipment records and a plurality of delivery records;
    wherein said system is configured to:
        determine a preferred address corresponding to address indicia of a current parcel based, at least in part, on said active shipment records and said delivery records; and
        assign said preferred address to said current parcel;
    wherein said one or more databases comprises a package level detail database and a delivery records archive;
    wherein said package-level detail database comprising a plurality of active shipment records, said active shipment records comprising an active tracking number, an active ship-to address, and an active delivery pattern code;
    wherein said delivery records archive comprising a plurality of delivery records, said delivery records comprising a past tracking number, a past ship-to address, a past delivery pattern code, and a stop identifier; and
    wherein, in order to determine said preferred address, said system is configured to:
        (a) assign a mining key to a current parcel bearing address indicia, said mining key comprising a parcel tracking number and a current delivery pattern code related to said address indicia;
        (b) retrieve from said delivery records archive a first set of delivery records having past delivery pattern codes that match said current delivery pattern code;
        (c) retrieve from said package-level detail database a first set of active shipment records having active ship-to addresses that match any past ship-to address in said first set of delivery records; and
        (d) generate a set of mined data comprising said first set of delivery records and said first set of active shipment records, said set of mined data prioritized in order of the records most closely associated with said mining key, such that a preferred address related to said mining key occurs first.

17. The system of claim 16, wherein said system is further configured to:
    (e) retrieve from said delivery records archive a second set of delivery records having past delivery pattern codes that match any active delivery pattern code in said first set of active shipment records;
    (f) retrieve from said package-level detail database a second set of active shipment records having active ship-to addresses that match any past ship-to address in said second set of delivery records; and
    (g) repeating steps (e) and (f) in a plurality of iterations until said step of building a set of mined data reaches a limit condition.

18. The system of claim 16, wherein said system is further configured to assign a unique consignee token related to a certain consignee location associated with said preferred address.

19. The system of claim 16, wherein said system is further configured to:
    replace one or more sequence values of a plurality of delivery records in said set of mined data with one or more representative symbols;
    identify clusters of said plurality of delivery records having the same stop identifier;
    identify clusters of said plurality of delivery records having the same delivery pattern code; and
    include said identified clusters of delivery records in said set of mined data.

20. The system of claim 19, wherein said system is further configured to:
    count the coincidences of each delivery pattern code and each ship-to address within said set of mined data;
    generate a delivery pattern similarity matrix comprising said coincidences of each delivery pattern code and each ship-to address;
    sum the overlapping delivery pattern occurrences within said delivery pattern similarity matrix for each pair of ship-to addresses;
    count the coincidences of each stop identifier and each ship-to address within said set of mined data;
    generate a stop identifier similarity matrix comprising said coincidences of each stop identifier and each ship-to address;
    sum the overlapping stop occurrences within said stop identifier similarity matrix for each pair of ship-to addresses; and sort said set of mined data according to the number of overlapping delivery pattern occurrences and the number of overlapping stop occurrences.

21. The system of claim 20, wherein said system is further configured to:
    convert said stop identifier similarity matrix into a stop identifier dendrogram;
    generate a stop-joined dendrogram by joining the pair of ship-to addresses having the highest number of overlapping stop occurrences, summing said number of occurrences to form a joined stop node, and by joining the next stop pair of ship-to addresses or joined stop nodes having the highest number of overlapping stop occurrences, by successive iterations, until said number of overlapping stop occurrences for each said next stop pair is zero;
    convert said delivery pattern similarity matrix into a delivery pattern dendrogram; and
    generate a pattern-joined dendrogram by joining the pair of ship-to addresses having the highest number of overlapping stop occurrences, using the minimum of said number of occurrences to form a joined pattern node, and by joining the next pattern pair of ship-to addresses or joined pattern nodes having the highest number of overlapping stop occurrences, by successive iterations, until said number of overlapping stop occurrences for each said next pattern pair is zero.

22. A system for maintaining address data for a plurality of records in one or more address databases, the system comprising:
    one or more processors; and
    one or more memory storage areas configured for storing one or more address databases comprising a plurality of active shipment records and a plurality of delivery records;
    wherein the system is configured to:
        determine a preferred address for a select active shipment record or a select delivery record based, at least in part, on said active shipment records and said delivery records; and
        assign said preferred address to said parcel and update said one or more address databases to associate said preferred address with the select active shipment record or select delivery record;
    wherein said one or more databases comprise a package level detail database and a delivery records archive;
    wherein said package-level detail database comprising a plurality of active shipment records, each active shipment record comprising an active tracking number, an active ship-to address, and an active delivery pattern code;
    wherein said delivery records archive comprising a plurality of delivery records, each delivery record comprising a past tracking number, a past ship-to address, a past delivery pattern code, and a stop identifier; and
    wherein, in order to determine said preferred address, said system is configured to:
        queue address data gathered from said package-level detail database and said delivery records archive for a period of days;
        assign a score to said address data in said queue;
        store data related to a certain consignee location in a consignee stating queue;
        assign a mining key to a current parcel selected from said consignee staging queue, said mining key comprising a parcel tracking number and a current delivery pattern code;
        compare said mining key to said package-level detail database and said delivery records archive by:
            (a) retrieving from said delivery records archive a first set of delivery records having past delivery pattern codes that match said current delivery pattern code; and
            (b) retrieving from said package-level detail database a first set of active shipment records having active ship-to addresses that match any past ship-to address in said first set of delivery records; and
        generate a set of mined data comprising said first set of delivery records and said first set of active shipment records, said set of mined data prioritized in order of the records most closely associated with said mining key, such that a preferred address related to said mining key occurs first.

23. The system of claim 22, wherein said comparing step further comprises:
    (c) retrieving from said delivery records archive a second set of delivery records having past delivery pattern codes that match any current delivery pattern code in said first set of active shipment records;
    (d) retrieving from said package-level detail database a second set of active shipment records having active ship-to addresses that match any additional ship-to address in said second set of delivery records; and
    (e) repeating steps (c) and (d) in a plurality of iterations until said step of building a set of mined data reaches a limit condition.

24. The system of claim 22, wherein said system is further configured to assign a unique consignee token to a certain consignee location associated with said preferred address.

25. The system of claim 22, wherein said set of mined data further comprises:
    a plurality of ship-to address records having a representative symbol in place of one or more sequence values;
    clusters of delivery records having the same stop identifier and the same ship-to address; and
    clusters of delivery records having the same delivery pattern code and ship-to address.

26. The system of claim 25, wherein said system is further configured to:
    generate a delivery pattern similarity matrix by counting the coincidences of each delivery pattern code and each ship-to address within said set of mined data;
    sum the overlapping delivery pattern occurrences within said delivery pattern similarity matrix for each pair of ship-to addresses;
    generate a stop identifier similarity matrix by counting the coincidences of each stop identifier and each ship-to address within said set of mined data;
    sum the overlapping stop occurrences within said stop identifier similarity matrix for each pair of ship-to addresses; and
    sort said set of mined data in order of the highest number of overlapping delivery pattern occurrences and the highest number of overlapping stop occurrences.

27. The system of claim 26, wherein said system is further configured to:
    generate a stop identifier dendrogram by converting said stop identifier similarity matrix;
    generate a stop-joined dendrogram by joining the pair of ship-to addresses having the highest number of overlapping stop occurrences, summing said number of occurrences to form a joined stop node, and by joining the next stop pair of ship-to addresses or joined stop nodes having the highest number of overlapping stop occurrences, by successive iterations, until said number of overlapping stop occurrences for each said next stop pair is zero;

generate a delivery pattern dendrogram by converting said delivery pattern similarity matrix; and generate a pattern-joined dendrogram by joining the pair of ship-to addresses having the highest number of overlapping stop occurrences, using the minimum of said number of occurrences to form a joined pattern node, and by joining the next pattern pair of ship-to addresses or joined pattern nodes having the highest number of overlapping stop occurrences, by successive iterations, until said number of overlapping stop occurrences for each said next pattern pair is zero.

28. The system of claim 22, wherein said system is configured to assign a score to said address data in said queue by:

generating a count table for storing the number of occurrences of each of a plurality of delivery conditions on each day of said period;

for each stop identifier, calculating and storing a measure number for each of a plurality of corresponding outcomes, based upon said count table and a plurality of measure equations; and generating an output message for each parcel tracking number based upon said measure number and said corresponding outcome.

* * * * *